United States Patent
Kubala et al.

(10) Patent No.: US 9,477,061 B2
(45) Date of Patent: *Oct. 25, 2016

(54) PASSIVELY ALIGNED IMAGING OPTICS AND METHOD OF MANUFACTURING THE SAME

(71) Applicant: FiveFocal LLC, Boulder, CO (US)

(72) Inventors: Kenneth Scott Kubala, Boulder, CO (US); Alan E. Baron, Boulder, CO (US); Robert Matthew Bates, Erie, CO (US); Jeremy Alan Grata, Longmont, CO (US)

(73) Assignee: FiveFocal LLC, Boulder, CO (US)

( * ) Notice: Subject to any disclaimer, the term of this patent is extended or adjusted under 35 U.S.C. 154(b) by 284 days.

This patent is subject to a terminal disclaimer.

(21) Appl. No.: 13/951,414

(22) Filed: Jul. 25, 2013

(65) Prior Publication Data

US 2013/0308212 A1  Nov. 21, 2013

Related U.S. Application Data

(63) Continuation-in-part of application No. 13/355,474, filed on Jan. 20, 2012.

(60) Provisional application No. 61/434,657, filed on Jan. 20, 2011.

(51) Int. Cl.
*G02B 13/14* (2006.01)
*G02B 7/02* (2006.01)
*G02B 13/18* (2006.01)

(52) U.S. Cl.
CPC ............. *G02B 7/021* (2013.01); *G02B 13/146* (2013.01); *G02B 13/18* (2013.01)

(58) Field of Classification Search
CPC ...... G02B 13/14; G02B 5/208; G02B 13/18; G02B 13/146; H04N 5/33
USPC .......................................................... 359/356
See application file for complete search history.

(56) References Cited

U.S. PATENT DOCUMENTS

| | | |
|---|---|---|
| 3,711,185 A | 1/1973 | McKinley |
| 5,202,792 A | 4/1993 | Rollin |
| 5,909,308 A | 6/1999 | Ulrich |
| 6,269,145 B1 | 7/2001 | Piestrup et al. |
| 6,493,155 B1 | 12/2002 | Lee et al. |
| 6,545,828 B2 | 4/2003 | Buczek et al. |
| 2001/0013977 A1 | 8/2001 | Tadic-Galab et al. |
| 2001/0038494 A1* | 11/2001 | Blomberg et al. ............ 359/642 |

(Continued)

OTHER PUBLICATIONS

EP 12 73 7144 Supplementary European Search Report dated May 8, 2014, 7 pages.

(Continued)

*Primary Examiner* — Bumsuk Won
*Assistant Examiner* — Tamara Y Washington
(74) *Attorney, Agent, or Firm* — Lathrop & Gage LLP

(57) ABSTRACT

An infrared imaging system is formed by passively aligning two or more lens wafers including a plurality of lenses. The lens wafers may be pre-fabricated lens wafers in which the plurality of lenses are aligned utilizing an alignment jig having a plurality of conduits for distributing bonding material. Alternatively, the lens wafers may be formed of a base material molded around the plurality of optical lenses. The lens wafers may have a variety of alignment features, alignment inserts and/or alignment elements.

16 Claims, 43 Drawing Sheets

(56) References Cited

U.S. PATENT DOCUMENTS

| | | | |
|---|---|---|---|
| 2004/0036982 A1 | 2/2004 | Chipper | |
| 2007/0127125 A1 | 6/2007 | Sasaki | |
| 2008/0273239 A1 | 11/2008 | Jin et al. | |
| 2009/0052018 A1 | 2/2009 | Baker | |
| 2009/0268277 A1 | 10/2009 | Day et al. | |
| 2010/0079635 A1 | 4/2010 | Yano et al. | |
| 2010/0103509 A1* | 4/2010 | Robinson | 359/356 |
| 2010/0208354 A1 | 8/2010 | Okazaki et al. | |
| 2011/0310254 A1 | 12/2011 | Barnes, IV et al. | |

OTHER PUBLICATIONS

U.S. Appl. No. 13/355,474, Office Action mailed May 12, 2014, 13 pages.
U.S. Appl. No. 13/355,474, Response to Office Action filed Sep. 8, 2014, 24 pages.
U.S. Appl. No. 13/355,478 Final Office Action mailed Jan. 6, 2014, 13 pages.
U.S. Appl. No. 13/355,474, Response to Office Action filed Jan. 6, 2014, 13 pages.
PCT/US12/22124 International Search Report and Written Opinion mailed May 25, 2012, 27 pages.
PCT/US12/22124 Response to Written Opinion filed Nov. 20, 2012, 40 pages.
PCT/US12/22124, Written Opinion of the International Preliminary Examining Authority dated Apr. 12, 2013, 12 pages.
U.S. Appl. No. 13/355,478 Non-Final Office Action mailed Mar. 28, 2013, 12 pages.
U.S. Appl. No. 13/355,474, Office Action mailed Interview Summary dated Jul. 1, 2013.
U.S. Appl. No. 13/355,474, Office Action mailed Mar. 29, 2013, 17 pages.
U.S. Appl. No. 13/355,474, Response to Office Action filed Jul. 29, 2013, 18 pages.
U.S. Appl. No. 13/355,474, Office Action mailed Oct. 8, 2015, 12 pages.

* cited by examiner

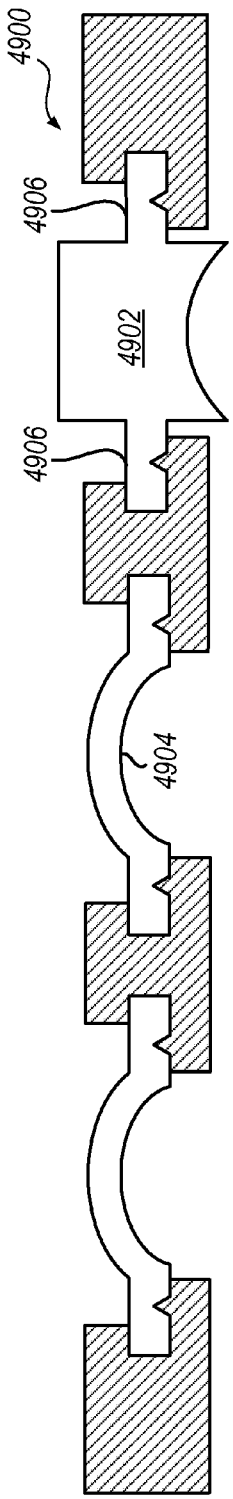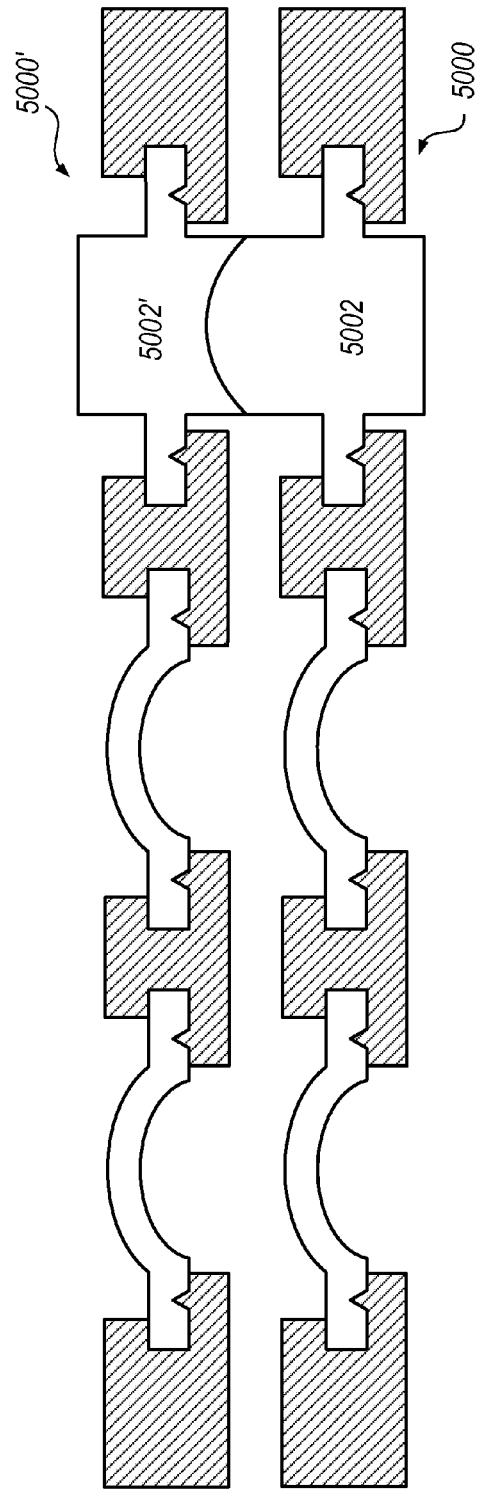
FIG. 49
FIG. 50

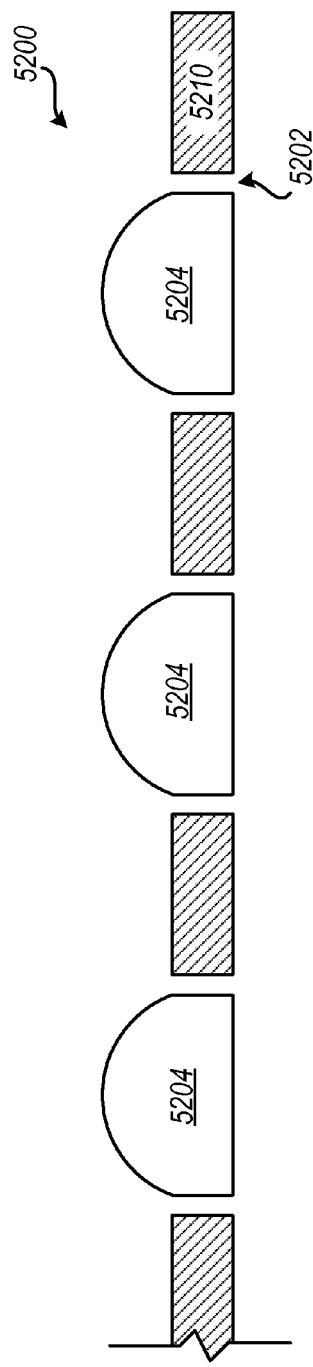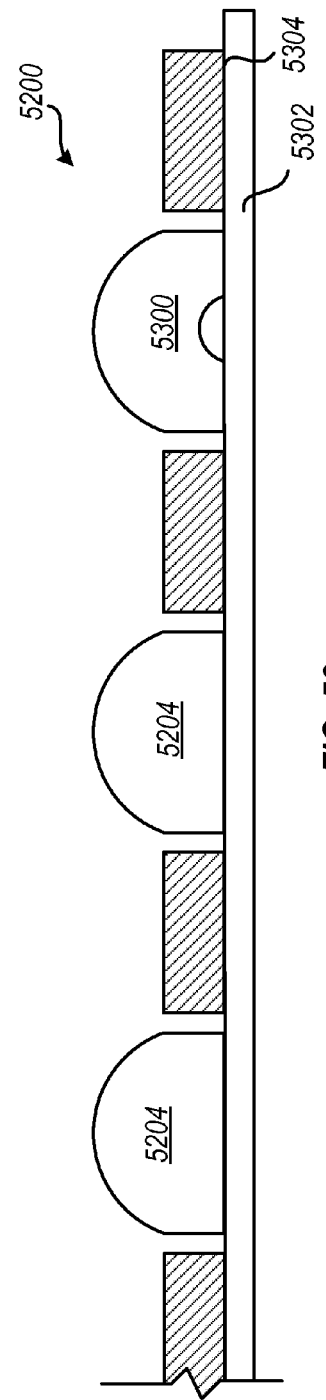

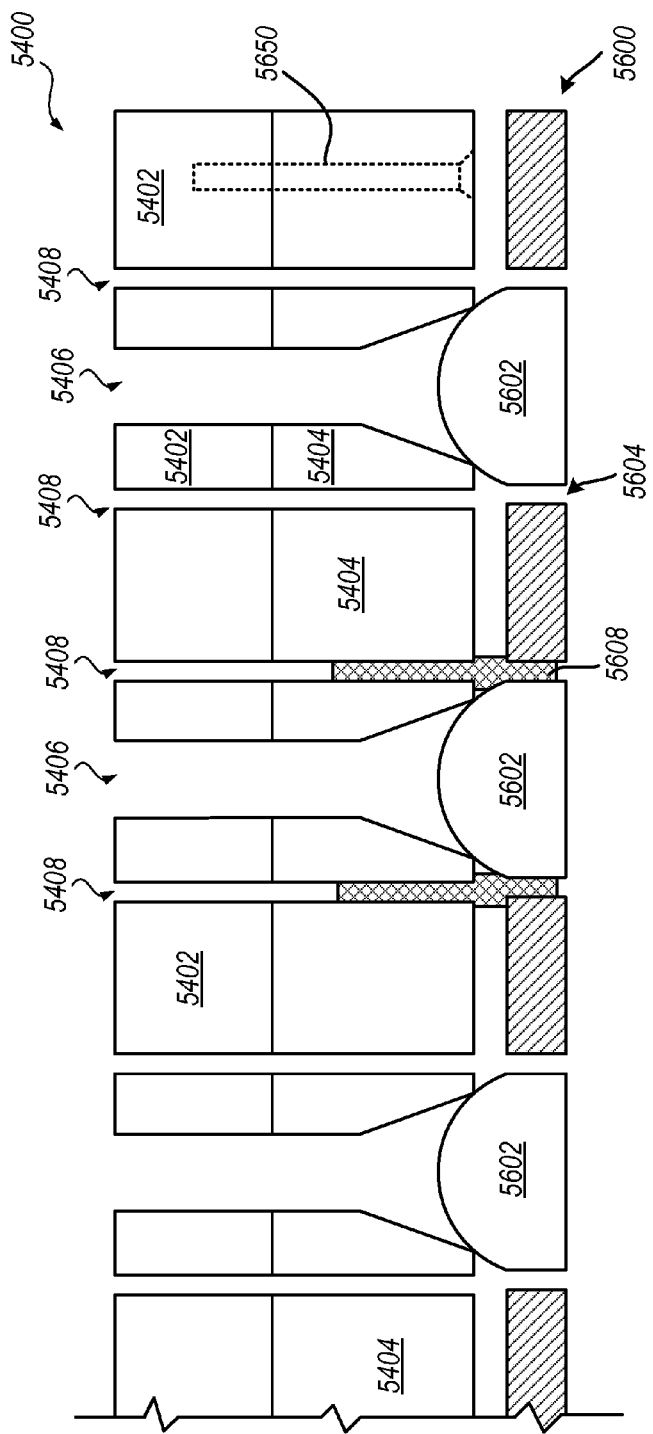
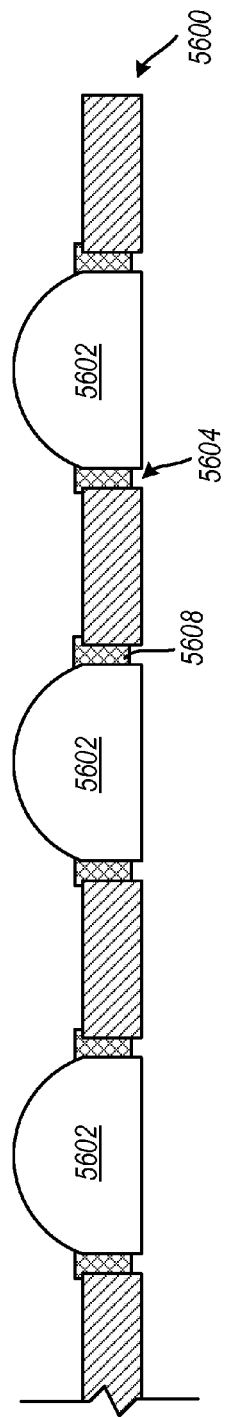

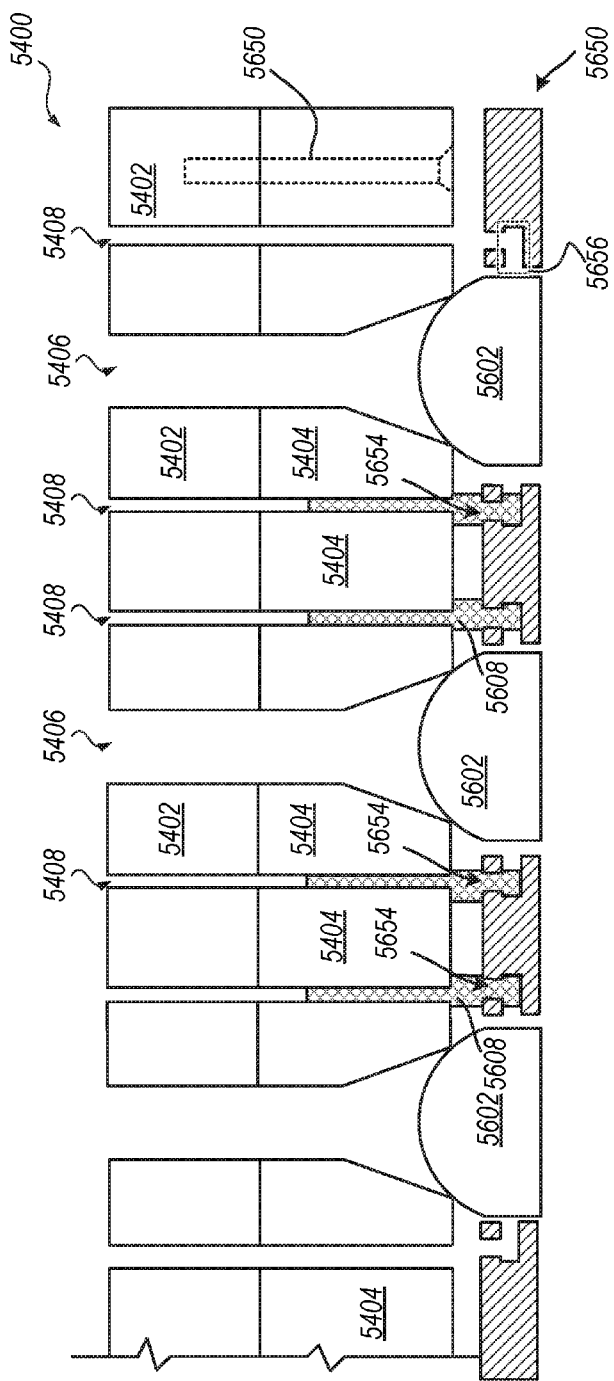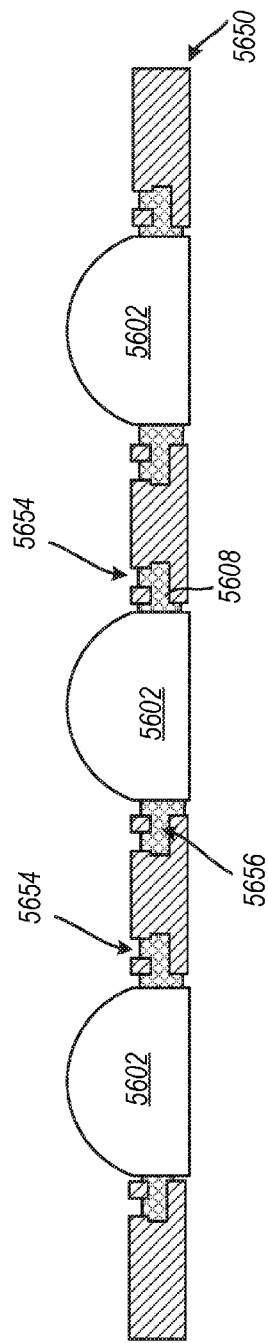
FIG. 56A
FIG. 57A

PASSIVELY ALIGNED IMAGING OPTICS AND METHOD OF MANUFACTURING THE SAME

CROSS-REFERENCE TO RELATED APPLICATIONS

This application is a continuation-in-part, and claims priority to, U.S. application Ser. No. 13/355,474, filed Jan. 20, 2012, and which claims priority to U.S. Provisional Patent Application No. 61/434,657, filed Jan. 20, 2011, each of which is incorporated by reference in its entirety.

U.S. GOVERNMENT SUPPORT

The present invention was made under Phase I SBIR Contract No. IIP-1047405 from the National Science Foundation. The Government has certain rights in this invention.

BACKGROUND

Conventional longwave infrared ("LWIR") lenses are expensive to manufacture and often incorporate either moving parts or nested barrels for athermalization. Athermalization is a larger concern for infrared ("IR") imaging systems than for systems that image visible radiation, due to the relative increased sensitivity to temperature of common LWIR materials in comparison to common visible spectrum materials. FIG. 1 illustrates one prior art manufacturing process 100 for producing a camera assembly. In process 100, aspheric lens elements are diamond turned individually in step 102, and a housing is fabricated in step 104. The lenses are placed into a lens mount with multiple component athermalization mechanisms in step 106. The lens mount is assembled into a camera in step 108. The camera is actively aligned and focused using feedback from acquired images, and then potted into place, in step 110. The camera is calibrated and tested in step 112.

FIG. 2 illustrates, in an exploded view, one prior art lens stack 200 that may be produced by steps 102 through 108 of process 100 of FIG. 1. Lenses 202 and 206 are diamond turned in step 102 of process 100. Housing 216 is fabricated in step 104. In step 106, lenses 202 and 206 mount with a spacer 204 therebetween and with a first barrel 210 and a second barrel 212 that has a high coefficient of thermal expansion. These components then mount with a threaded barrel 214 that has a low coefficient of thermal expansion. In step 108, threaded barrel 214 screws into housing 216. Lens stack 200 may integrate with a sensor 218 to form a camera.

As shown in FIG. 2, lens stack 200 includes a significant number of associated mounting hardware elements and interfaces between these elements and lenses. Those skilled in the art will appreciate that these elements generate tolerance stack-up issues (e.g., related to lens alignment, element thickness variations, tilt of the elements and mounting materials) that can make the performance of lens stack 200 nonideal. Therefore, lens stack 200 is usually actively aligned and focused in situ with a camera body in step 110 to mitigate the effects of these issues, but the active alignment process adds further cost to process 100.

Another prior art method of making cameras includes molding lenses onto one or both sides of a transparent glass substrate. Multiple wafers of lenses are then stacked on top of each other with spacer wafers between the lens wafers to achieve a required spacing between the lenses. Good imaging performance of the final lens assemblies requires precise positioning of all of the wafers in six degrees of freedom with respect to each other: typical Cartesian x and y coordinates for centering the lens elements; z spacing between the lens elements, and rotations known in the art as tip, tilt and theta. The required alignments are generally performed utilizing a mask aligner adapted from semiconductor processing equipment. Such equipment may be costly and time consuming to operate, and presents special challenges for assembly of IR optics. IR imaging instrumentation would generally be a nonstandard and costly addition to a mask aligner, and the longer wavelengths of IR as opposed to visible light may make alignment thereby less precise.

SUMMARY OF THE INVENTION

In an embodiment, a passively athermalized infrared imaging system includes an object side meniscus lens that forms at least one aspheric surface, and an image side meniscus lens that forms two aspheric surfaces. Each of the meniscus lenses are formed of a material selected from the group consisting of a chalcogenide glass, germanium, silicon, gallium arsenide, zinc selenide and glass. An optical power of the image side meniscus lens is at least 1.6 times an optical power of the object side meniscus lens such that an effective focus position of the imaging system is athermalized over a range of 0 to +40 degrees Celsius.

In an embodiment, a passively athermalized infrared imaging system includes an object side meniscus lens, formed of a first material that transmits infrared radiation, that forms at least one aspheric surface; and an image side meniscus lens, formed of a second material that transmits infrared radiation, that forms two aspheric surfaces. The object side and image side meniscus lenses cooperate to form a thermal image and are concave towards the image. The first and second materials have thermal glass constants $T_{g1}$ and $T_{g2}$ respectively, wherein $T_{g2}$ is at least 1.67 times $T_{g1}$, such that an effective focus position of the system is athermalized over a temperature range of 0 to +40 degrees Celsius.

In an embodiment, a method of aligning elements in a manufacturing process includes placing a middle element onto a base element, the base element forming first alignment features, the middle element forming apertures therethrough corresponding to the first alignment features. The method also includes placing second alignment features of an upper element onto the first alignment features such that the first and second alignment features cooperate, through the apertures, to align the upper element with the base element.

In an embodiment, a method of aligning elements in a manufacturing process includes placing a middle element onto a base element, the base element forming first alignment features, the middle element forming apertures therethrough corresponding to the first alignment features. The method also includes placing intermediate alignment elements upon the first alignment features, and placing second alignment features of an upper element onto the intermediate alignment features such that the first, intermediate, and second alignment features cooperate to align the upper element with the base element.

In an embodiment, a plurality of infrared lens systems includes at least one first lens wafer comprising a first base material that is opaque to infrared radiation, with infrared transmissive material inset into apertures therein to form first lenses, bonded with at least one second lens wafer having a plurality of second lenses, such that pluralities of the first and second lenses align to form the lens systems.

In an embodiment, a lens wafer for use in optical manufacturing includes a substrate forming apertures therein, the substrate being formed of a base material, and a plurality of lenses, each of the lenses comprising an optical material and disposed within a respective one of the apertures.

In an embodiment, an infrared lens assembly includes a lens formed of an infrared transmitting material that is disposed within a carrier of a base material, the lens being molded within the carrier with at least one feature that secures the lens to the carrier.

In an embodiment, a mold set includes an upper mold and a lower mold, at least one of the upper and lower molds having one or more features that are configured to hold an infrared lens in an aligned position, the upper and lower molds configured to provide a cavity for molding a moldable material into one of a lens carrier and a lens wafer about the infrared lens.

In an embodiment, an infrared lens assembly includes a lens formed of an infrared transmitting material that is disposed within a carrier of a base material, the carrier being molded around the lens with at least one feature that secures the lens to the carrier.

In an embodiment, an infrared lens stack includes a first lens formed of an infrared transmitting material and disposed within a first carrier, formed of a base material, that forms at least one first alignment feature; and a second lens formed of an infrared transmitting material and disposed within a second carrier, formed of a base material, that forms at least one second alignment feature configured to cooperate with the first alignment feature. The stack is formed by placing the first assembly atop the second assembly so that the alignment features cooperate.

In an embodiment, a lens wafer for use in a passively aligned optical imaging system includes a plurality of lens elements including alignment features such that the lenses are alignable on a mold and a base portion made from base material molded around the plurality of lenses.

In an embodiment, an alignment jig for aligning a plurality of lenses within a pre-fabricated lens wafer, the lens wafer having a plurality of apertures for each receiving one of the plurality of lenses, the alignment jig including a base portion coupled to a lens alignment portion, the lens alignment portion including a material that will not scratch the surface of the plurality of lenses. The alignment jig further including a plurality of lens alignment apertures defining the precision alignment locations where the lenses are to be aligned within the lens wafer, and a plurality of bond material conduits for distributing bond material to the edge of the plurality of lenses.

In an embodiment, a passively aligned optical imaging assembly includes a lower wafer having a plurality of lower alignment features, a middle wafer having a plurality of middle optical elements and a plurality of middle alignment features opposing the lower alignment features, and, an upper wafer having a plurality of upper optical elements and a plurality of upper alignment features opposing the middle alignment features. Wherein the lower, middle and upper alignment features cooperate to passively align the lower, middle and upper lens wafers.

In an embodiment, an optical imaging system includes a first lens wafer including a first plurality of lenses and a first base material that is molded around the first plurality of lenses, the first base material having a plurality of first alignment features for aligning a second plurality of lenses. The optical imaging system may further include a second lens wafer including the second plurality of lenses, the second lens wafer having a second base material molded on top of the first lens wafer and around the second plurality of lenses.

BRIEF DESCRIPTION OF THE DRAWINGS

FIG. 49 depicts a lens wafer including an alignment insert substituted for one of the lenses.

FIG. 50 illustrates a lower lens wafer and an upper lens wafer each including alignment inserts, in one embodiment.

FIG. 52 depicts a schematic cross section of a lens wafer including a plurality of apertures within base material for receiving lenses.

FIG. 53 depicts the lens wafer of FIG. 52 including an alignment insert substituted for one of the lenses, in one embodiment.

FIG. 56 depicts an exemplary cross section of the alignment jig of FIGS. 54-55 aligning a plurality of lenses within a lens wafer.

FIG. 56A depicts an exemplary cross section of the alignment jig, of FIGS. 54-54 aligning a plurality of lenses within a prefabricated lens wafer having a plurality of bonding holes and bonding grooves.

FIG. 57 depicts the lens wafer of FIG. 56 after lenses are bonded in place.

FIG. 57A depicts the lens wafer of FIGS. 56A-56B after the lenses are secured into place.

DETAILED DESCRIPTION OF THE DRAWINGS

Introduction

Certain materials that are typically used for LWIR imaging have large changes in optical and mechanical properties with temperature. Therefore, creating an athermalized imaging design is a larger concern for IR imaging than visible light imaging, due to the relative increased sensitivity to temperature of common LWIR materials in comparison to common visible spectrum materials. Another challenge is that the LWIR imaging industry cannot rely on components, processes, or testing equipment that have been developed for the extremely high volumes of the visible imaging and display businesses. Although some of the general techniques that have been developed for visible wafer level solutions can be transferred, the technology is not readily adapted to the LWIR spectrum without significant changes to the process and the lens architecture to compensate for the unique challenges of imaging in the LWIR spectrum.

Lens Carrier Based Manufacturing and Passive Alignment

Figure 3:
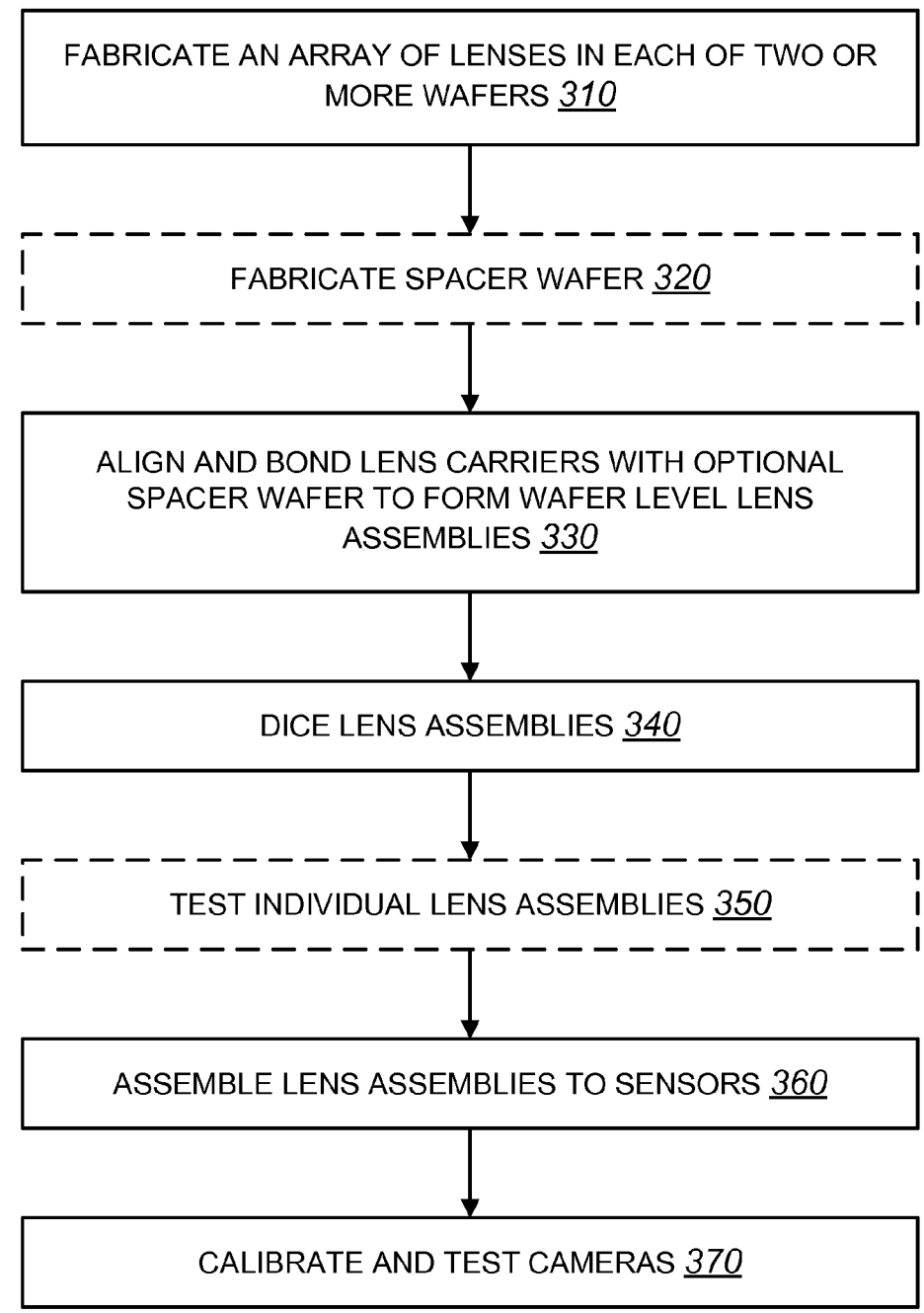
FIG. 3 shows a parallel LWIR manufacturing process, in an embodiment.
Figure 4:
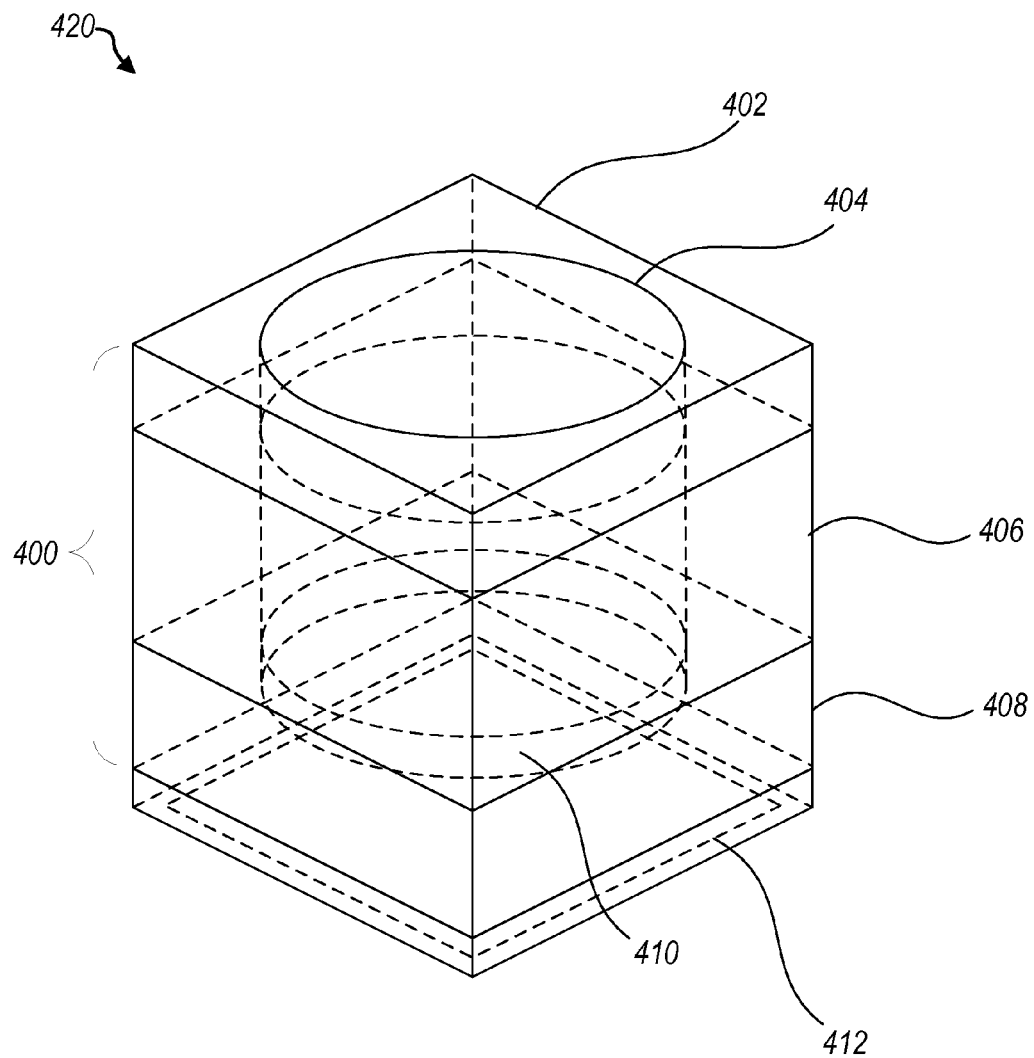
FIG. 4 is a perspective view showing one exemplary lens stack produced by the process of FIG. 3, in an embodiment.

FIG. 3 illustrates a parallel longwave infrared ("LWIR") manufacturing process 300. FIG. 4 is a schematic perspective view showing one exemplary lens stack 400 produced by process 300 of FIG. 3.

In process 300, FIG. 3, arrays of lens elements are simultaneously fabricated on carriers or "wafers," stacked with an optional, athermalizing spacer "wafer," passively aligned, bonded (optionally with the spacer), diced into complete IR optical modules and mounted onto IR sensors. (The carriers and spacer elements utilized in the manufacturing techniques herein are sometimes called "wafers" due to the similarity of such manufacturing to semiconductor processing that is performed on wafers cut from crystal boules.) "Sensors" herein are sensor chips such as microbolometer arrays that include a plurality, usually a large number, of pixels that are sensitive to incoming radiation and can form an image therefrom. The resulting lens stacks 400 thus enable a passively athermalized IR imaging system that does not rely on complicated arrangements such as nested barrels and/or moving parts for athermalized performance.

In step 310 of process 300, an array of lenses is fabricated in each of two or more wafers. Exemplary lens materials and prescriptions, and further details about how the lenses may be fabricated, are provided below. In step 320, a spacer wafer is fabricated. Step 320 is optional, as one or more of the lens wafers may be formed of sufficient thickness that a spacer wafer is not needed to provide appropriate spacing and/or appropriate coefficient of thermal expansion for an athermalized design. In step 330, the lens wafers are aligned with each other and optionally about the spacer wafer, and bonded thereto to form a wafer level lens assembly. Further details on alignment strategies that may be employed within step 330 are also provided below. In step 340, the wafer level lens assembly is diced into single lens assemblies. Step 350 is an optional lens test step to eliminate defective lens assemblies before they are mated to other camera components. In step 360, the lens assemblies are assembled to other components to form cameras. In step 370, the cameras are calibrated and tested.

Certain steps of process 300 may be performed in a different order than is shown in FIG. 3. For example, steps 310 and 320 may be performed in any order. Also, when step 350 is performed as part of process 300, it may be performed before or after dicing step 340 (that is, the wafer level lens assemblies formed in step 330 may be tested individually in wafer form before step 340, or as individual units after step 340).

It should also be clear that the steps of process 300 may be adapted to add further lens and/or spacer layers to a lens stack, as compared to the two lens stack produced by the minimum steps of process 300. For example, a common variation of process 300 will be to bond two lens wafers and two spacer wafers, to produce a lens stack that has spacing between two lenses and between an image side one of the lenses and a sensor. Another common variation of process 300 will be to bond a spacer atop the lens stack to form an input aperture stop. Addition of other features by repeating steps of process 300 or by adding other features that are compatible with the wafer level manufacturing scheme of process 300 are contemplated and fall within the scope of the present disclosure.

By forming arrays of lenses, with precise spacing on or within a monolithic wafer, the need for individual, active alignment of each lens stack is eliminated. A single alignment step between one or more lens array wafers and one or more spacer wafers accurately positions all lenses with respect to one another, thus improving off-axis image performance relative to conventional lens assembly by reducing decenter and tilt errors. This effectively eliminates the need for active alignment of each lens, a step that is currently a time-consuming, labor intensive adjustment required for each lens (e.g., step 110 of process 100 discussed above). By simplifying and grouping (e.g., across a wafer) the number of assembly steps involved, lens carrier and/or lens wafer based fabrication also enables production of IR cameras that are more compact and less costly than in the prior art. One key to cost reduction is to utilize more costly optical materials only where needed and to utilize appropriate, less costly base materials for structural support of the optical materials. Methods of doing so, and the cameras formed thereby, are now discussed.

FIG. 4 schematically shows the major elements of a lens stack 400 and a camera 420 that can be produced utilizing process 300, FIG. 3. A portion 402 of a first lens carrier includes a first lens 404. A portion 406 of a spacer wafer is disposed between, and bonded to, overlying portion 402 and an underlying portion 408 of a second lens carrier. Portion 408 includes a second lens 410. Lens stack 400 includes portions 402, 406 and 408, and can integrate with a sensor 412 to form camera 420.

Figure 5:
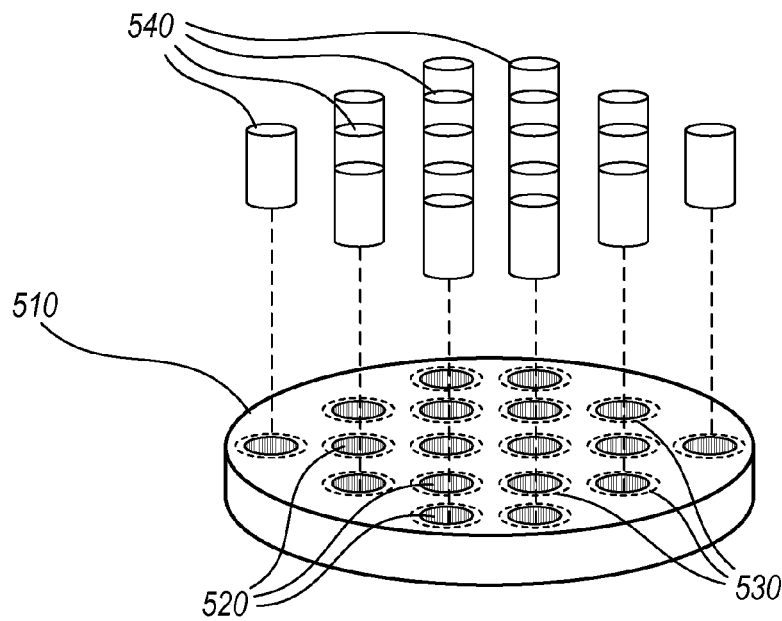
FIG. 5 illustrates a wafer that forms an array of apertures where lenses will be fabricated, in an embodiment.

FIGS. 5 through 8 schematically illustrate one way in which step 310 of process 300, FIG. 3 may be performed, in an embodiment. FIG. 5 illustrates a wafer 510 that forms an array of apertures 520 where lenses will be fabricated. Each aperture 520 may be within an optional recess 530. Slugs 540 of a moldable material correspond to each aperture 520 and are molded to form lenses therein, as explained below. Not all of apertures 520, recesses 530 and slugs 540 are labeled in FIG. 5, for clarity of illustration.

Figure 6:
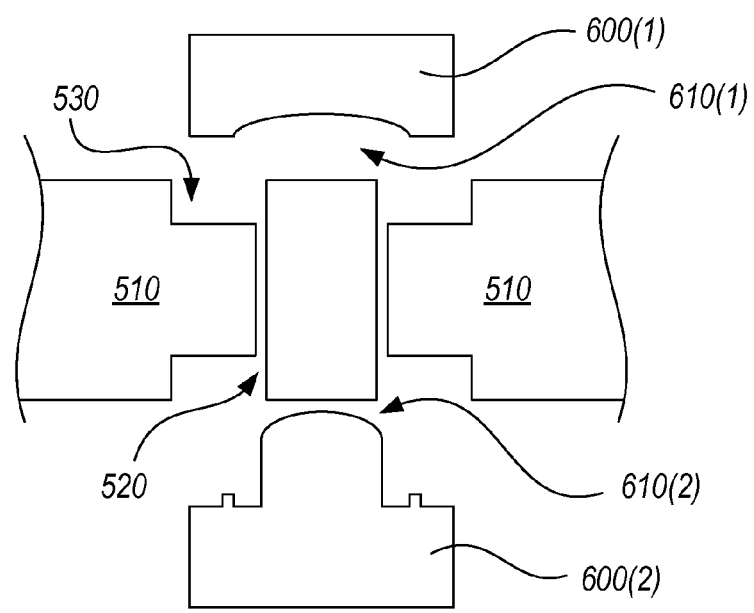
FIG. 6 shows a portion of a wafer having a single aperture that is within recesses, in an embodiment.
Figure 7:
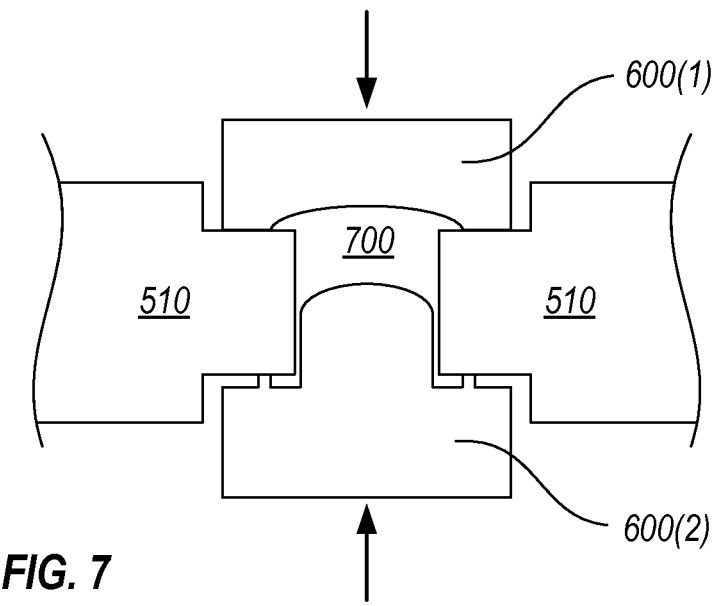
FIG. 7 shows molds and moved into position for molding about the aperture so as to mold the slug into a lens, in an embodiment.
Figure 8:
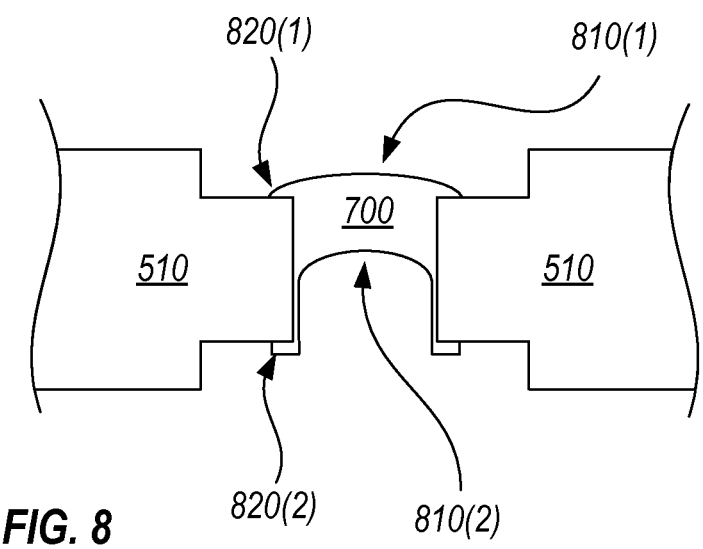
FIG. 8 shows the lens of FIG. 7 with the molds removed.

FIGS. 6 through 8 schematically illustrate how one slug 540 may be molded into one of the apertures 520 of wafer 510 to form a lens, in an embodiment. FIG. 6 shows a portion of wafer 510 having a single aperture 520 that is within recesses 530. A slug 540 is positioned within aperture 520. Molds 600(1) and 600(2) that include mold surfaces 610(1) and 610(2) are shown above and below slug 540, respectively. Mold surfaces 610(1) and 610(2) are complementary to desired surfaces of a lens to be fabricated within aperture 520. FIG. 7 shows molds 600(1) and 600(2) moved into position (e.g., in the directions shown by arrows, towards wafer 510) for molding about the aperture so as to mold the slug into a lens 700. FIG. 8 shows lens 700 with molds 600(1) and 600(2) removed. Lens 700 forms surfaces 810(1) and 810(2) that are complementary to mold surfaces 610(1) and 610(2) respectively.

Numerous variations on the process illustrated in FIGS. 5 through 8 are contemplated and/or would be considered equivalent to one skilled in the art. For example, in FIG. 8, lens 700 includes overmolded flanges 820(1) and 820(2) that may be advantageous for securing lens 700 within wafer 510. Although two overmolded flanges are shown in FIG. 8, it is contemplated that a molded lens could include only one, or no such flanges. Alternatively, wafer 510 may form recesses, flanges or protrusions that lens 700 can mold into or around, to secure the lens within the lens wafer.

In another example, instead of slugs 540, a moldable optical material may be injection molded to produce lens 700. Molds 600(1) and 600(2) may be individual molds for one surface of one lens each, or may form part of molds that simultaneously provide mold surfaces 610(1) and 610(2) for each of a plurality of lenses 700 that are concurrently fabricated in wafer 510. Surfaces 810(1) and 810(2) may be molded so as to provide their final optical surfaces, or one or more of surfaces 810(1) and 810(2) may be machined (e.g., diamond turned) to provide final optical surfaces.

Moreover, molding lenses into a wafer 510 is but one example of step 310, FIG. 3, for providing a lens wafer. Another way to provide a lens wafer includes first providing lenses, either alone or within individual lens carriers, then assembling the lenses (and carriers, if used) into the wafer. The assembly of the lenses and/or carriers into the wafer may utilize molding and/or adhesives.

Figure 9:
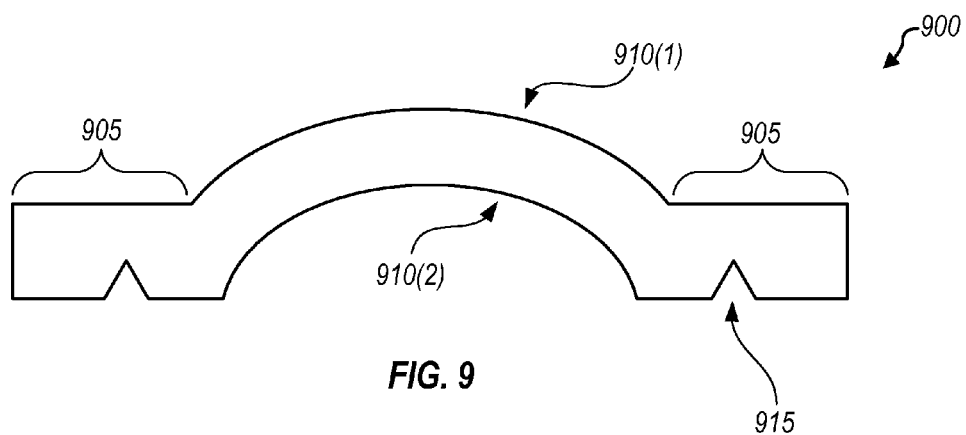
FIG. 9 is a cross-sectional view of a lens, in an embodiment.
Figure 10:
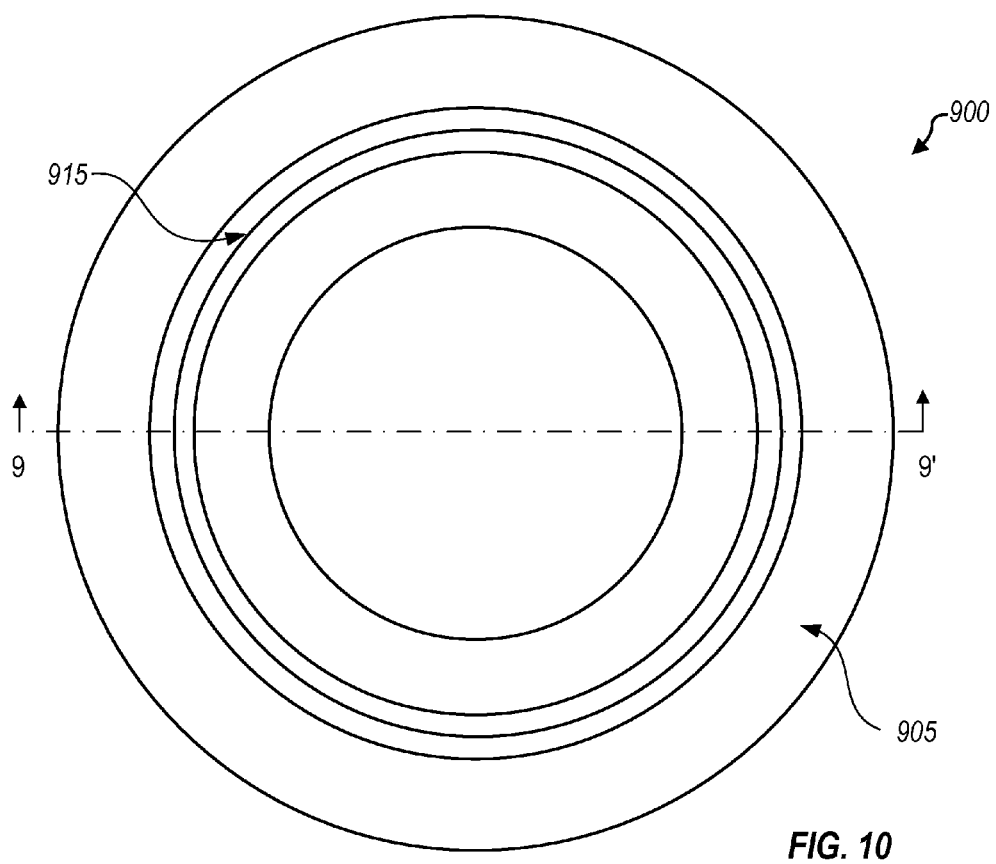
FIG. 10 is a bottom plan view looking upward through the lens of FIG. 9.

FIGS. 9 through 13 schematically illustrate a process for molding a lens carrier or a lens wafer about one or more lenses, respectively. FIGS. 9 and 10 show a lens 900 that is integrated with a circumferential assembly flange 905. FIG. 10 is a bottom plan view looking upward through lens 900, and FIG. 9 is a cross-sectional view taken at line 9-9' shown in FIG. 10. Lens 900 is for example injection molded to provide lens surfaces 910(1) and 910(2) and assembly flange 905 that includes an alignment feature 915. Alignment feature 915 is shown in FIGS. 9 and 10 as a groove, but it is contemplated that alignment feature 915 could be one or more of (a) one or more indentations, such as groove sections, or (b) protrusions, that can mate with complementary features of a lens carrier or lens wafer to align lens 900 to the respective carrier or wafer. Lens 900 and features thereof may be made by molding or machining bulk material, or by a combination of molding and machining before or after lens 900 is incorporated in a carrier or wafer. In particular, lens 900 may be molded to a shape wherein lens surfaces 910(1) and 910(2) are outside the final desired surface, such lens 900 may be incorporated into a carrier, then diamond turned to provide the final desired surface. Alignment feature 915 can also be added by machining before or after lens 900 is incorporated in a carrier or wafer, instead of being molded into lens 900.

Figure 11:
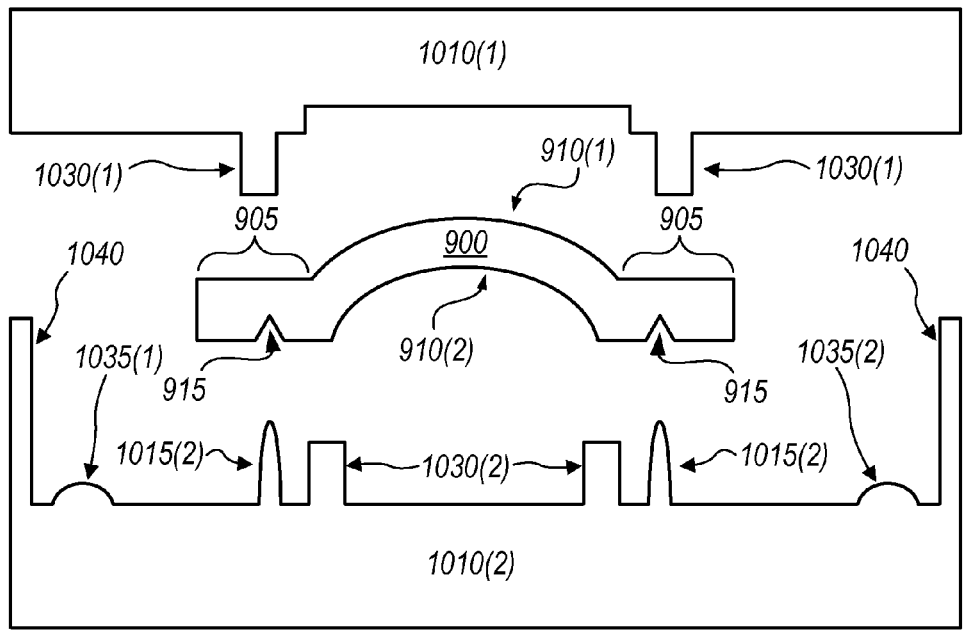
FIG. 11 shows a mold set including upper and lower molds separated from the lens of FIG. 9, in an embodiment.
Figure 12:
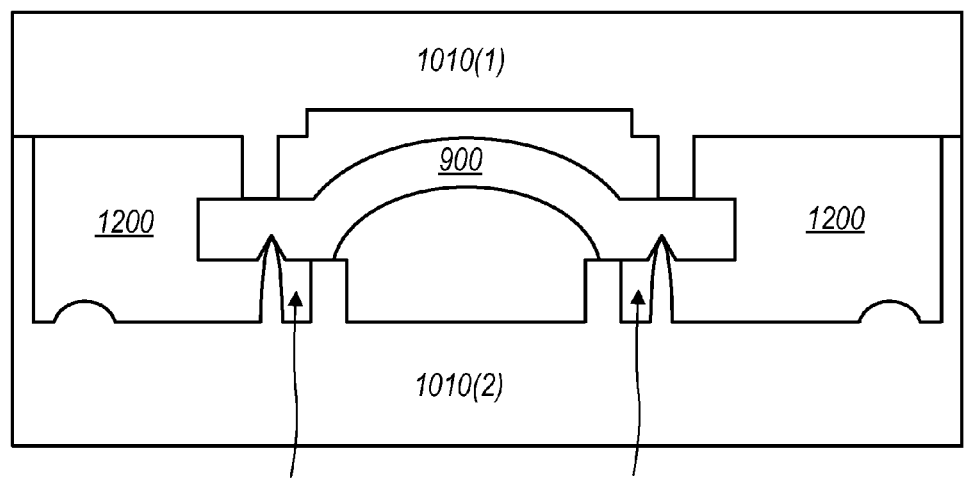
FIG. 12 shows the molds of FIG. 11 in contact with the lens of FIG. 9.

FIGS. 11 and 12 show schematic cross-sections of a mold set including upper and lower molds 1010(1) and 1010(2)

that are configured to mold base material to form a lens carrier about lens 900. FIG. 11 shows molds 1010(1) and 1010(2) separated from lens 900, while FIG. 12 shows molds 1010(1) and 1010(2) in contact with lens 900. FIG. 12 does not label individual features of molds 1010(1), 1010(2) and lens 900, for clarity of illustration. Upper mold 1010(1) includes a dam 1030(1) for contacting assembly flange 905 of lens 900 to keep molded base material away from lens surface 910(1). Lower mold 1010(2) includes a similar dam 1030(2) for contacting assembly flange 905 to keep molded base material away from lens surface 910(2), and a dam 1040 to form the outer edge of the lens carrier. A suitable base material would be injected into cavity 1200, as shown in FIG. 12 with upper and lower molds 1010(1) and 1010(2) contacting lens 900, to form the lens carrier. Lower mold 1010(2) also includes alignment features 1015(1) and 1015(2) that mate with alignment feature(s) 915 of lens 900, for precision alignment of final surfaces formed by lower mold 1010(2) relative to lens surfaces 910(1) and 910(2) of lens 900. Regions between alignment features 1015(1) and 1015(2) and dam 1030(2) are also considered portions of cavity 1200, as shown, because alignment features 1015(1) and 1015(2) may not extend fully about lens 900 (that is, alignment features 1015(1) and 1015(2) are shown for illustrative purposes in the cross-sectional plane shown in FIGS. 11 and 12, but may only exist at selected positions about a circumference of lens 900).

Lower mold 1010(2) also includes features 1035(1) and 1035(2) to provide alignment features in the lens carrier. Because alignment features 1015(1), 1015(2), 1035(1) and 1035(2) are all features of lower mold 1010(2), alignment of lens 900 to lower mold 1010(2) is sufficient to provide precision alignment of lens 900 (especially, lens surfaces 910(1) and 910(2) thereof) to known features in the finished lens carrier; that is, alignment of upper mold 1010(1) may not be as critical. However, it is contemplated that upper mold 1010(1) could also include physical alignment features for precision alignment to lens 900 (and lens 900 could include appropriate mating features therefor), or all of molds 1010(1), 1010(2) and lens 900 could include such features.

It should be clear upon reviewing and understanding FIGS. 11 and 12 that molds similar to upper and lower molds 1010(1) and 1010(2), but without dam 1040, and replicated to mold around an array of lenses, may be utilized to mold an entire lens wafer instead of a lens carrier.

Figure 13:
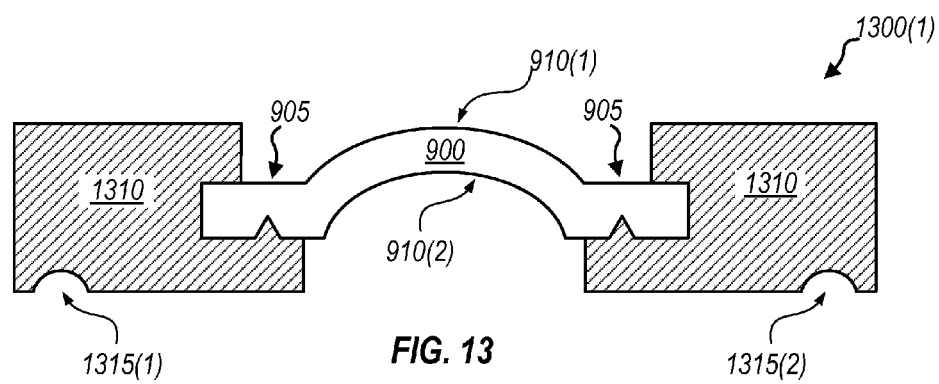
FIG. 13 is a cross-sectional view of a lens carrier produced by molding an appropriate base material around the lens of FIG. 9, using the molds of FIG. 11, in an embodiment.
Figure 14:
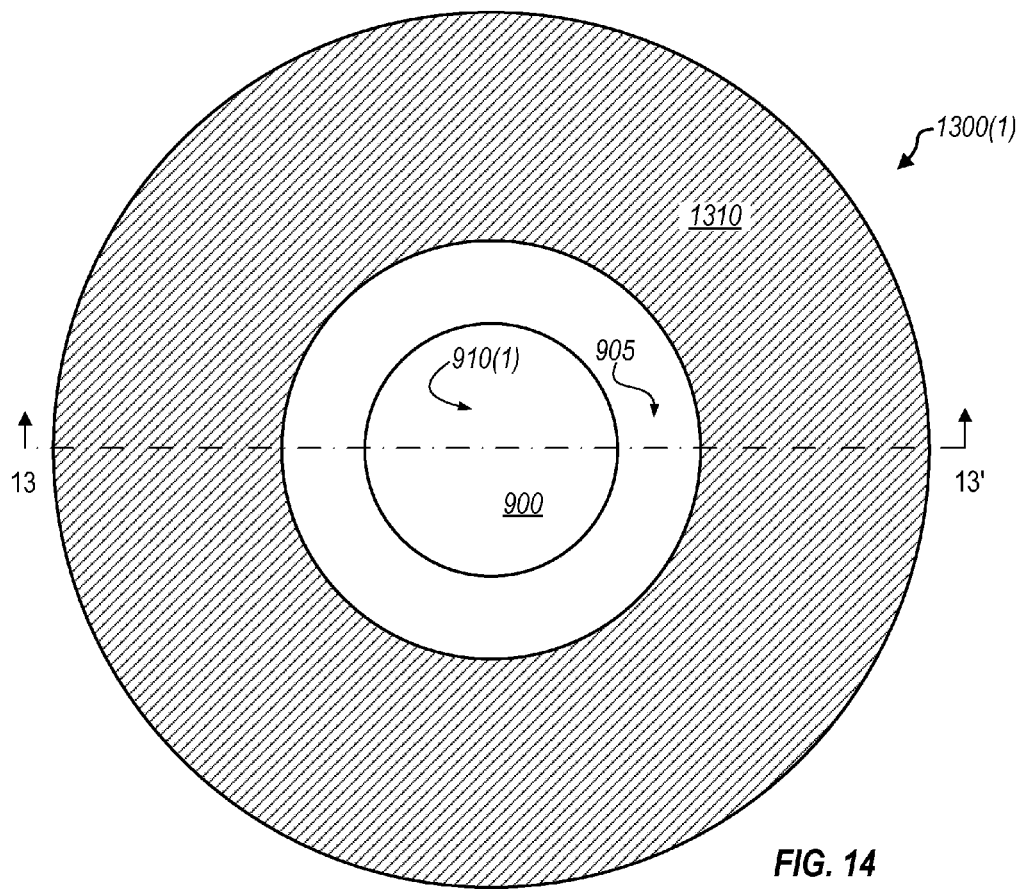
FIG. 14 is a top plan view looking downward at the lens carrier of FIG. 13.

FIGS. 13 and 14 show a schematic cross section of a lens carrier 1300 produced by molding an appropriate base material 1310 around lens 900, using upper and lower molds 1010(1) and 1010(2) as shown in FIGS. 11 and 12. FIG. 14 is a top plan view looking downward, and FIG. 13 is a cross-sectional view taken at line 13-13' shown in FIG. 14. Base material 1310 is produced by molding a moldable base material within cavity 1200, FIG. 12, including the regions shown as alignment features 1015(1) and 1015(2) in FIG. 11, because these features may only exist in selected positions about a circumference of lens 900. As shown in FIG. 13, lens carrier 1300 includes alignment features 1315(1) and 1315(2) for subsequent precision alignment within a lens wafer. Base material 1310 may be a material that absorbs at least IR radiation, so that when lens carrier 1300 or a portion thereof becomes part of a camera assembly, stray IR radiation that impinges on base material 1310 is absorbed instead of continuing to propagate through the camera. Base material 1310 may also absorb visible and/or ultraviolet ("UV") radiation. However, in some embodiments base material 1310 transmits visible and/or UV radiation, which can enhance manufacturability by facilitating cure of certain epoxies.

Figure 45:
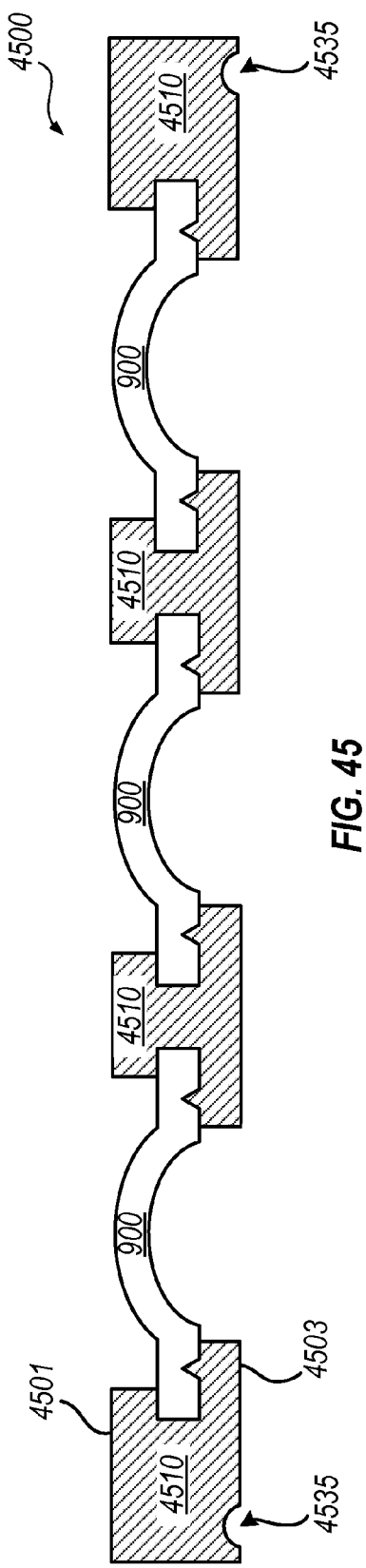
FIG. 45 depicts a schematic cross section of a lens wafer produced by molding an appropriate base material around a plurality of lenses.

FIG. 45 depicts a schematic cross section of a lens wafer 4500 produced by molding an appropriate base material 4510 around a plurality of lenses 900. Lens wafer 4500 is similar to lens carrier 1300 except that there are a plurality of lenses 900 included with wafer 4500. Base material 4510 is produced by molding a moldable base material within a cavity of a wafer mold. The wafer mold used to create lens wafer 4500 includes an upper mold and a lower mold. The upper and lower molds are similar to upper mold 1010(1) and lower mold 1010(2), respectively, however are adapted to accommodate a plurality of lenses.

Base material 4510 may be a material that absorbs at least long-wave IR radiation, so that when lens wafer 4500 or a portion thereof becomes part of a camera assembly, stray LWIR radiation that impinges on base material 4510 is absorbed instead of continuing to propagate through the camera. Base material 4510 may also absorb visible, short waver IR (SWIR), near IR (NIR), and/or ultraviolet ("UV") radiation. However, in some embodiments base material 4510 transmits visible, SWIR, NIR, and/or UV radiation, which can enhance manufacturability by facilitating cure of certain epoxies.

Lens wafer 4500 includes alignment features 4535. Alignment features 4535 are used to passively align an upper lens wafer with a lower lens wafer (as will be discussed below). Alignment features 4535 are depicted as indentations within wafer 4500. For example the indentations may be conical, concave, grooves, or any other form of indentation within wafer 4500. It will be appreciated that although indentation 4535 is illustrated on the lower surface 4501, indentation 4535 may be located on the upper surface 4503 of lens wafer 4500 without departing from the scope herein.

Figure 46:
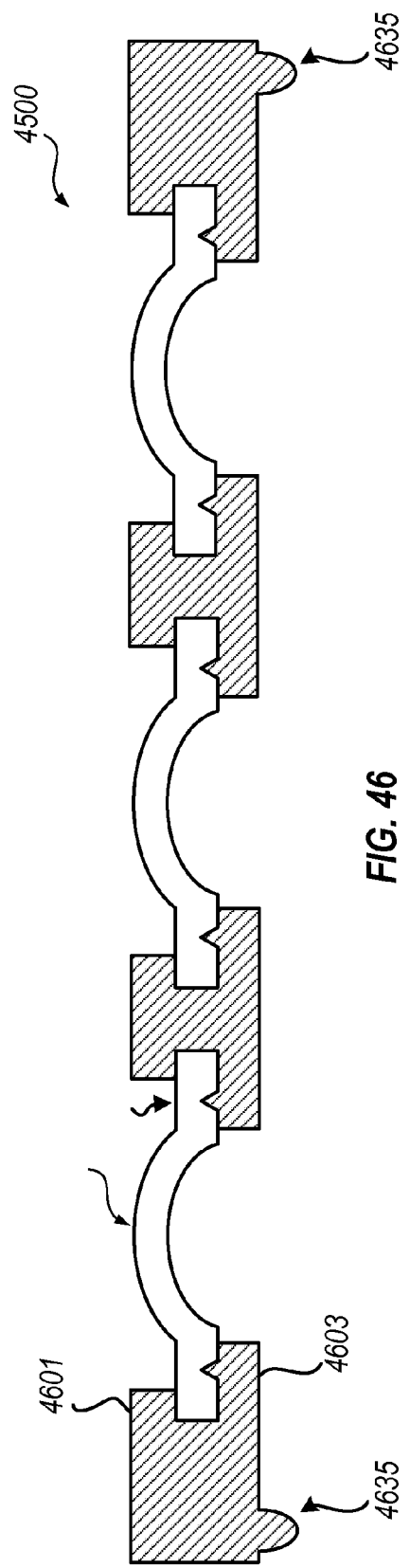
FIG. 46 depicts lens wafer including an alignment feature in the form of a protrusion.

FIG. 46 depicts lens wafer 4600 including an alignment feature in the form of a protrusion 4635. Lens wafer 4600 is similar to lens wafer 4500 except that lens wafer 4600 includes an alignment feature in the form of a protrusion 4635. Protrusion 4635 is proud of lens wafer 4600. It will be appreciated that although protrusion 4635 is illustrated on the lower surface 4601, protrusion 4635 may be located on the upper surface 4603 of lens wafer 4600 without departing from the scope herein.

In an alternate embodiment, an alignment insert may be substituted for one of the lenses within a lens wafer. FIG. 49 depicts a lens wafer 4900 including an alignment insert 4902 substituted for one of the lenses 4904. Alignment insert 4902 is illustrated having flanges 4906 (i.e. similar to flanges 905) such that base material 4910 may be molded around alignment insert 4902 similar as described above. Alignment insert 4902 is illustrated as having a concave surface. However, it will be appreciated that alignment insert 4902 may include a convex surface (i.e. as illustrated in FIG. 50.

FIG. 50 illustrates a lower lens wafer 5000 and an upper lens wafer 5000' each including alignment inserts 5002, 5002', in one embodiment. As illustrated, alignment insert 5002 is complementary to alignment insert 5002' such that lower wafer 5000 passively aligns with upper wafer 5000' via mating of the alignment inserts.

Figure 51:
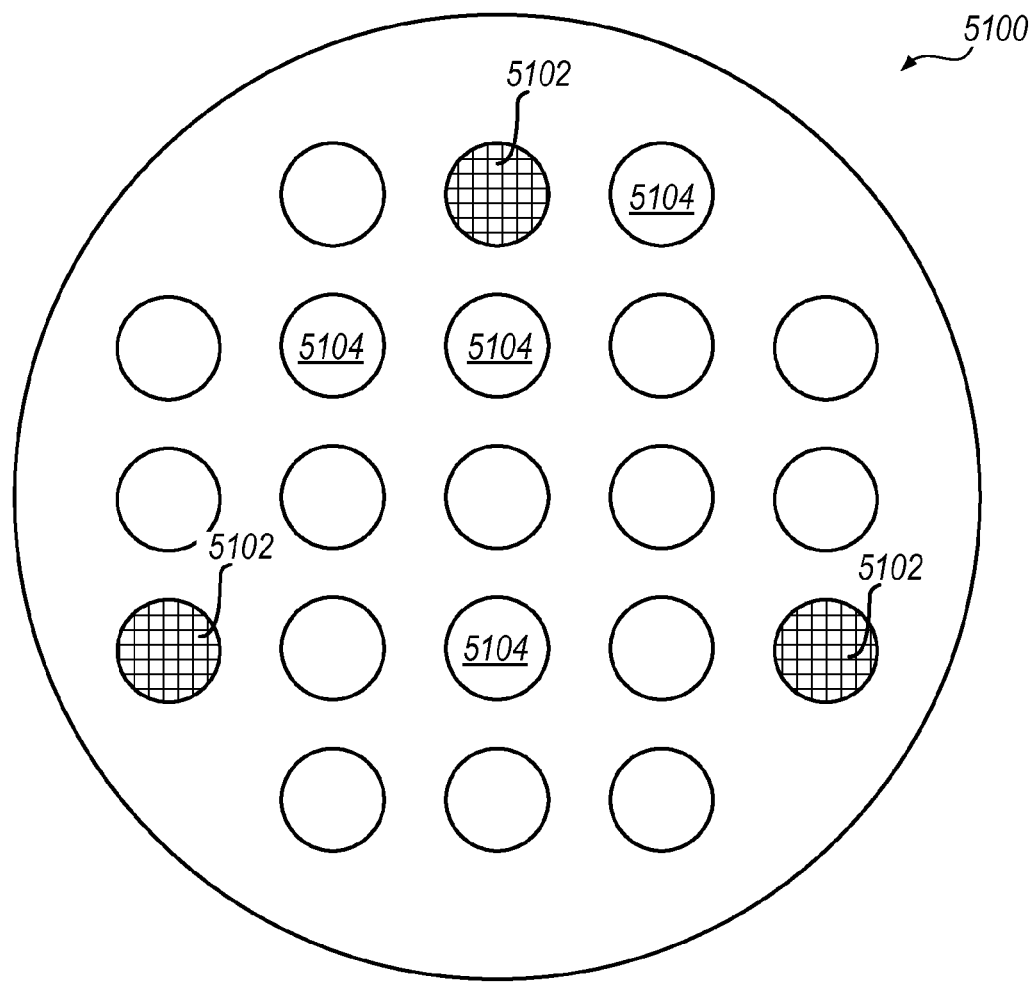
FIG. 51 illustrates a top view of a lens wafer having a plurality of lenses and a plurality of alignment inserts, in one embodiment.

FIG. 51 illustrates a top view of a lens wafer 5100 having a plurality of lenses 5104 and a plurality of alignment inserts 5102, in one embodiment. Lens wafer 5100 includes alignment inserts 5102 similar to alignment inserts 4902, 5002, 5002' discussed above. Alignment inserts 5102 are illustrated as being oriented within lens wafer 5100 to at all three vertices of an equilateral triangle such that lens wafer 5100 may be passively aligned with a second lens wafer via all six degrees of freedom. Optionally, alignment inserts may include alignment features such as an indentation or groove that aid in passive alignment using an intermediate alignment element as will be discussed below.

Figure 51A:
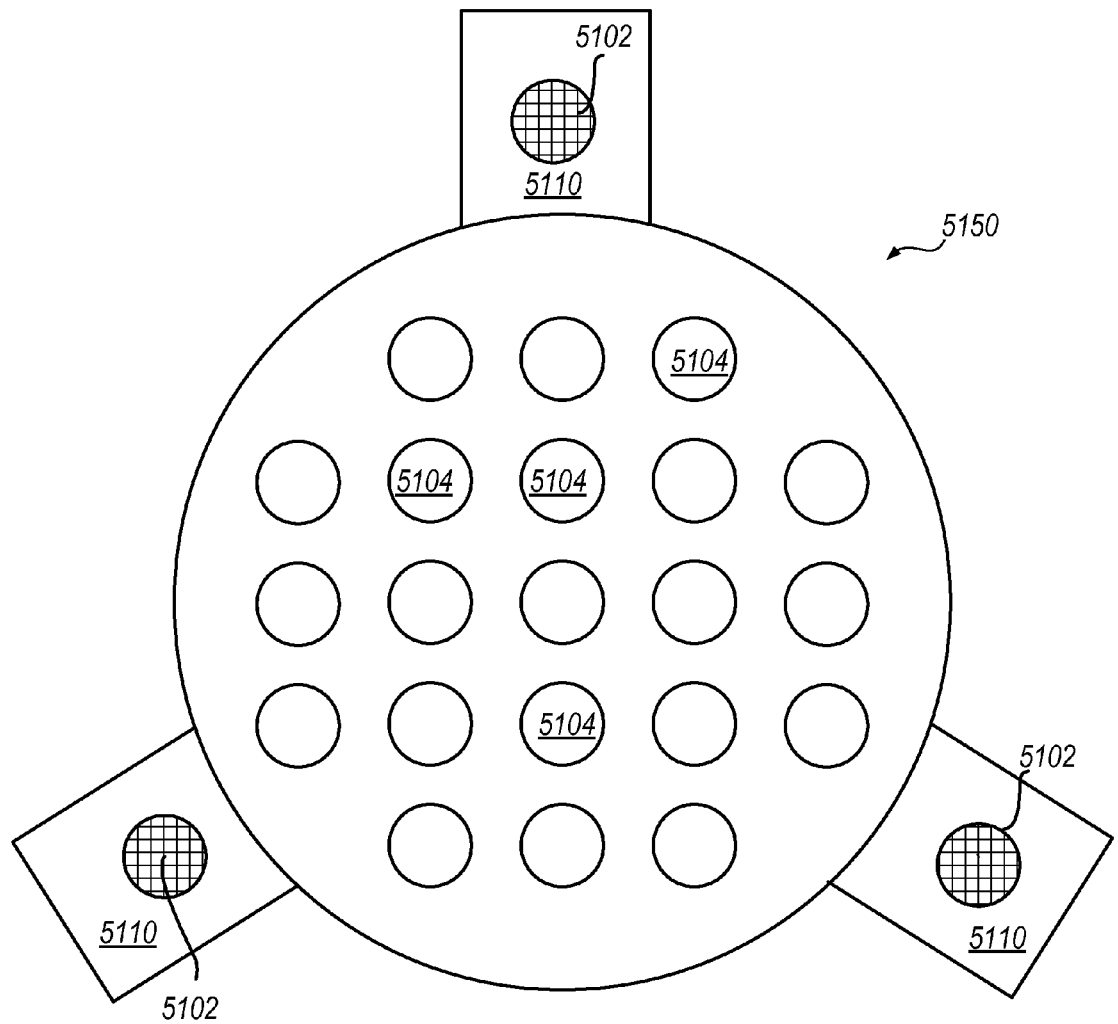
FIG. 51A illustrates a top view of a lens wafer having a plurality of lenses and a plurality of alignment inserts located on a plurality of tabs, in one embodiment.

FIG. 51A illustrates a top view of a lens wafer 5150 having a plurality of lenses 5104 and a plurality of alignment inserts 5102 located on a plurality of tabs 5110. Tabs 5110 are located away from the primary array of lenses 5104 such that lenses 5104 need not be substituted for alignment inserts 5102. Although tabs 5110 are illustrated as rectangular, it is appreciated that the tabs 5110 are not limited in scope and may be any shape, size or form without departing from the scope herein.

Figure 15:
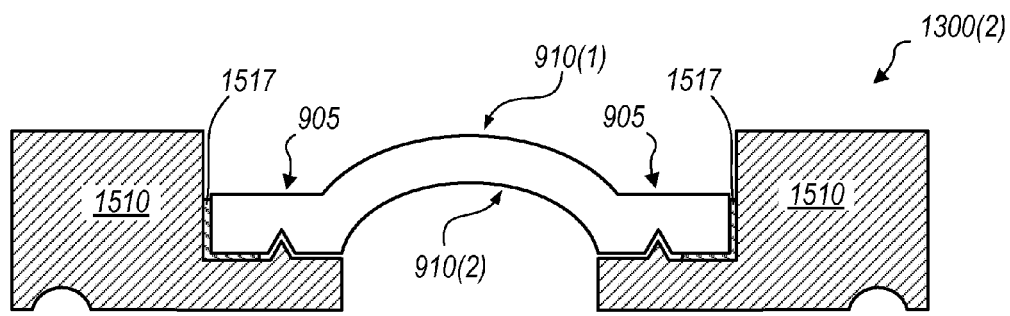
FIG. 15 schematically illustrates a lens carrier produced by mounting the lens of FIG. 9 to a lens carrier blank, in an embodiment.

FIG. 15 schematically illustrates a lens carrier 1300(2) produced by mounting lens 900 to a lens carrier blank 1510 utilizing an adhesive 1517. Lens carrier blank 1510 may be made of a base material such as metal (e.g., aluminum) that is not necessarily moldable under conditions that lens 900 would survive. Lens carrier blank 1510 may be made for example by casting or by machining metal bar stock, and includes features for aligning lens 900 and for later aligning completed lens carrier 1300(2) to a lens wafer. Adhesive 1517 may be for example epoxy that is curable by applying visible or UV radiation; when such a curable epoxy is utilized, it may be advantageous to form lens carrier 1300(2) of a material that is transparent to the wavelength of radiation utilized to cure the epoxy. The amount and location of adhesive 1517 is exemplary; other embodiments of a lens carrier may utilize different amounts or placement of such adhesive. Alternatively, lens 900 may simply be press-fit into lens carrier blank 1510 to form completed lens carrier 1300(2) without any adhesive.

Figure 16:
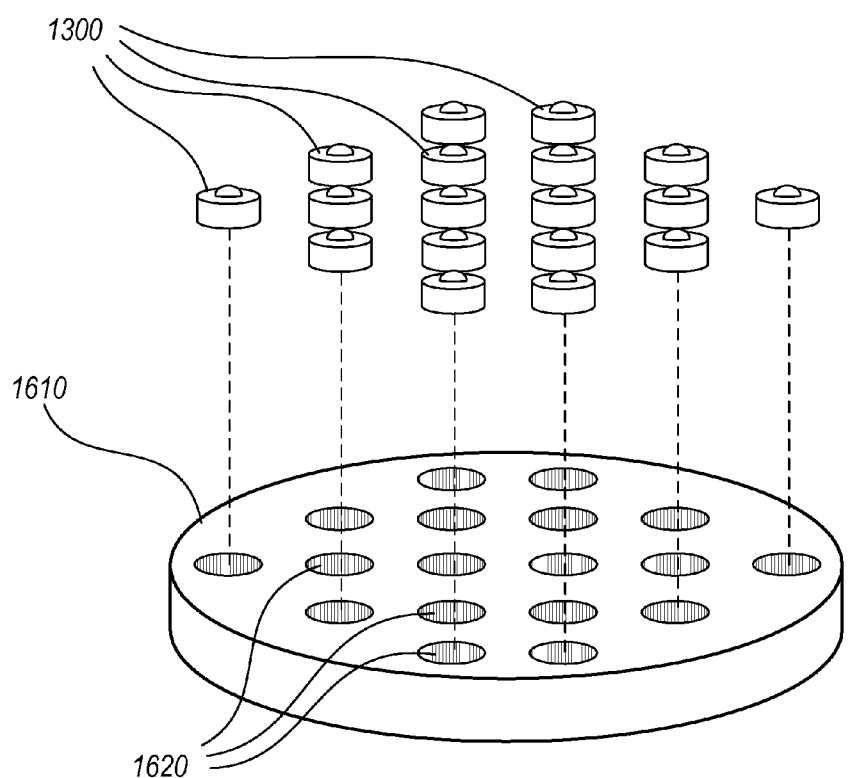
FIG. 16 schematically illustrates a wafer that forms an array of apertures for integration of lens carriers therein, in an embodiment.

FIG. 16 schematically illustrates a wafer 1610 that forms an array of apertures 1620 for integration of lens carriers 1300 therein. Lens carriers 1300 (e.g., either of lens carriers 1300(1), 1300(2) or equivalents thereof) correspond to each aperture 1620 and are mounted therein utilizing any one or combination of mechanical fit, adhesives (such as epoxy), welding, soldering, and/or mating mechanical features associated with the lens carriers and the apertures. Not all of apertures 1620 and lens carriers 1300 are labeled in FIG. 16, for clarity of illustration.

FIG. 52 depicts a schematic cross section of a lens wafer 5200 including a plurality of apertures 5202 within base material 5210 for receiving lenses 5204. Lenses 5204 are aligned via an alignment jig (as discussed below) to insure proper alignment of the lenses when a plurality of lens wafers 5200 are aligned (as discussed below). Lenses 5204 are placed within apertures 5202. In one embodiment, as illustrated in FIG. 53, one or more of lenses 5202 may be substituted with an alignment insert 5300. Alignment insert 5300 may be similar to alignment inserts 4902, 5002, 5002' without flanges 4906. Alignment insert 5300 is illustrated having a surface that is shaped substantially similar to the surface of lens 5204 such that alignment insert 5300 may be aligned via an alignment jig. However, it will be appreciated that alignment insert may have any shape, size or form.

The plurality of lenses 5204 and the alignment insert 5300 may for example be aligned flush with the wafer by placing the wafer, lenses and insert on a planar surface 5302. For example, the wafer, lenses 5204 and/or inserts 5300 may align flush via a planar surface 5302 comprising a granite slab. Alignment insert 5300 is illustrating having substantially the same dimensions as lens 5204. However, alignment insert 5300 may have a greater thickness than lenses 5204 such that the alignment insert is proud of the bottom surface 5304 of the wafer.

Figure 54:
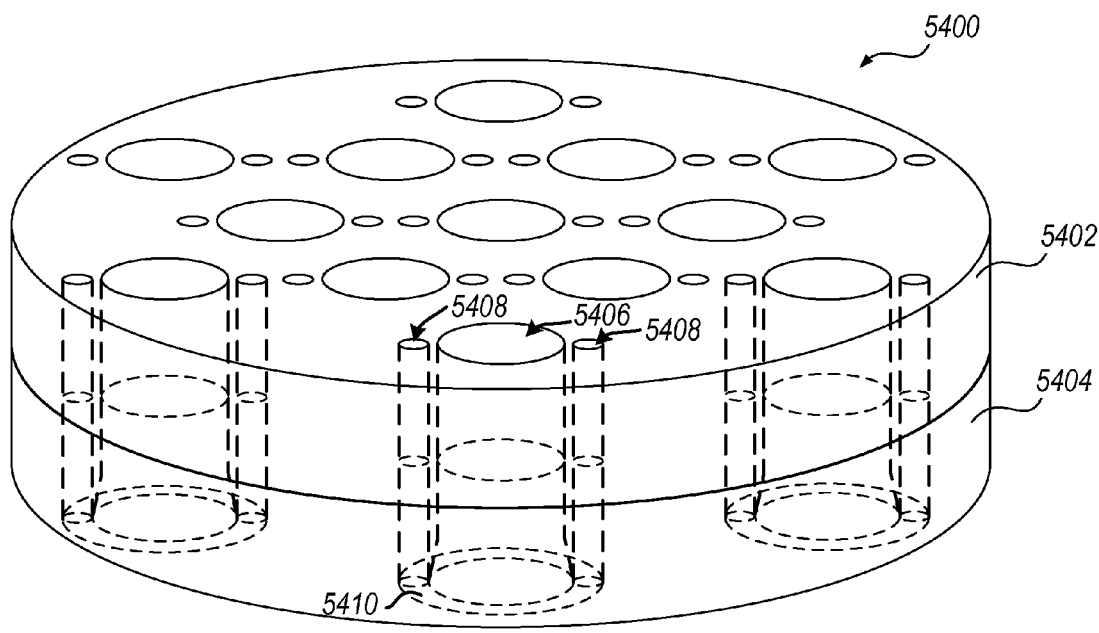
FIG. 54 depicts an exemplary perspective view of an alignment jig for aligning a plurality of lenses within a lens wafer, in one embodiment.
Figure 55:
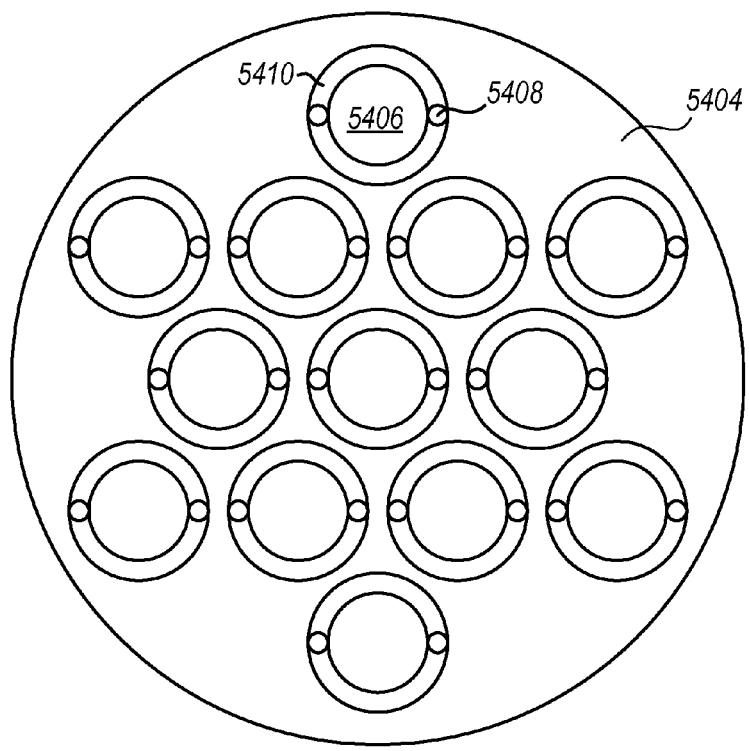
FIG. 55 depicts an exemplary bottom view of the alignment jig of FIG. 54.

FIG. 54 depicts an exemplary perspective view of an alignment jig 5400 for aligning a plurality of lenses within a lens wafer, in one embodiment. FIG. 55 depicts an exemplary bottom view of the alignment jig 5400 of FIG. 54. For example, alignment jig 5400 may be used to align a plurality of lenses 5204, and/or alignment inserts 5300, within lens wafer 5200.

Alignment jig 5400 includes a base portion 5402 and a lens alignment portion 5404. Base portion 5402 is for example made of metal (i.e. aluminum). Base portion 5402 is coupled (i.e. bonded, glued, bolted, or any other form of coupling) to lens alignment portion 5404. Lens alignment portion 5404 is then optionally machined such that the bottom surface of lens alignment portion 5404 is flat.

Lens alignment portion 5404 is for example comprised of a material that will not scratch the lenses. For example, lens alignment portion 5404 is made from a plastic (i.e. polyoxymethylene, aka delrin), acetal or similar material such that when lens alignment portion 5404 is in contact with lenses, the lens may shift without scratching the lens.

Alignment jig 5400 includes a plurality of lens apertures 5406. Lens apertures 5406 may extend completely there through alignment jig 5400. Optionally, lens apertures 5406 extend only partially through lens alignment portion 5404. As illustrated in FIG. 56, lens apertures 5406 are tapered such that they have a larger diameter at the bottom surface of lens alignment portion 5404 than at the upper surface of base portion 5402. Each lens aperture 5406 includes an associated conduit 5408 for applying bonding material to couple the lens to the lens wafer. For example, bonding material flows through conduit 5408 and surrounds the lens as it flows around bonding channel 5410. Lens apertures 5604 prevent bonding material from obstructing the optical surface of the lens because they form a dam on the surface of the lens. For example, bonding channel 5410 is a groove or channel that surrounds lens aperture 5406. One or more of lens aperture 5406, conduit 5408 and channel 5410 may be precision machined after base portion 5202 and lens alignment portion 5404 are coupled together.

FIG. 56 depicts an exemplary cross section of the alignment jig 5400, of FIGS. 54-55 aligning a plurality of lenses 5602 within a prefabricated lens wafer 5600. As illustrated, base portion 5402 and lens alignment portion 5404 may be coupled via a bolt 5650, for example. When alignment jig 5400 contacts lenses 5602, lenses 5602 shift within apertures 5604 of lens wafer 5600. Apertures 5604 are similar to apertures 5202 for example. While lenses 5602 are aligned within each respective aperture, bonding material 5608 is placed around each lens 5602 via conduit 5408. The amount of bonding material 5608 used depends on each particular application. Lenses 5602 are then secured within apertures 5604 and aligned such that a plurality of lens wafers 5600 may be aligned as discussed below. FIG. 57 depicts lens wafer 5600 after lenses 5602 are bonded in place.

Figure 56B:
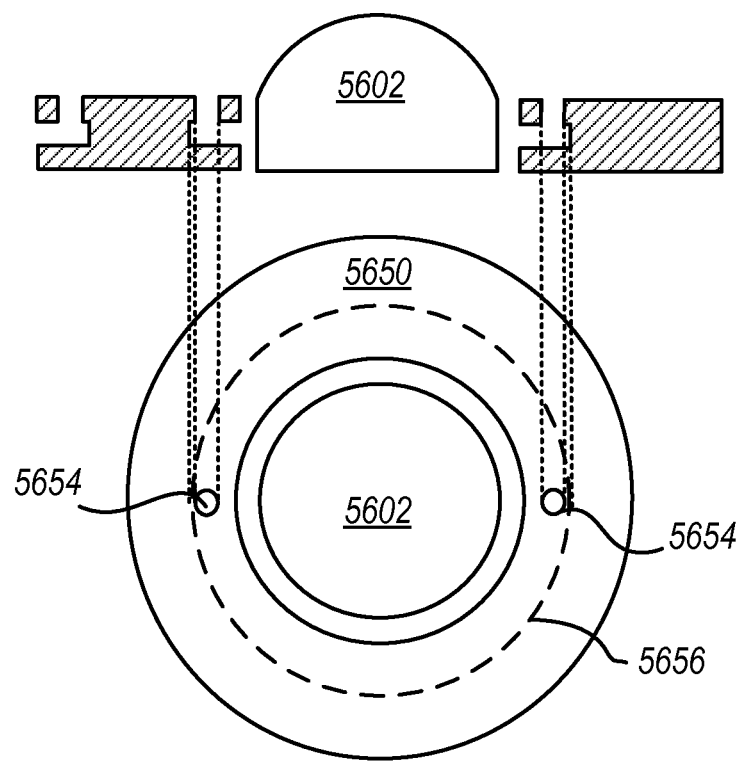
FIG. 56B is a top view of one of the lenses located within lens wafer of FIG. 56A.

FIG. 56A depicts an exemplary cross section of the alignment jig 5400, of FIGS. 54-55 aligning a plurality of lenses 5602 within a prefabricated lens wafer 5650 having a plurality of bonding holes 5654 and bonding grooves 5656. For example, bonding holes 5654 correspond to conduits 5408 such that bonding material 5608 flows directly into bonding grooves 5656. Accordingly, bonding material is less likely to obscure a portion of the surface of lens 5602. FIG. 56B is a top view of one of the lenses 5602 located within lens wafer 5650 of FIG. 56A. As illustrated, there are two bonding holes 5654 that supply bonding material 5608 from conduits 5408 into bonding grooves 5656. Bonding grooves 5656 are below the surface of wafer 5650 such that the bonding material does not obscure the surface of lens 5602. Further, bonding grooves 5656 may completely surround lens 5602, as indicated by the dashed line within FIG. 56B, such that the lens is entirely bonded to wafer 5650. FIG. 57A depicts lens wafer 5650, of FIGS. 56A-56B after lenses 5602 are secured into place.

Figure 58:
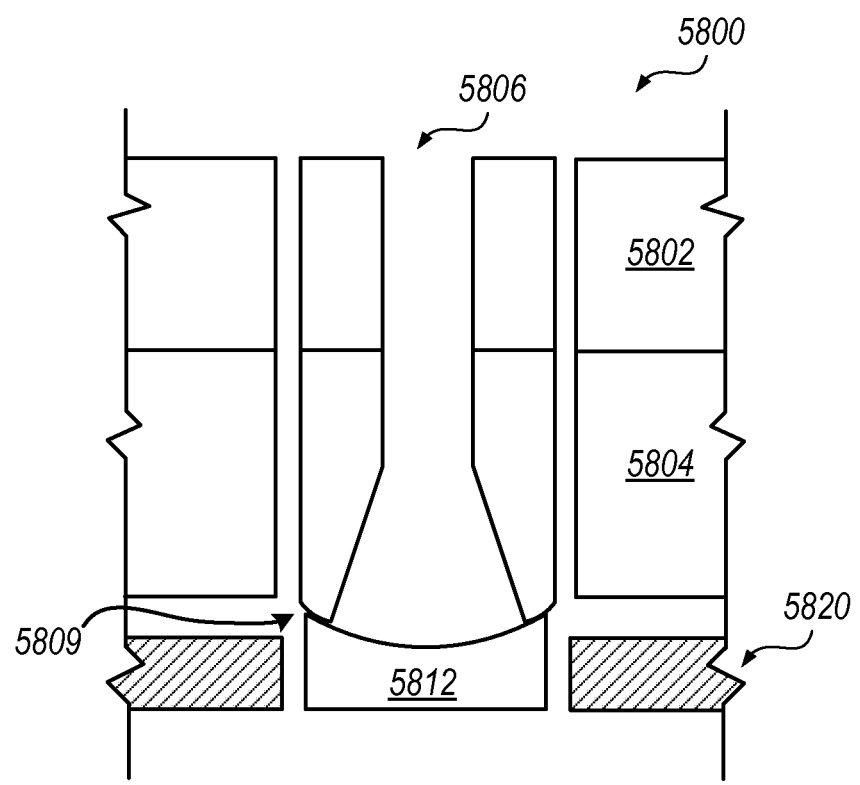
FIG. 58 depicts an exemplary portion of a cross section view of an alignment jig for aligning concave lenses within a lens wafer, in one embodiment.

FIG. 58 depicts an exemplary portion of a cross section view of an alignment jig 5800 for aligning concave lenses 5812 within a lens wafer 5820, in one embodiment. Alignment jig 5400 is shown aligning convex lenses 5200. However, alignment jig 5400 may be adapted such lens alignment portion 5804 includes a protrusion 5809 approximate lens aperture 5806 such that concave lenses 5812 are properly aligned. Protrusion 5809 may be complimentary to the concave surface of lens 5812 such that lens 5812 is properly aligned.

Figure 17:
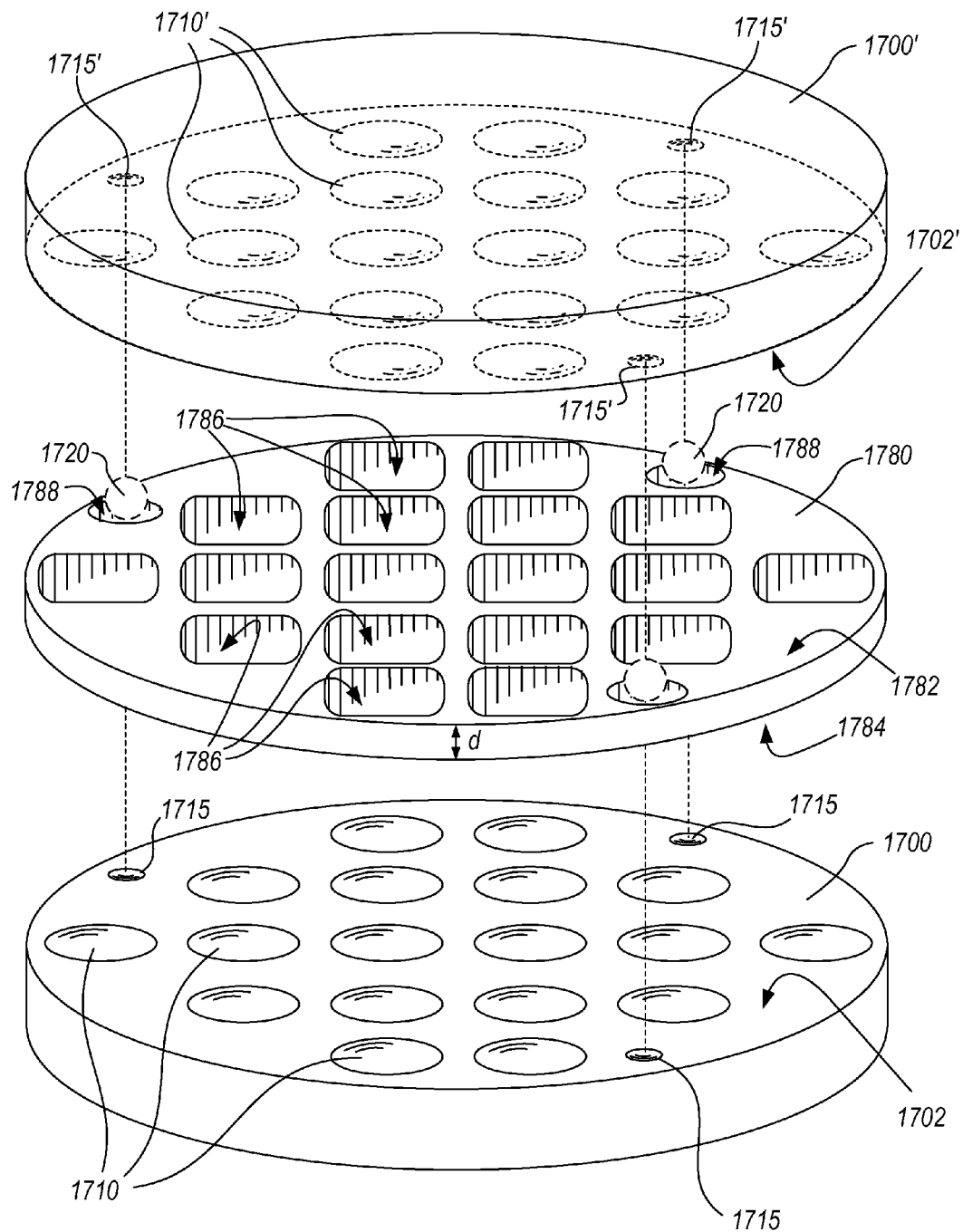
FIG. 17 is an exploded view that schematically illustrates integration of two lens wafers with a spacer wafer, in an embodiment.

FIG. 17 is an exploded view that schematically illustrates integration of two lens wafers 1700, 1700' with a spacer wafer 1780, as in step 330 of process 300, FIG. 3. Lens wafers 1700, 1700' are populated with lenses 1710, 1710' respectively and may be fabricated as described in connection with FIGS. 5 through 8 or FIGS. 9 through 16, in embodiments. Alternatively, either of lens wafers 1700, 1700' may be entirely molded and/or machined out of a single piece of a suitable optical material. Fabricating an entire lens wafer from optical material consumes more of the optical material itself, which may be costly, and can reduce the opportunity to utilize a base material that absorbs stray radiation, as noted above. Lens wafer 1700 has at least a substantially planar upper surface 1702 and lens wafer 1700' has at least a substantially planar lower surface 1702', except for respective alignment features 1715 and 1715', discussed below.

Spacer wafer 1780 has substantially planar, counterfacing surfaces 1782 and 1784, separated by a thickness d. Apertures 1786 are shown in FIG. 17 and are usually formed in spacer wafer 1780 for mechanical clearance for lenses 1710, 1710', and/or to allow IR (and/or visible radiation) to pass without refraction or absorption between lenses 1710 and 1710'. Apertures 1786 may be omitted if spacer wafer 1780 is formed of an IR (and/or visible radiation) transparent material, if mechanical clearance is not needed and if refraction by spacer wafer 1780 is included in the optical prescription of imaging optics thus formed. Apertures 1786 are shown as rounded rectangles in FIG. 17, but may be of other shapes such as circles that are matched to an optically active area of the imaging optics. Spacer wafer 1780 may be formed for example of metal (e.g., aluminum, steel, titanium, brass, copper or alloys thereof), plastic, ceramic or composite materials that may be selected on the basis of mechanical strength, coefficient of thermal expansion, and/or absorptivity with respect to LWIR or visible radiation (e.g., to absorb stray radiation, as discussed above). Optionally, spacer wafer 1780 may be transparent to visible, SWIR, NIR, or UV radiation without departing from the scope herein.

Lens wafers 1700, 1700' also include alignment features 1715, 1715' that are utilized for passive alignment to one another, as discussed below. Also shown in FIG. 17 are optional intermediate alignment elements 1720. Spacer wafer 1780 forms apertures 1788 that correspond with alignment elements 1720, allowing alignment elements 1720 to contact both alignment features 1715 and 1715'. Apertures 1788 are large enough to provide clearance around alignment elements 1720 such that spacer wafer 1780 remains free to move somewhat in the planes defined by the upper and lower surfaces of the spacer wafer. (Not all of lenses 1710, 1710', apertures 1786, 1788 or alignment features 1715, 1715' are labeled in FIG. 17, for clarity of illustration.) The clearance of apertures 1788 relative to alignment elements 1720 avoids overconstraining alignment elements 1720, so that alignment elements 1720 align solely with alignment features 1715, 1715', yet constrains alignment of spacer wafer 1780 so that the material of spacer wafer 1780 around each aperture 1786 can be utilized as an aperture stop in a resulting lens assembly or camera. For example, alignment features 1715, 1715' may be conical or spherical indentations in lens wafers 1700, 1700' respectively, and intermediate alignment elements 1720 may be spheres such as precision ball bearings. In another embodiment, alignment features 1715, 1715' may be oval or oblong features that provide additional degrees of freedom for alignment elements 1720, as discussed below in connection with FIG. 18.

Figure 47:
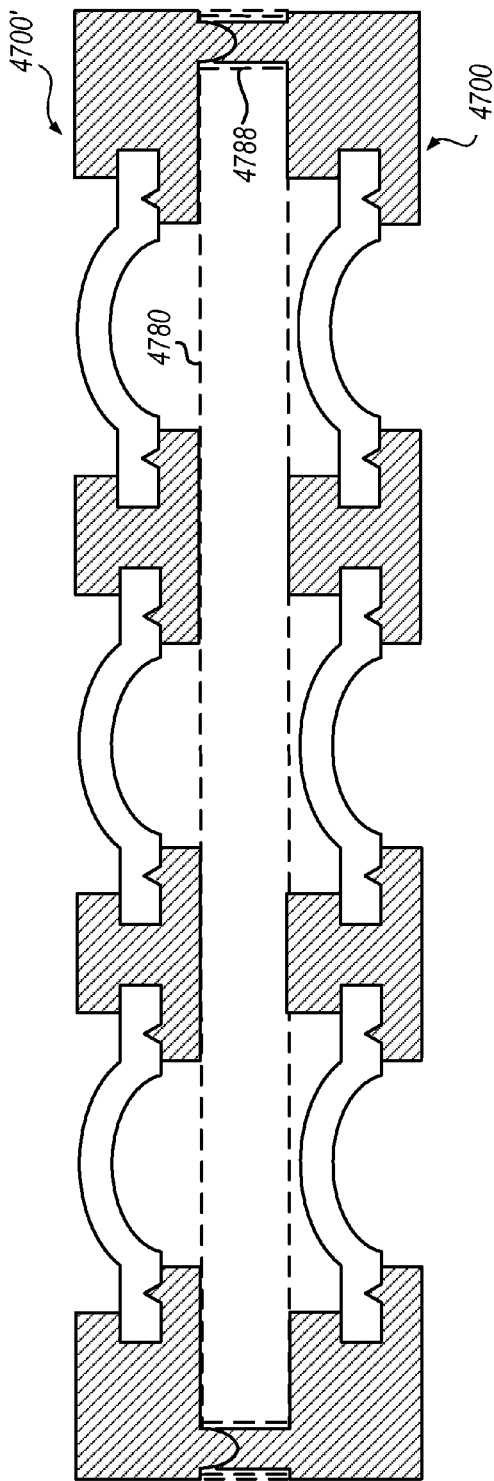
FIG. 47 depicts a schematic cross section of lens wafers and optional spacer wafer that are passively aligned via alignment features that protrude substantially from their respective surfaces through apertures and mate directly with each other.
Figure 48:
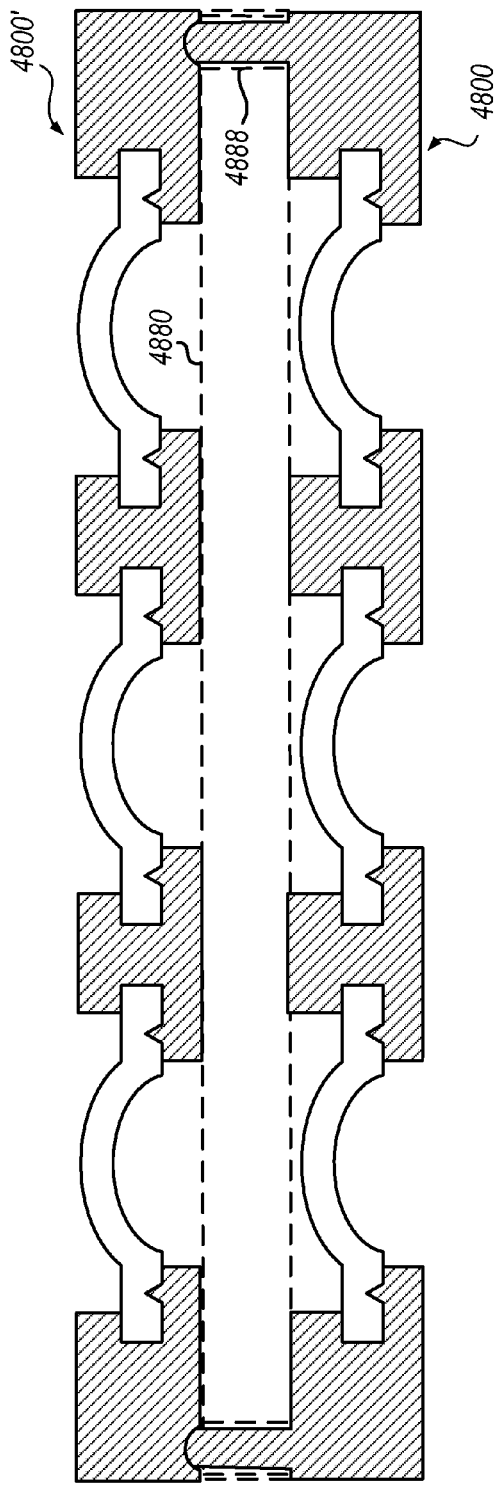
FIG. 48 depicts a schematic cross section of lens wafers and optional spacer wafer that are passively aligned via alignment features.

In still other embodiments, intermediate alignment elements 1720 are not present, and alignment features 1715 and/or 1715' protrude substantially from their respective surfaces through apertures 1788 and mate directly with each other. Alignment features 1715, 1715' may be formed in lens wafers 1700, 1700' by machining, molding, etching, or printing, for example. FIG. 47 depicts a schematic cross section of lens wafers 4700, 4700' and optional spacer wafer 4780 that are passively aligned via alignment features 4715, 4715' that protrude substantially from their respective surfaces through apertures 4788 and mate directly with each other. FIG. 48 depicts a schematic cross section of lens wafers 4800, 4800' and optional spacer wafer 4880 that are passively aligned via alignment features 4815, 4815'. Alignment feature 4815 of lower wafer 4800 is for example a protrusion (i.e. similar to protrusion 4635) from the surface of lower wafer 4800. Alignment feature 4815', of upper wafer 4800' is an indentation (i.e. similar to indentation 4535) within the surface of upper wafer 4800'. Lower and upper wafers 4800, 4800', respectively, passively align via alignment feature 4815 being inserted through alignment aperture 4888 and integrating with alignment feature 4815'.

When lens wafers 1700, 1700' are assembled with spherical alignment elements 1720 and spacer wafer 1780, lens wafer 1700' will naturally settle into precise alignment with lens wafer 1700 without the use of an active alignment step (e.g., using a mask aligner or other positioning device). When the opposing surfaces of lens wafers 1700, 1700' are perfectly planar, intermediate alignment elements 1720 are perfectly spherical, and three each of alignment features 1715, 1715' with diameters that match alignment elements 1720 are formed in an equilateral triangle in lens wafers 1700, 1700', the lens wafers will be perfectly positioned and constrained in all six degrees of freedom. Adhesives or localized bonding techniques (e.g., localized welding or soldering, performed on the stacked wafers as a unit or repeated for each of the lens and spacer sets formed by the wafers) are utilized to bond lens wafers 1700, 1700' with spacer wafer 1780 such that the alignment of lens wafers 1700, 1700' remains precise across all of the lens and spacer sets thus formed.

It should also be noted that dimensions of alignment features 1715, 1715' and/or a size of intermediate alignment elements 1720 set a spacing between lens wafers 1700, 1700' that is at least thickness d of spacer wafer 1780, and which spacing may exceed thickness d. This allows for application of an adhesive (e.g., epoxy) between base lens wafer 1700 and spacer wafer 1780, and between spacer wafer 1780 and upper lens wafer 1700'. In this manner, each set of elements (a lens in each of lens wafers 1700, 1700' and a portion of spacer wafer 1780) are bonded and can be diced with the spacing intact. Other attachment means (e.g., local welding, soldering) may also be utilized.

Figure 18:
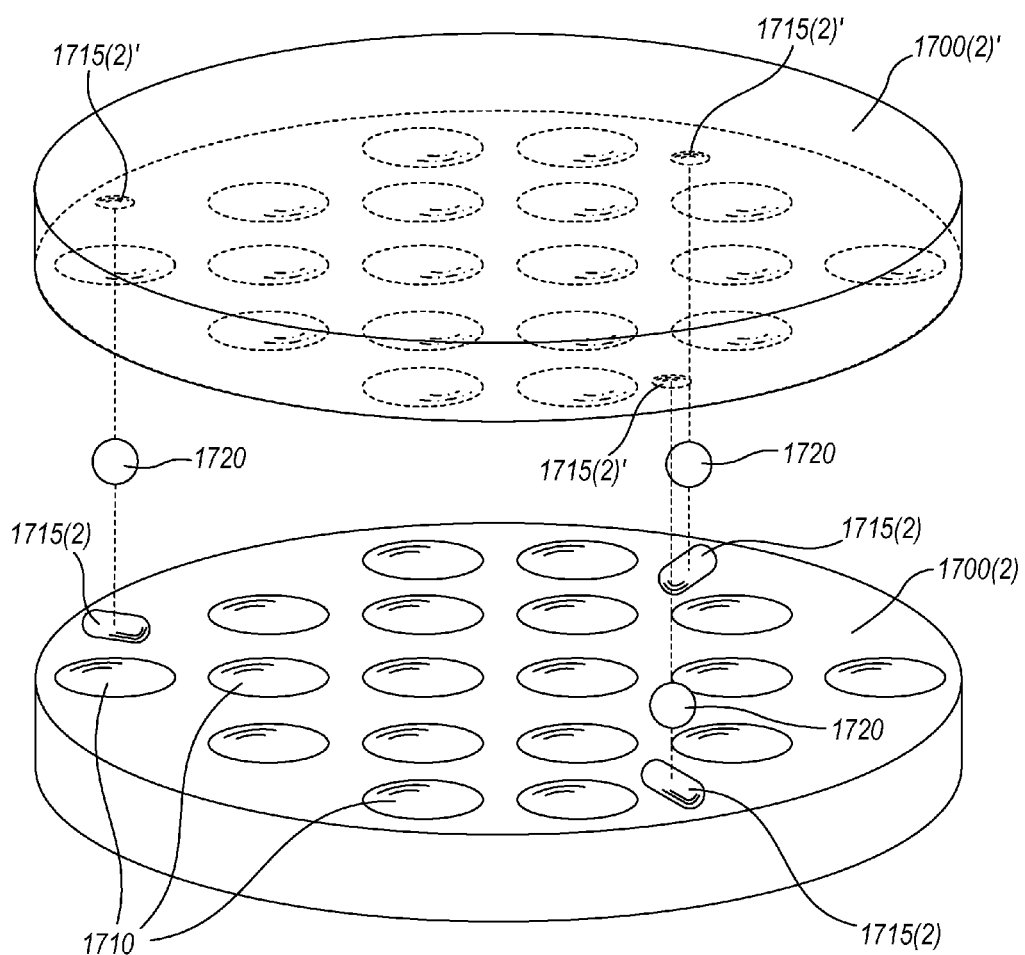
FIG. 18 is an exploded view that schematically illustrates integration of two lens wafers, in an embodiment.

FIG. 18 is an exploded view that schematically illustrates integration of two lens wafers 1700(2), 1700(2)', also as in step 330 of process 300, FIG. 3, but without showing a spacer wafer, for clarity of illustration. Lens wafers 1700(2), 1700(2)' are populated with lenses 1710, 1710' respectively and may be fabricated as described in connection with FIGS. 5 through 8 or FIGS. 9 through 16, or may be entirely molded and/or machined out of a single piece of a suitable optical material, in embodiments. Lens wafers 1700(2), 1700(2)' are similar to lens wafers 1700, 1700' except for alignment features 1715(2) and 1715(2)' formed therein, respectively. Alignment features 1715(2) formed in lens wafer 1700(2) are shown as grooves that are radial with respect to the center of lens wafer 1700(2), and are matched in width to intermediate alignment elements 1720. Alignment features 1715(2)' formed in lens wafer 1700(2)' are shown as semispherical depressions like alignment features 1715'. Since alignment features 1715(2) have a width that matches intermediate alignment elements 1720 but with a length that allows for some motion, lens wafer 1700(2) can be brought into and remain in rotational alignment with lens wafer 1700(2)' with some room for expansion and/or contraction of either of the lens wafers. This can be advantageous for testing individual pairs of lenses 1710, 1710' in wafer form, which is often more economical than testing individual units. For example, as is known in semiconductor fabrication, testing in wafer form can often be done on a sample basis to statistically verify the performance of tested units without testing each one. Such testing can also be done across lens wafers 1700(2), 1700(2)' at various temperatures to verify an exact temperature to which the lens wafers should be brought when they are joined to form a plurality of lens stacks that will later be singulated into individual lens stacks.

Although alignment features 1715(2) are shown as radial grooves that allow expansion and alignment features 1715(2)' are shown as semispherical depressions that fix positions of intermediate alignment elements 1720, it is appreciated that these features may vary. In particular, an upper wafer may include grooves while a lower element may contain depressions, or alignment features 1715(2) and 1715(2)' may be designed to cooperate with each other directly rather than utilizing intermediate alignment elements 1720. For example, alignment elements 1715(2) may be grooves as illustrated in FIG. 18, with alignment elements 1715(2)' being semispherical or conical protrusions.

Figure 19:
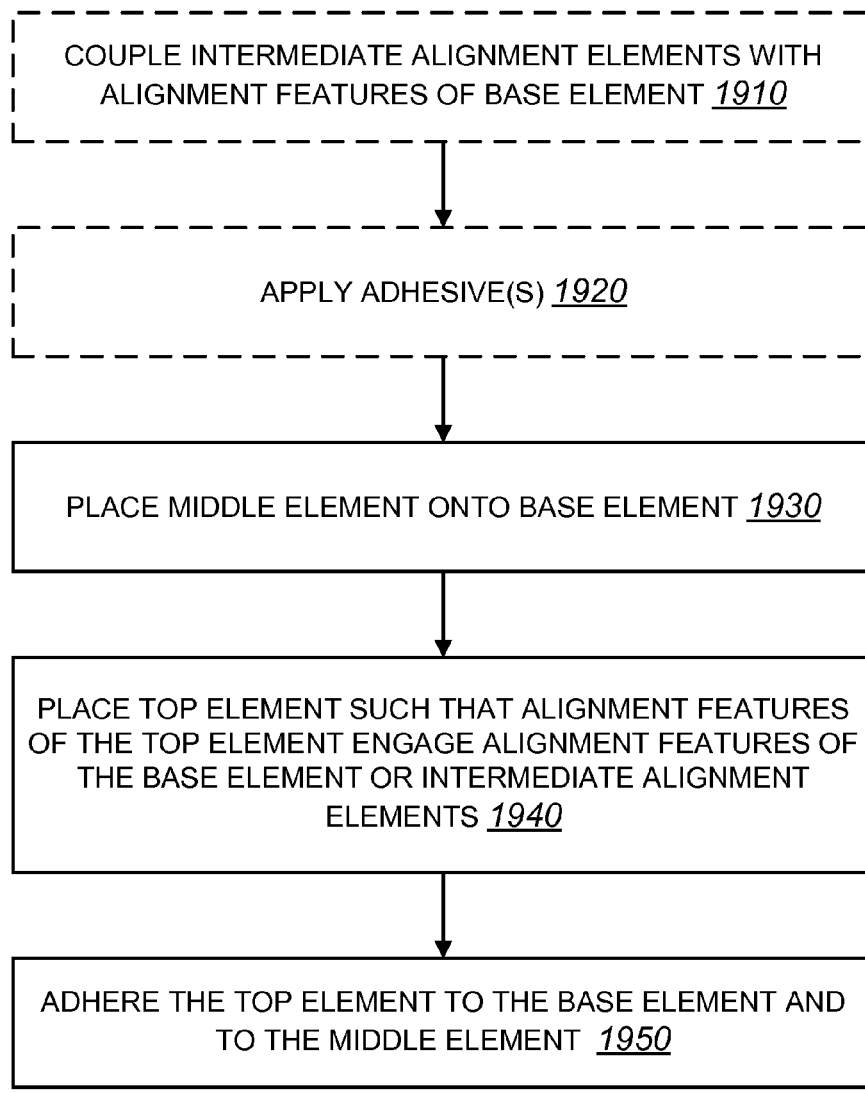
FIG. 19 is a flowchart for a method of aligning and bonding two elements, such as two lens wafers in an IR camera, with each other and with a spacer wafer, in an embodiment.

FIG. 19 is a flowchart for a method 1900 of aligning and bonding two elements, such as two lens wafers in an IR camera, with each other and with a spacer wafer, as shown in FIG. 17. Method 1900 may be utilized for example as step 330 of process 300, FIG. 3. An optional step 1910 can for example utilize lens wafer 1700 as a base element, and couple intermediate alignment elements 1720 with alignment features 1715 of lens wafer 1700. An optional step 1920 applies one or more adhesives to the base, middle, and/or upper elements. In an embodiment, an adhesive is applied to the base and/or middle element so that they adhere when they come into contact. In another embodiment, the adhesive is curable and is applied to one or more of the base, middle, and/or upper elements so that the elements may be brought into contact with one another but the adhesive does not immediately bond them into place, allowing for small alignment adjustments (such as facilitated by mating alignment elements 1715 of the base and upper elements). Step 1920 may be omitted when step 1950, below, adheres all of the base, middle and upper elements at once. Step 1930 places a middle element (e.g., spacer wafer 1780) onto the base element. Step 1940 places a top element (e.g., lens wafer 1700') over the middle element such that alignment features of the top element engage alignment features of the base element or the intermediate alignment elements, if placed in step 1910. Step 1950 bonds the top element to the base element and to the middle element, for example by curing a curable epoxy applied in step 1920. It may be advantageous to utilize lens wafers, spacer wafers and/or lens carriers that are transparent to a curing wavelength of such a curable epoxy, for example when IR lens elements are not transparent to the curing wavelength. Alternatively, in embodiments it is possible to utilize localized welding, soldering or mechanical attachments to bond the top element to the base element, keeping in mind that the attachments must remain secure while and after the lens stacks so formed are singulated.

Figure 42:
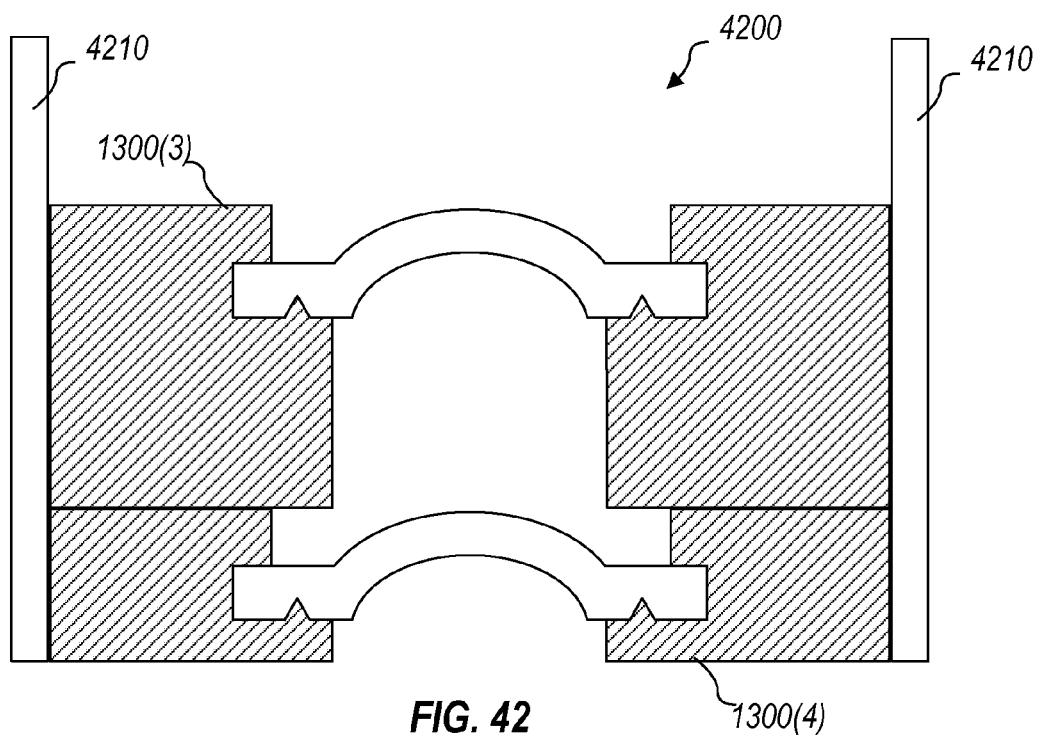
FIG. 42 shows two lens carriers that may be integrated into a lens system, in an embodiment.

In addition to lens wafer based manufacturing as discussed above, it is appreciated that lens carriers may be utilized in manufacturing individual lens systems. For example, FIG. 42 shows two lens carriers 1300(3), 1300(4) that may be integrated into a lens system 4200, similar to lens stack 400 (FIG. 4). Lens carriers 1300(3), 1300(4) may be made by the techniques discussed above, especially in connection with FIG. 5 through FIG. 12. Lens carriers 1300(3), 1300(4) do not include alignment features that mate with features of corresponding parts, but are formed with a precise outside diameter so that they can be stacked within a cylindrical alignment jig 4210 that holds them in alignment, as shown. Lens carriers 1300(3), 1300(4) may then be bonded together in alignment with one another to form lens system 4200. It is appreciated that the technique disclosed here can be utilized not only with circular carriers and a cylindrical alignment jig, but are easily adaptable to lens carriers and corresponding alignment jigs that are square or rectangular, or are circular with keyed features that force their positioning into a known rotational alignment. Alignment jigs 4210 may be removable or may form part of the finished lens systems. Alignment jigs 4210 may facilitate bonding of lens carriers 1300(3), 1300(4) to one another (e.g., may be transparent to a curing wavelength of an epoxy, may transfer heat to lens carriers 1300(3), 1300(4) for welding or soldering, or may form a mold for molding a further material about lens carriers 1300(3), 1300(4)).

Figure 59:
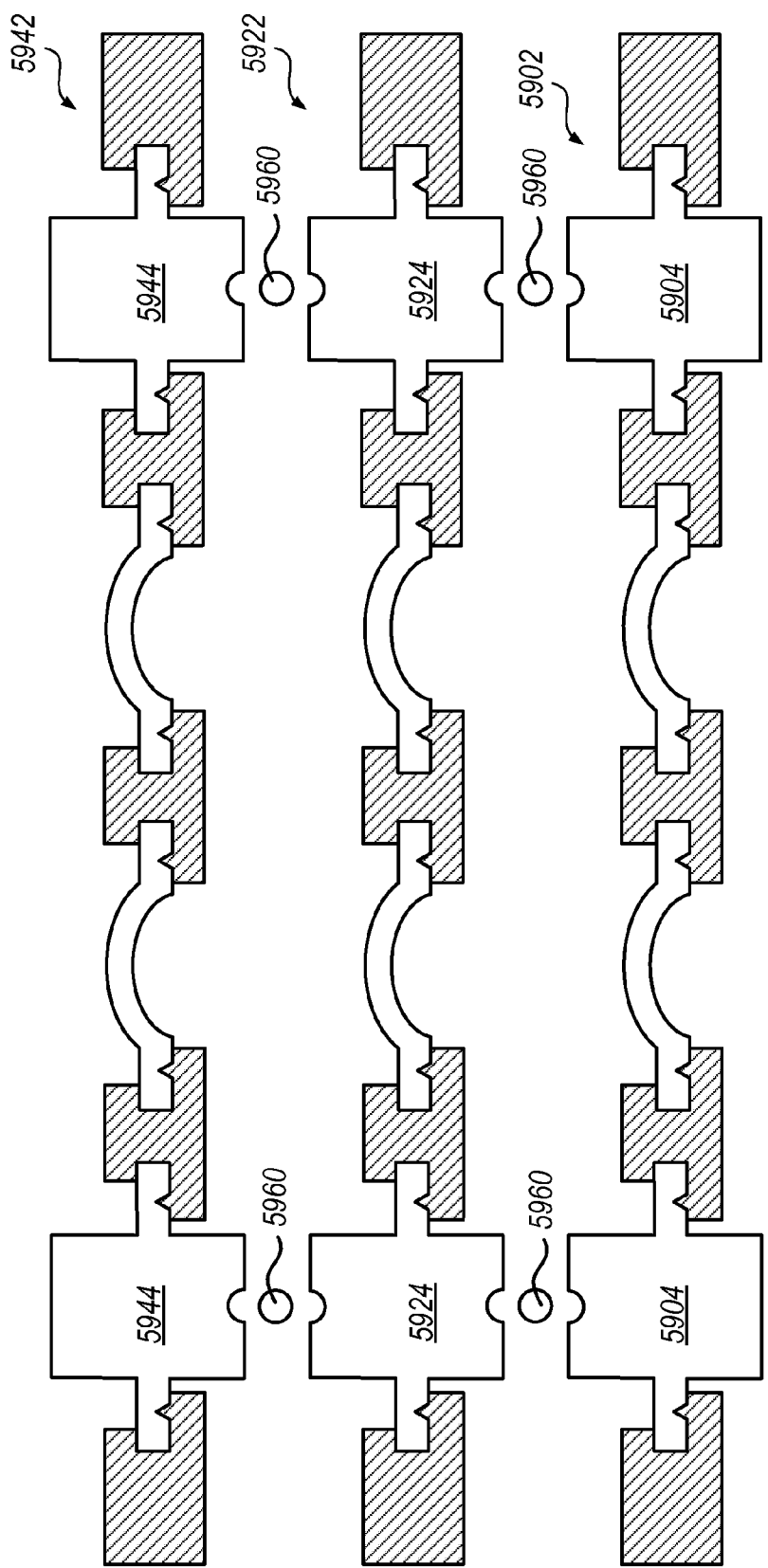
FIG. 59 illustrates a lower lens wafer, a middle lens wafer and an upper lens wafer.

Similar concepts may be utilized to align three or more lens wafers. For example, FIG. 59 illustrates a lower lens wafer 5902, a middle lens wafer 5922 and an upper lens wafer 5942. Lower, middle and upper lens wafer 5902, 5922, 5942, respectively, include a plurality of lenses 5901. Each of the lens wafers may be one of (i) a lens wafer in which lenses are placed, aligned via an alignment jig (i.e. as discussed with reference to FIGS. 15-16 and 51-58) and molded into place, or (ii) a lens wafer in which the lens wafer material is bonded around the lens (i.e. as discussed in reference to FIGS. 7-14 and 45-50). Lens wafers 5902, 5922, and 5942 are to be aligned via a plurality of lower alignment inserts 5904 on the lower lens wafer, a plurality of middle alignment inserts 5924 on the middle lens wafer 5922, and a plurality of upper alignment inserts 5944 on the upper lens wafer 5942. Alignment inserts 5904, 5924, and 5944 are similar to alignment inserts 4902, 5002, and 5002' however they operate to passively align each wafer via an alignment element 5960. Alignment element 5960 is for example a spherical element such that each of the wafers can passively align with one another. It will be appreciated that alignment inserts may be integral to one another such that the wafers passively align without the use of an intermediate alignment element (i.e. similar to FIG. 50).

Wafers 5902, 5922 and 5924 are shown passively aligning via alignment inserts, however the wafers may align via alignment features located directly on the wafer without the use of alignment inserts without departing from the scope herein. Furthermore, a spacer wafer (i.e. similar to spacer wafer 1780) may be placed between one or more of the wafers. If alignment inserts are utilized to passively align the wafers, the alignment elements may be integral with one another, or an alignment element, through a lens aperture (i.e. similar to lens aperture 1786) corresponding to the alignment insert instead of a alignment aperture as discussed in reference to FIG. 17.

Figure 60:
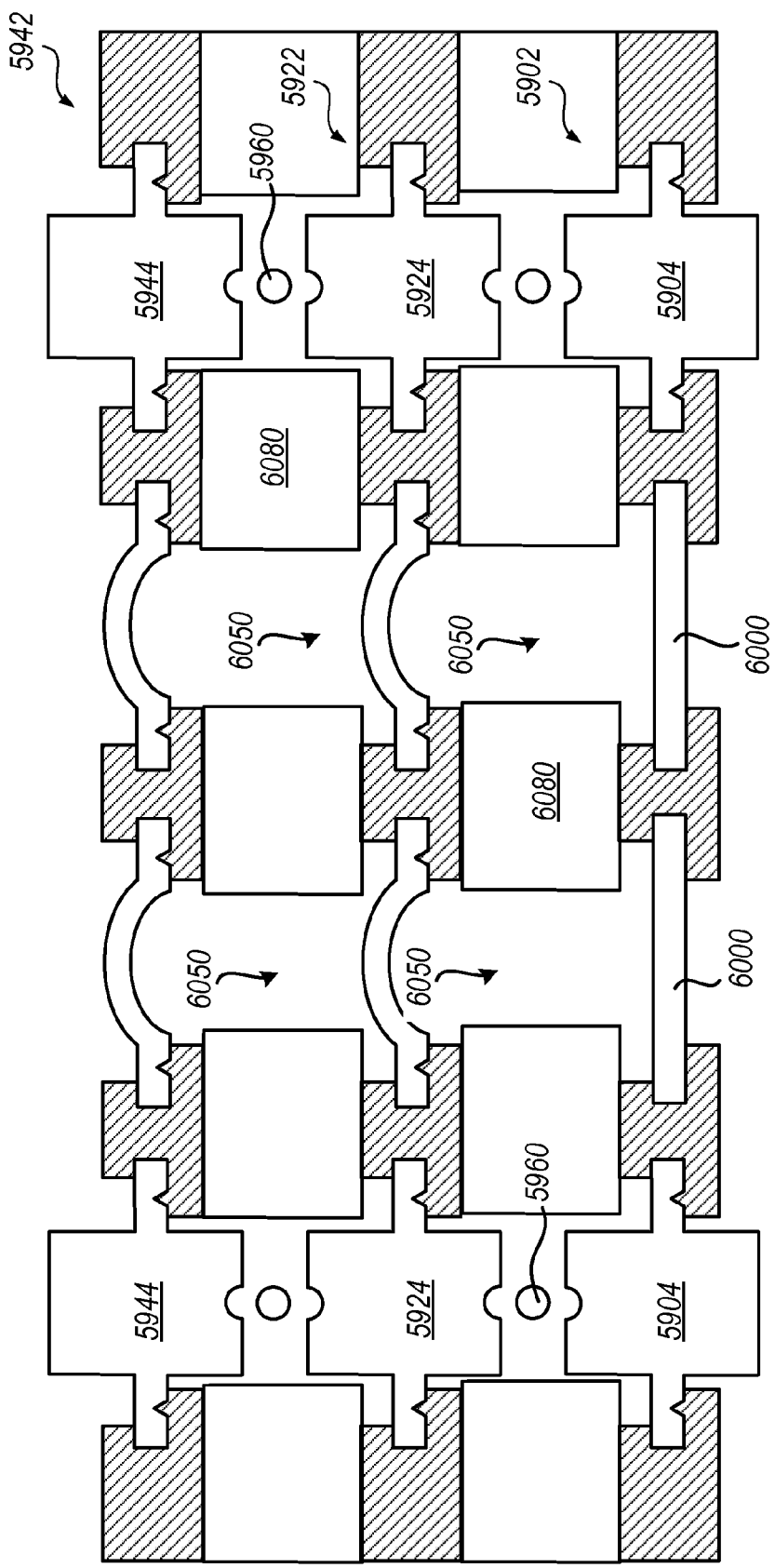
FIG. 60 illustrates a lower wafer that includes a plurality of sensors, in one embodiment that is passively aligned with the middle and upper wafers of FIG. 59.
Figure 61:
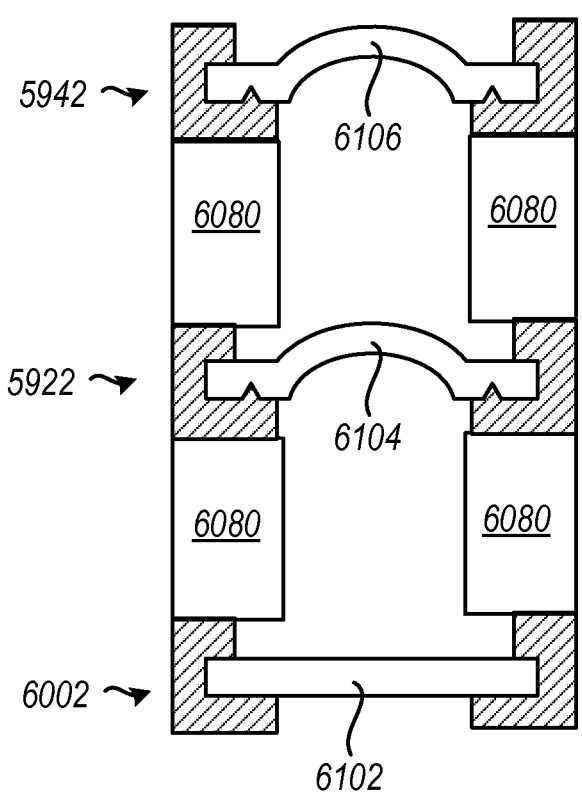
FIG. 61 illustrates a hermetically sealed imaging optics system including a sensor, a middle lens and an upper lens.

FIG. 60 illustrates a lower wafer 6002 that includes a plurality of sensors 6000. Lower wafer 6002 is passively aligned with middle wafer 5922 and upper wafer 5942, each having a spacer wafer 6080 located between, such that alignment inserts 5944, 5924 and 5904 cooperate together via a plurality of alignment elements 5960 within a respective one of a lens aperture 6050. The wafers are all then bonded together and diced and form a plurality of hermetically sealed imaging optics systems. For example, FIG. 61 illustrates a hermetically sealed imaging optics system including a sensor 6102, a middle lens 6104 and an upper lens 6106. The entire system is a single element that is diced from a set of passively aligned wafers utilizing the concepts discussed herein.

Figure 43:
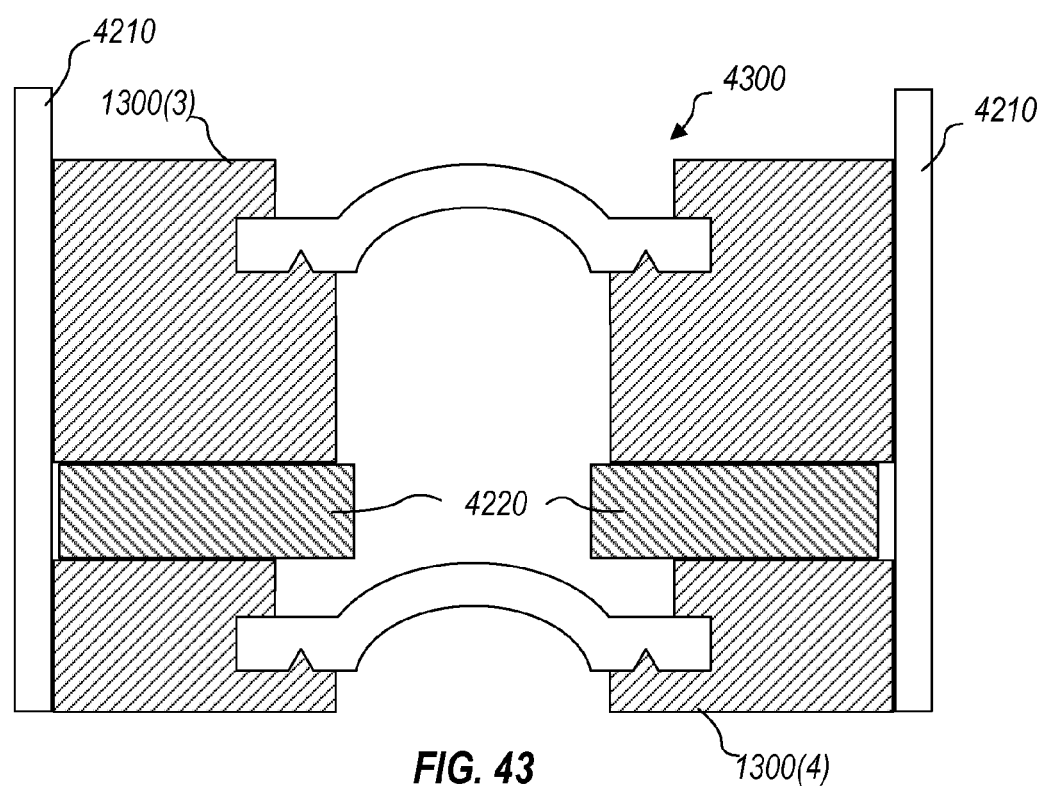
FIG. 43 shows an alternative arrangement that forms a lens system including a spacer that can provide optical spacing and an aperture stop between lens carriers, in an embodiment.

FIG. 43 shows an alternative arrangement that forms a lens system 4300 including a spacer 4220 that can provide optical spacing and an aperture stop between lens carriers 1300(3), 1300(4); spacer 4220 can also be made of a material with a coefficient of thermal expansion that provides athermalization of lens system 4300. The lateral alignment of spacer 4220 may not be as critical as the alignment of lens carriers 1300(3), 1300(4) to one another, because optically it serves only to provide spacing and possibly as an aperture stop for lens system 4300. Therefore spacer 4220 can be manufactured to a slightly smaller diameter and looser diameter tolerance than lens carriers 1300(3), 1300(4). The addition of spacer 4220 is but one modification of lens carrier based manufacturing. Those skilled in the art will appreciate that the features discussed in the context of lens wafer based manufacturing elsewhere in this disclosure may also be adapted or modified for use in lens carrier based manufacturing.

Figure 62:
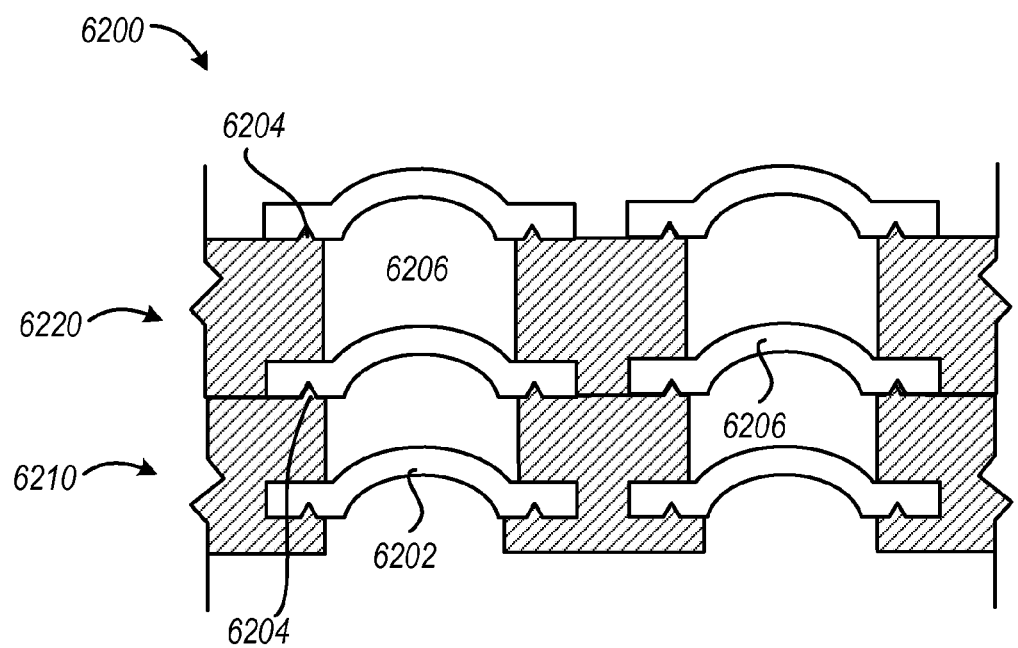
FIG. 62 depicts an optical imaging system in which each wafer layer is formed of a moldable base material around a plurality of lenses.

The discussions above discuss, among other things, systems and methods for taking two pre-formed wafers and passively aligning the wafers to each other. FIG. 62 depicts an optical imaging system 6200 in which each wafer layer is formed around a plurality of lenses 6202, in one embodiment. For example, first lens array 6210 is formed using the concepts discussed with reference to FIGS. 11 and 12.

Figure 63:
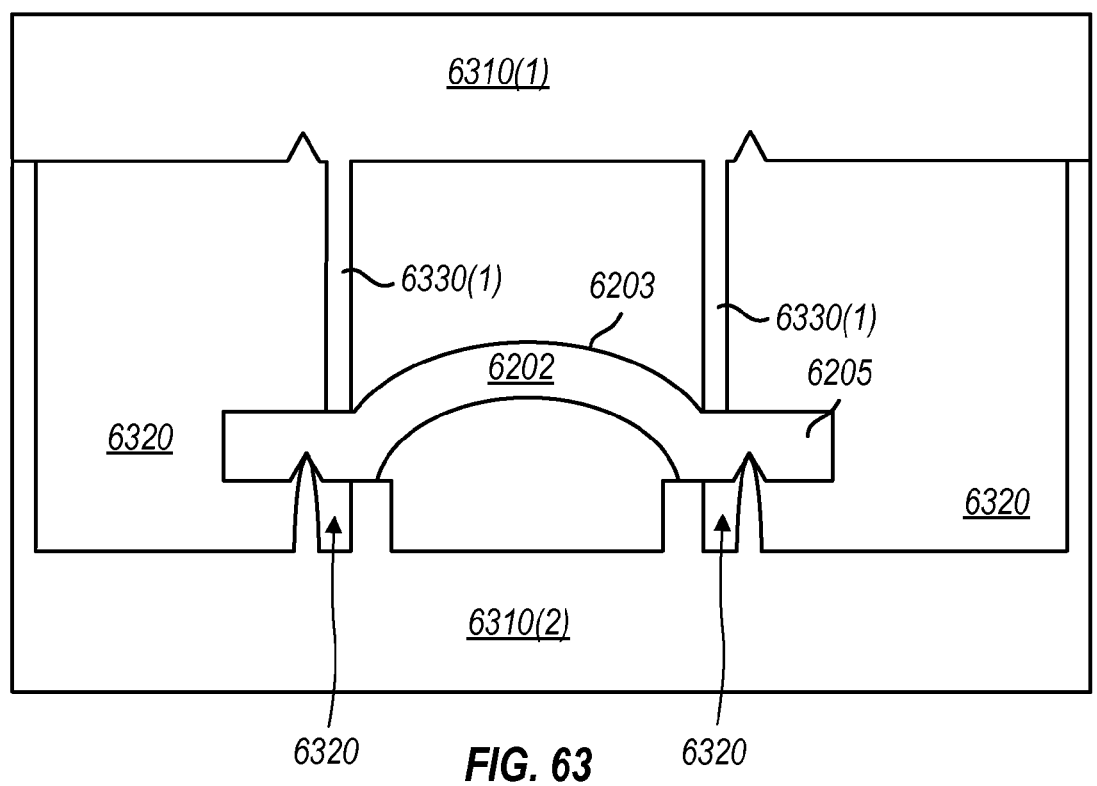
FIG. 63 depicts an exemplary cross section of a mold used to form a base around a plurality of lenses including an alignment feature cavity on the upper mold (for clarity of illustration, only one lens is illustrated.
Figure 64:
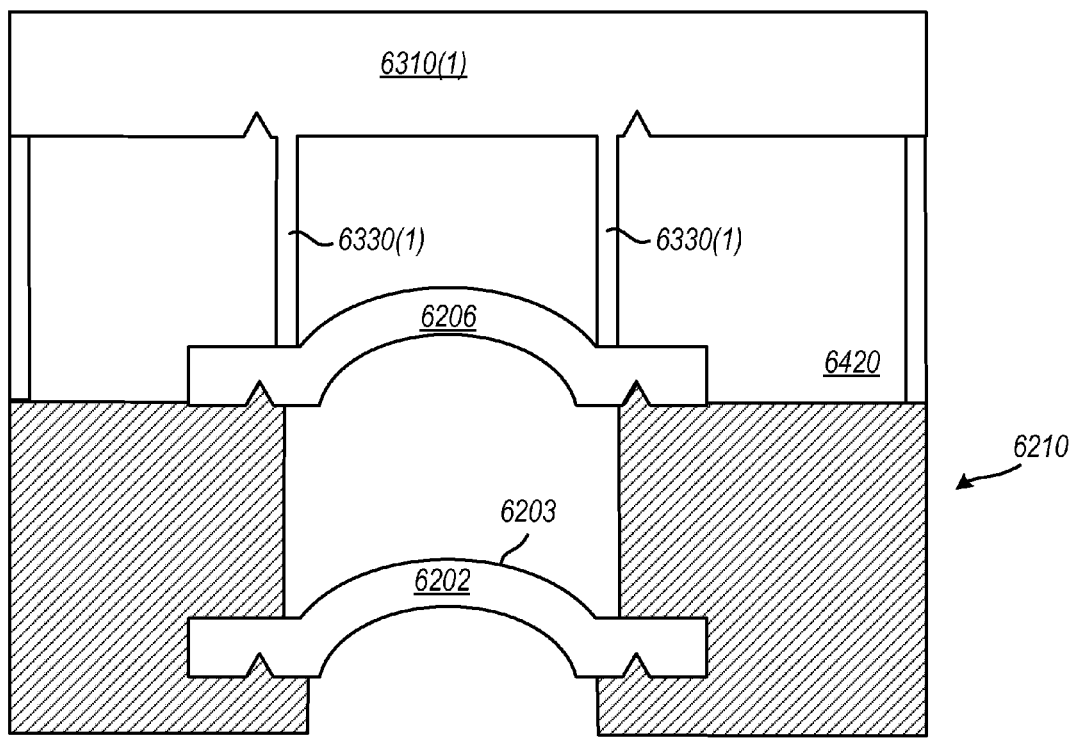
FIG. 64 depicts an exemplary cross section of a mold used to form a second base layer around a plurality of lenses on top of the layer formed using the mold of FIG. 63.

FIG. 63 depicts an exemplary cross section of a mold used to form a base around a plurality of lenses including an alignment feature cavity on the upper mold (for clarity of illustration, only one lens is illustrated. FIG. 64 depicts an exemplary cross section of a mold used to form a second base layer around a plurality of lenses on top of the layer formed using the mold of FIG. 63. The molds in FIG. 63 are for example used to create the first lens wafer 6210 of the optical imaging system 6200 of FIG. 62. The first lens wafer 6210 is formed using upper mold 6310(1) and lower mold 6310(2) that are configured to mold base material to form a lens wafer about a plurality of lenses 6202. Upper mold 6310(1) includes a dam 6330(1) for contacting assembly flange 6205 of lens 6202 to keep molded base material away from the lens surface 6203. Upper mold 6310(1) additionally includes an alignment feature cavity 6332(1) for creating an alignment feature 6204 within the lens wafer layer 6210. Once the wafer layer 6210 is formed and cured, the molds may be removed. An additional plurality of lenses 6206 are aligned on the first lens wafer 6210 via alignment features 6204. The upper mold 6310(1) is then re-used and a second lens wafer 6220 is formed around the plurality of second lenses 6206 within the cavity 6420 formed between the upper mold and first lens wafer layer 6210. It will be appreciated that upper mold does not have to be reused, but a different mold may be used such that the distance between second lenses 6206 and any additional lenses, or the top of the second lens wafer 6220 is variable.

In one embodiment, the first lens wafer layer include a plurality of optical sensors substituted for the first plurality of lenses. In this embodiment, the second layer may include a first plurality of lenses and a second base material formed on top of the first base material of the first lens wafer (including the sensors) and around the plurality of lenses. A further third lens wafer layer may be formed on the second lens wafer layer including a second plurality Once the configuration of lens wafers is complete (i.e. the plurality of layers are sequentially formed on top of one another), the entire system may be diced to form a plurality of individual optical lens systems.

LWIR Material Selection and Athermalization Techniques

The goal of athermalizing a system is to design is to provide imaging performance that remains good across a temperature range. This is a difficult characteristic to achieve in current LWIR systems, for two reasons. First, as discussed above, many materials commonly used in LWIR systems are sensitive to temperature. Second, the typical applications for LWIR imaging require operation over a large temperature range. Without athermalization, the result would be reduced image quality (e.g., a blurred image due to inability to hold focus) at temperatures away from some nominal temperature. This would be unacceptable for automotive, outdoor security and military applications where large temperature swings are commonplace.

There are two common methods for athermalizing an LWIR imaging system. The first uses an active mechanism similar to auto focus, but instead of being distance dependent, it is temperature dependent. The second is a multi-component, "nested" lens barrel that leverages a material's coefficient of thermal expansion (CTE) to shift the image plane towards the lens as the power of the elements are increased, and away when the power is decreased, due to temperature changes. However, wafer based manufacturing combined with selection of materials used therein based both on their imaging and thermal expansion properties can yield a passively athermalized IR imaging system that does not require either active focus correction or nested barrels, as now discussed.

A useful definition of an athermalized lens is one for which a polychromatic, through-focus modulation transfer function ("MTF") is at least 0.1 across a specified temperature range, at ½ of an optical cutoff frequency of the lens $(1/((F/\#)*\lambda))$. Performance of athermalized lenses described herein meet this criterion.

One class of materials that may be used in embodiments is that of chalcogenide glasses, several of which are known to be moldable and to have high transparency to infrared radiation. Chalcogenide glasses that may be utilized in embodiments may be obtained from several sources. One is Amorphous Materials, Inc. of Garland, Tex., selling such glasses under the trademarked name "AMTIR" (an acronym for Amorphous Material Transmitting Infrared Radiation). These include AMTIR-1 ($Ge_{33}As_{12}Se_{55}$), AMTIR-2 (AsSe), AMTIR-3 (GeSbSe), AMTIR-4 (AsSe), AMTIR-5 (AsSe) and AMTIR-6 ($As_2S_3$). Another supplier is SCHOTT North America Inc., which sells chalcogenide glasses under the trade names IG2 ($Ge_{33}As_{12}Se_{55}$), IG3($Ge_{30}As_{13}Se_{32}Te_{25}$), IG4 ($Ge_{10}As_{40}Se_{50}$), IG5 ($Ge_{28}Sb_{12}Se_{60}$) and IG6 ($As_{40}Se_{60}$). Another supplier is Umicore Electro-Optic Materials, (Belgium) which sells a chalcogenide glass called GASIR®1 Infrared Transmitting glass.

Other materials that are IR transmissive and may be utilized include plastic, glass, crystalline materials (e.g., germanium, gallium arsenide, zinc selenide), and salts.

It is also important to utilize aspheric optics to control aberrations, field curvature and astigmatism. In embodiments herein, an object side meniscus lens forms at least one aspheric surface and an image side meniscus lens forms two aspheric surfaces. In a two element configuration it is important to have aspheric degrees of freedom on three of the four surfaces. The aspheric surface on the front element, near an aperture stop, is used to control spherical aberration. The two aspheric surfaces on the second lens are used to control higher order field curvature and astigmatism. These three aspheric surfaces are required to enable the passively athermalized two meniscus configuration that provides high performance. A fourth asphere can optionally be used to slightly increase performance or manufacturability.

Figure 20:
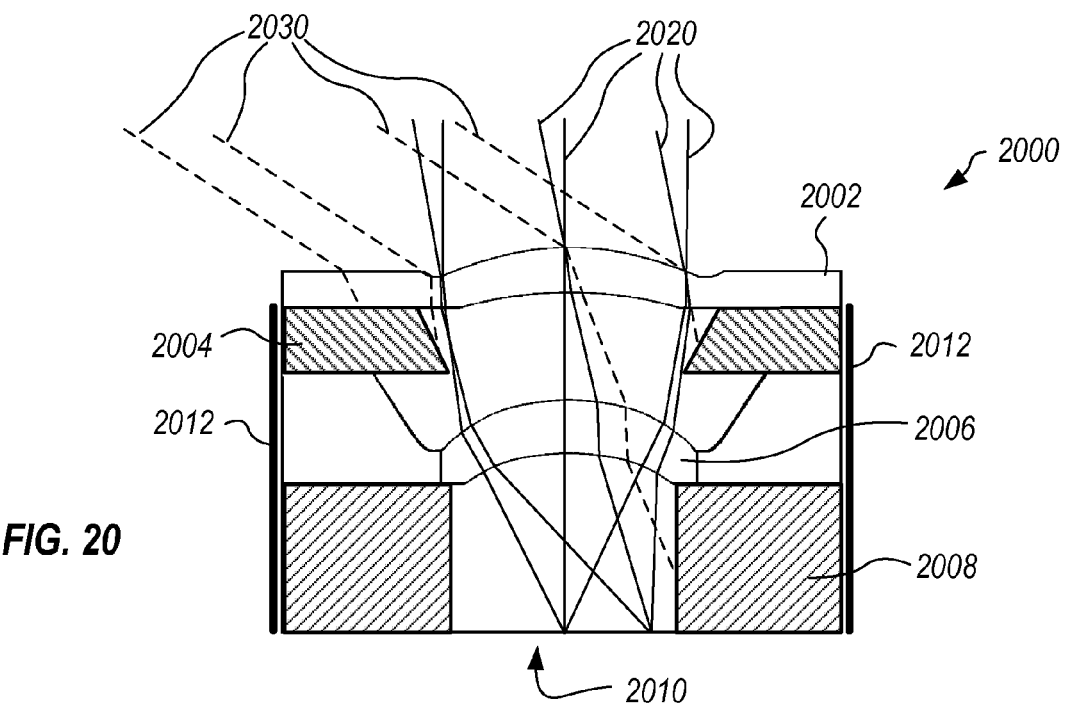
FIG. 20 shows a cross section of an exemplary LWIR lens stack (configured with an object side lens element fabricated on a first wafer, a stop and stray light control element, an image side lens element fabricated on a second wafer, and a spacer, in an embodiment.
Figure 21A:
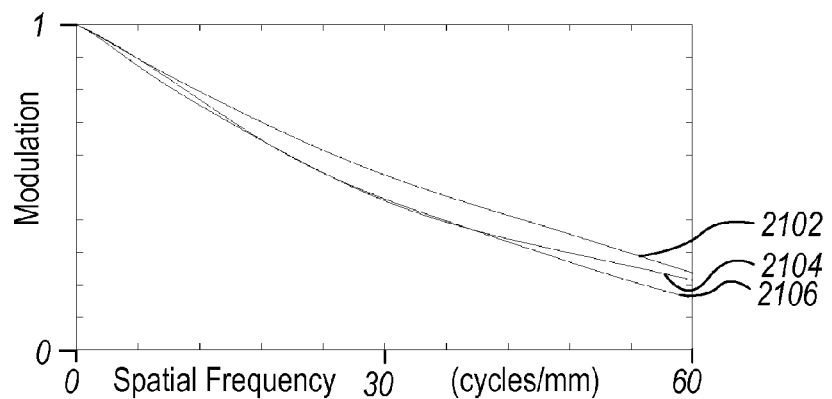
FIG. 21A illustrates exemplary performance of the lens stack of FIG. 20 as a function of temperature.
Figure 21B:
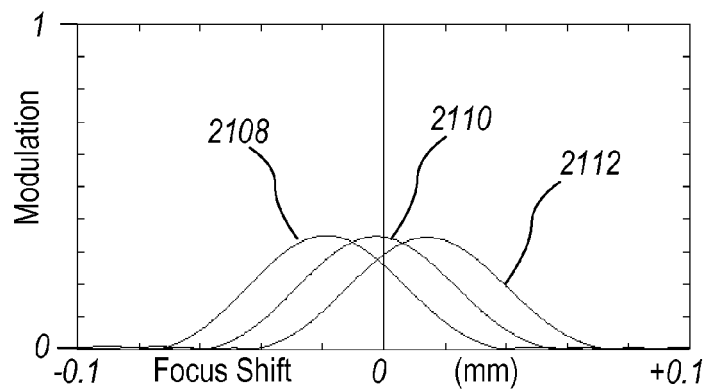
FIG. 21B illustrates performance of the lens stack of FIG. 20 over a focus shift range as a function of temperature.

FIG. 20 shows a cross section of an exemplary LWIR lens stack 2000 (e.g., lens stack 400 of FIG. 4) configured with an object side optical element 2002 fabricated on a first wafer, a spacer 2004 that may also serve as an aperture stop and stray light control element, an image side optical element 2006 fabricated on a second wafer, and a spacer 2008. Lens stack 2000 forms an image at an image plane 2010. Lens stack 2000 includes embedded athermalization materials that form a combination of the lens element materials and spacer materials for passive athermalization. Lens stack 2000 is also shown coated with an IR blocking and protective external covering 2012, for example to block stray IR radiation and/or to improve structural integrity of the lens stack. FIG. 21A illustrates exemplary performance of lens stack 2000 as a function of temperature, where each line 2102, 2104, and 2106 shows a modulation transfer function ("Modulation") of lens stack 2000 at a different temperature. FIG. 21B illustrates exemplary performance of lens stack 2000 at 50 cycles/mm (which is half the optical cutoff for an F/1 lens) over a focus shift range of −0.1 to +0.1 mm from best focus, where each line 2108, 2110 and 2112 shows modulation at a different temperature. The performance of lens stack 2000 meets the athermalized lens criterion noted above, since at the zero focus position, none of the different temperature curves drops below a modulation of 0.1.

In the example of FIGS. 20, 21A and 21B, an object side AMTIR-4 optical element 2002, a germanium image side optical element 2006, and A1 6061 spacers 2004, 2008 are used in combination with the thermally dependent optical power and thicknesses designed into optical elements 2002 and 2006 to balance thermally induced focus errors through temperature. Optical elements 2002 and 2006 are both meniscus lenses with aspheric surfaces. In this configuration, optical element 2002 is considered an object side meniscus lens (because it is closest to the object(s) being imaged) and optical element 2006 is considered an image side meniscus lens. By embedding the athermalization in this way, lens stack 2000 does not require an athermalizing barrel or an expensive focus device, and can be built as lens stacks formed from a lens wafer and spacer wafers, as discussed above.

Figure 1:
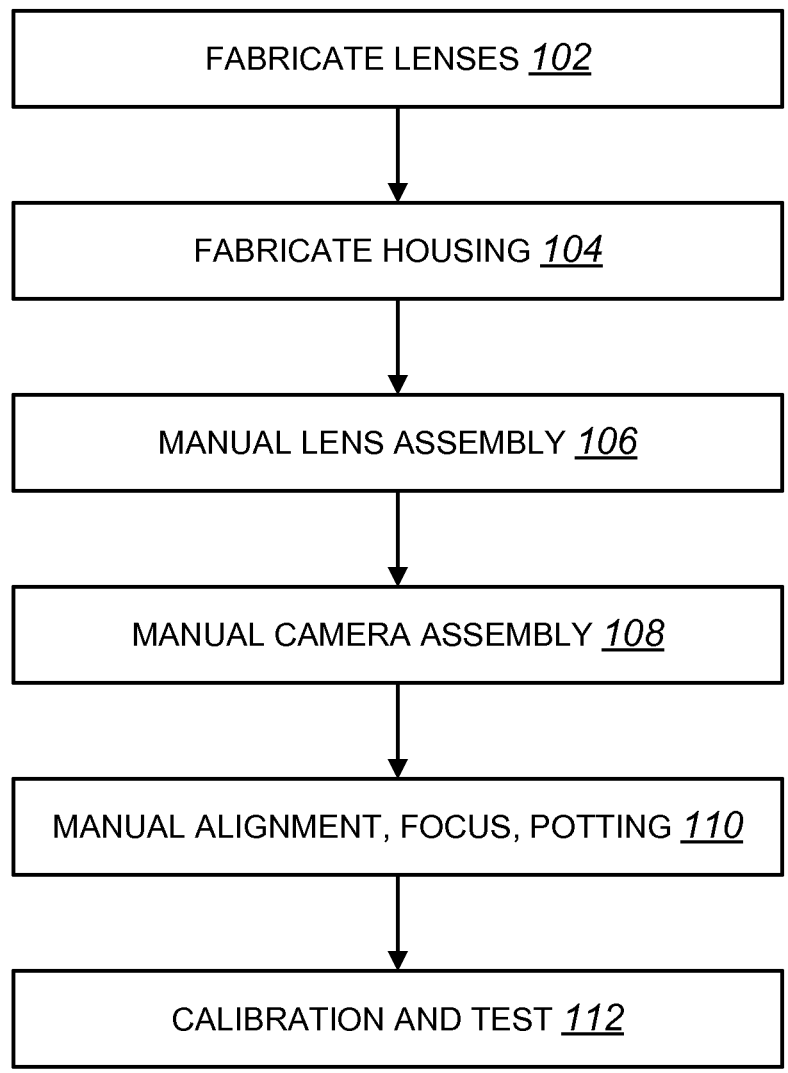
FIG. 1 illustrates one prior art manufacturing process for producing a camera assembly.
Figure 2:
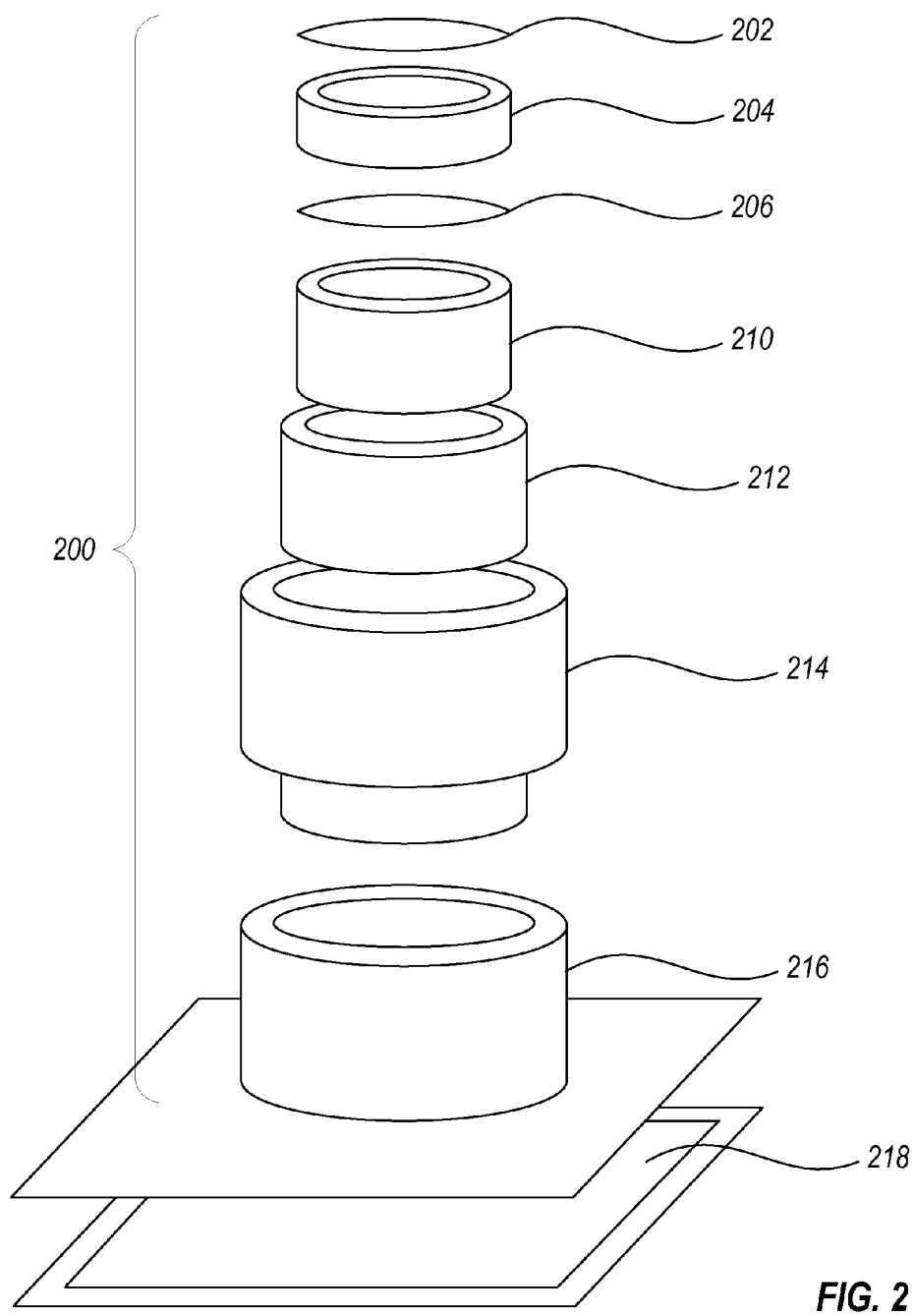
FIG. 2 illustrates, in an exploded view, a prior art lens stack produced by steps of the process of FIG. 1.

Spacer elements can be utilized advantageously for stray light control in embodiments. In prior art lens stacks (e.g., lens stack 200, FIG. 2), stray light is typically controlled by the combined characteristics of the barrel and the lenses. In low cost prior art imagers, where stray light is not specifically controlled and may therefore arrive at the image plane, the imager may have reduced image contrast. In embodiments herein, spacers not only form at least a part of the athermalization architecture, but may also act as stray light baffles. For example, in FIG. 20, spacers 2004 and 2008 of lens stack 2000 allow light rays 2020 (solid lines) to pass through optically active portions of optical elements 2002 and 2006 and on to image plane 2010, but out-of-field light rays 2030 (dashed lines) that enter the system are blocked by the spacers.

In the example of FIG. 20, lens stack 2000 has a volume (2.87 cm³) that is 40% smaller than its closest commercially available counterpart (which is not entirely passively athermalized, and requires additional components beyond those used in this analysis). For this example, the first order parameters of the two solutions have been scaled to be equivalent for a fair comparison. The use of a barrel in the prior art commercial solution adds significant size, whereas the use of protective external covering 2012 on the sides of lens stack 2000 substantially reduces the size of lens stack 2000, as compared to commercially available counterparts that use a lens barrel for the same purpose. External protective covering 2012 may be made from a variety of materials, including IR blocking paints and coatings, or a low cost metal sleeve that is press fit over the entire lens stack 2000.

Another advantage provided by the manufacturing techniques herein is that hermetically sealed units can be produced thereby. A typical uncooled IR sensor is a microbolometer that requires a hermetically sealed environment for long term reliability. Nested barrel type lens systems typically cannot be hermetically sealed; prior art IR cameras typically utilize a window made of IR transparent material such as germanium or gallium arsenide to seal a microbolometer into a cavity before mounting the sealed sensor to the nested barrel lens system. The window adds cost and can generate a loss in signal due to Fresnel reflections from the high refractive index of the IR transparent material.

Several advantageous strategies may be utilized to design an IR imaging system that is passively athermalized. For example, it may be advantageous to constrain thermal glass constants of the object and image side lenses. A thermal glass constant is defined as $$T_{gi} = \frac{\frac{dn_i}{dT}}{(n_i - 1)} - \alpha_i,$$

where
   i is an index variable, that is, i=1 or 2 for the object and the image side meniscus lenses respectively,
   $n_i$ is a refractive index of lens i,
   $\alpha_i$ is a thermal expansion coefficient of lens i, and
   T is temperature.

When considering an objective that consists of two elements, the change in focus due to temperature is approximated by:

$$dEFL = -\frac{EFL*\Delta T}{4}(3CTE + 2T_{g1} + T_{g2}),$$

where

EFL=system focal length and dEFL=a change in system focal length,

ΔT=a change in temperature

CTE=CTE of a spacer material between the image side and object side meniscus lenses $T_{g1}$, $T_{g2}$ are the thermal glass constants of the object and the image side meniscus lenses, respectively.

Given these definitions, the approximate condition for an athermalized objective is:

$$T_{g1} = -\frac{1}{2}(3CTE + T_{g2}).$$

Lens stack 2000, FIG. 20, is an example of a system where $T_{g2}$ is at least 1.67 times $T_{g1}$. Parameters for the object side meniscus lens (i.e., surfaces 1 and 2) and the image side meniscus lens (i.e., surfaces 4 and 5) are given in Table 1. The material between the object side and image side lenses in this and in all other examples below, is aluminum.

TABLE 1

Example 1 lens stack parameters, with object side meniscus lens formed of AMTIR-4 and image side lens formed of Germanium

| Surf | Radius | Thickness | Glass | Diameter |
|---|---|---|---|---|
| 1 | 14.02745 | 2.002162 | AMTIR-4 | 11.79292 |
| 2 | 19.7889 | 1.017775 | | 10.48084 |
| STO | Infinity | 8.611625 | | 9.6 |
| 4 | 12.51413 | 2.998523 | GERMANIUM | 14.28097 |
| 5 | 16.27892 | 4.112299 | | 11.7186 |
| $T_{g2} - T_{g1}$ | 171.4 | | | |

| Surf | Coeff on r4: | Coeff on r6: | Coeff on r8: |
|---|---|---|---|
| 1 | 2.16E−05 | −3.94E−07 | 3.74E−10 |
| 2 | 2.83E−05 | 2.63E−07 | −5.20E−09 |
| STO | | | |
| 4 | 0.000272422 | −290E−06 | 3.58E−08 |
| 5 | 0.000778757 | −126E−05 | 1.49E−07 |

Figure 22:
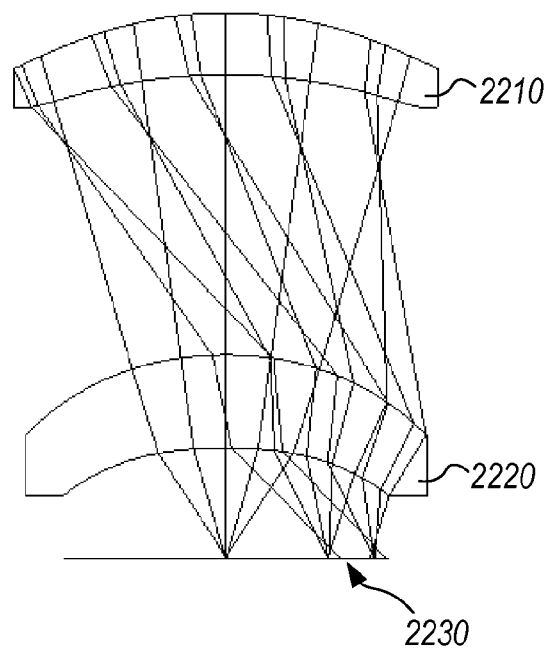
FIGS. 22, 24, 26, 28, 30, 32, 34, 36, 38, and 40 illustrate athermalized lens configurations, in embodiments.
Figure 23A:
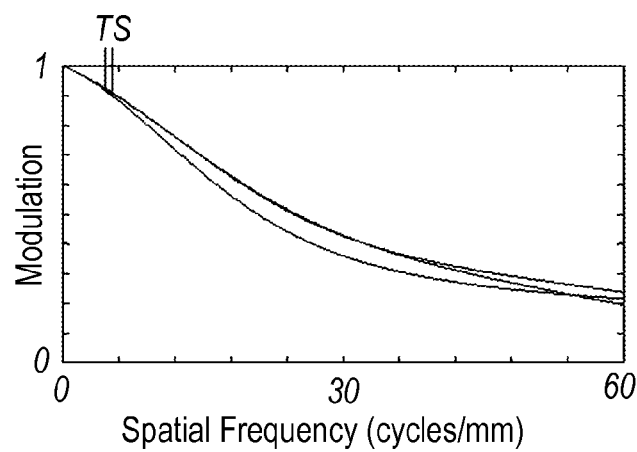
FIGS. 23A, 23B, 25A, 25B, 27A, 27B, 29A, 29B, 31A, 31B, 33A, 33B, 35A, 35B, 37A, 37B, 39A, 39B, 41A and 41B illustrate performance of the lens configurations of FIGS. 22, 24, 26, 28, 30, 32, 34, 36, 38 and 40 respectively.
Figure 23B:
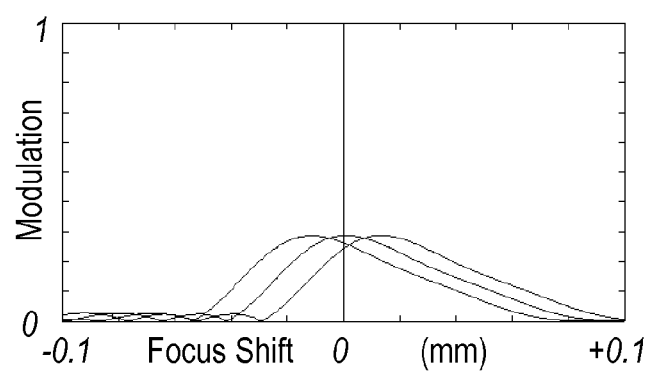

Another example of a system where $T_{g2}$ is at least 1.67 times $T_{g1}$ is shown in FIG. 22. Only the object side meniscus lens 2210, image side meniscus lens 2220, and exemplary rays passing through the lens system to an image plane 2230 are shown in FIG. 22. Performance of the system shown in FIG. 22 is illustrated in FIG. 23A and FIG. 23B; each of the lines of each graph illustrates performance at one of temperatures −40 C, 10 C and 60 C. The performance of the system meets the athermalized lens criterion noted above meets the athermalized lens criterion noted above, since at the zero focus position, none of the different temperature curves drops below a modulation of 0.1. Parameters for object side meniscus lens 2210 and image side meniscus lens 2220 are given in Table 2.

TABLE 2

Example 2 lens stack parameters, with object side meniscus lens formed of AMTIR-2 and image side lens formed of Gallium Arsenide

| Surf | Radius | Thickness | Glass | Diameter |
|---|---|---|---|---|
| 1 | 13.24067 | 2.001792 | AMTIR-2 | 13.68846 |
| 2 | 18.44871 | 2.115521 | | 12.56471 |
| STO | Infinity | 6.967737 | | 9.6 |
| 4 | 10.80241 | 3.0006 | GAAS | 12.95704 |
| 5 | 14.5185 | 3.616475 | | 10.57044 |
| $T_{g2} - T_{g1}$ | 77.7 | | | |

| Surf | Coeff on r4: | Coeff on r6: | Coeff on r8: |
|---|---|---|---|
| 1 | 5.07E−06 | 1.07E−06 | −4.66E−08 |
| 2 | 4.27E−05 | 8.23E−07 | −6.79E−08 |
| STO | | | |
| 4 | 0.000295523 | −249E−06 | 3.57E−08 |
| 5 | 0.000978647 | −1.14E−05 | 9.16E−08 |

Figure 24:
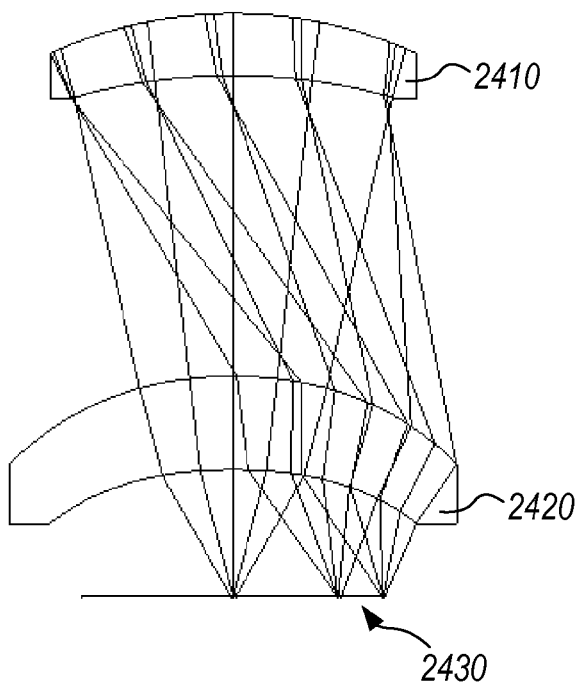
Figure 25A:
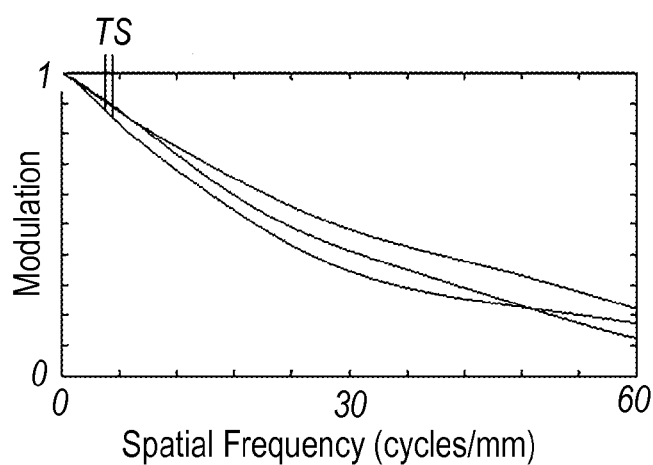
Figure 25B:
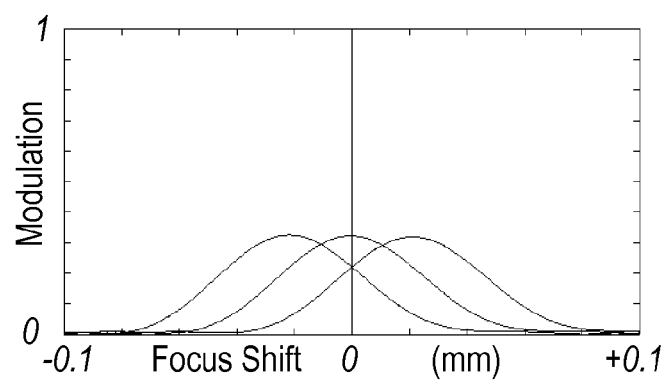

Another example of a system where $T_{g2}$ is at least 1.67 times $T_{g1}$ is shown in FIG. 24. Only the object side meniscus lens 2410, image side meniscus lens 2420, and exemplary rays passing through the lens system to an image plane 2430 are shown in FIG. 24. Performance of the system shown in FIG. 24 is illustrated in FIG. 25A and FIG. 25B; each of the lines of each graph illustrates performance at one of temperatures −40 C, 10 C and 60 C. The performance of the system meets the athermalized lens criterion noted above meets the athermalized lens criterion noted above, since at the zero focus position, none of the different temperature curves drops below a modulation of 0.1. Parameters for object side meniscus lens 2410 and image side meniscus lens 2420 are given in Table 3.

TABLE 3

Example 3 lens stack parameters, with object side meniscus lens formed of AMTIR-2 and image side lens formed of Germanium

| Surf | Radius | Thickness | Glass | Diameter |
|---|---|---|---|---|
| 1 | 14.201 | 1.994121 | AMTIR-2 | 11.72873 |
| 2 | 19.40331 | 0.9784842 | | 10.40591 |
| STO | Infinity | 8.664542 | | 9.6 |
| 4 | 12.51486 | 2.996764 | GERMANIUM | 14.34517 |
| 5 | 16.29145 | 4.079677 | | 11.78007 |
| $T_{g2} - T_{g1}$ | 145.6 | | | |

| Surf | Coeff on r4: | Coeff on r6: | Coeff on r8: |
|---|---|---|---|
| 1 | 2.17E−05 | −2.89E−07 | −6.34E−10 |
| 2 | 2.76E−05 | 1.56E−07 | 1.33E−09 |
| STO | | | |
| 4 | 0.000272429 | −2.90E−06 | 3.57E−08 |
| 5 | 0.000777671 | −1.26E−05 | 1.47E−07 |

Figure 26:
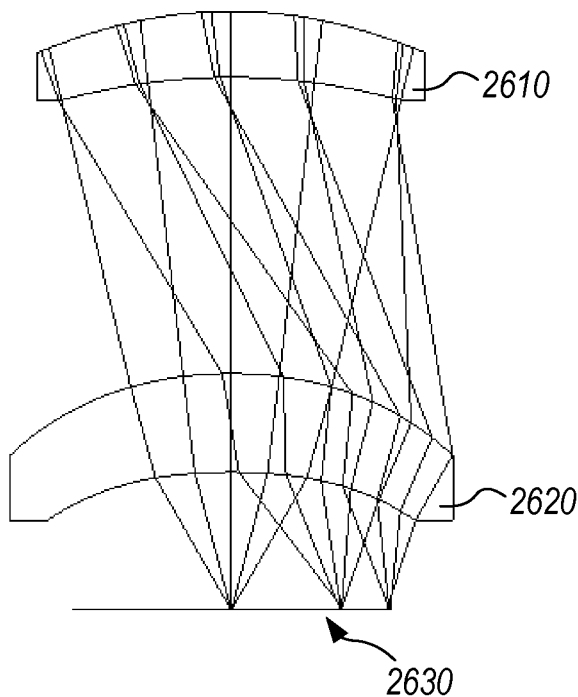
Figure 27A:
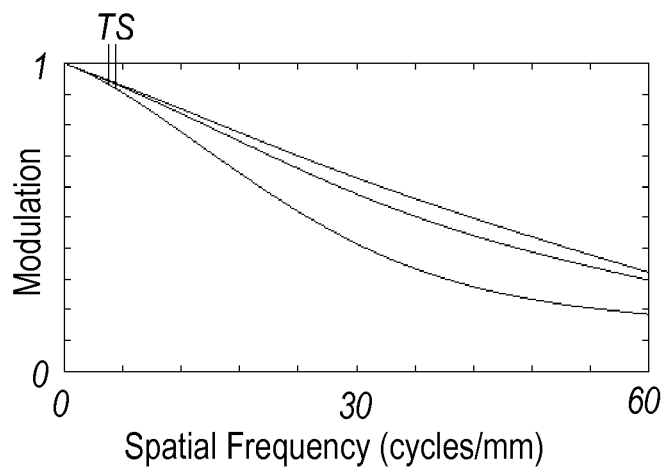
Figure 27B:
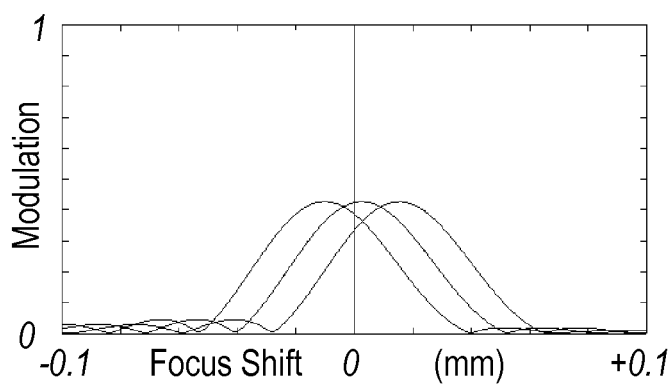

Another example of a system where $T_{g1}$ is at least 1.67 times $T_{g1}$ is shown in FIG. 26. Only the object side meniscus lens 2610, image side meniscus lens 2620, and exemplary rays passing through the lens system to an image plane 2630 are shown in FIG. 26. Performance of the system shown in FIG. 26 is illustrated in FIG. 27A and FIG. 27B; each of the lines of the graph illustrates performance at one of temperatures −40 C, 10 C and 60 C. The performance of the system meets the athermalized lens criterion noted above. Parameters for object side meniscus lens 2610 and image side meniscus lens 2620 are given in Table 4.

TABLE 4

Example 4 lens stack parameters, with object side meniscus lens formed of AMTIR-2 and image side lens formed of Silicon

| Surf | Radius | Thickness | Glass | Diameter |
|---|---|---|---|---|
| 1 | 13.88453 | 2.001792 | AMTIR-2 | 11.78243 |
| 2 | 19.06958 | 0.9562742 | | 10.56639 |
| STO | Infinity | 8.037013 | | 9.6 |
| 4 | 12.12694 | 3.000315 | SILICON | 13.46339 |
| 5 | 17.44629 | 4.186328 | | 11.20679 |
| $T_{g2} - T_{g1}$ | 82.3 | | | |

| Surf | Coeff on r4: | Coeff on r6: | Coeff on r8: |
|---|---|---|---|
| 1 | −1.59E−06 | −5.13E−07 | −2.78E−08 |
| 2 | 2.42E−05 | −1.29E−06 | −3.37E−08 |
| STO | | | |
| 4 | 0.000275359 | −2.81E−06 | 3.38E−08 |
| 5 | 0.000800679 | −1.31E−05 | 1.57E−07 |

Figure 28:
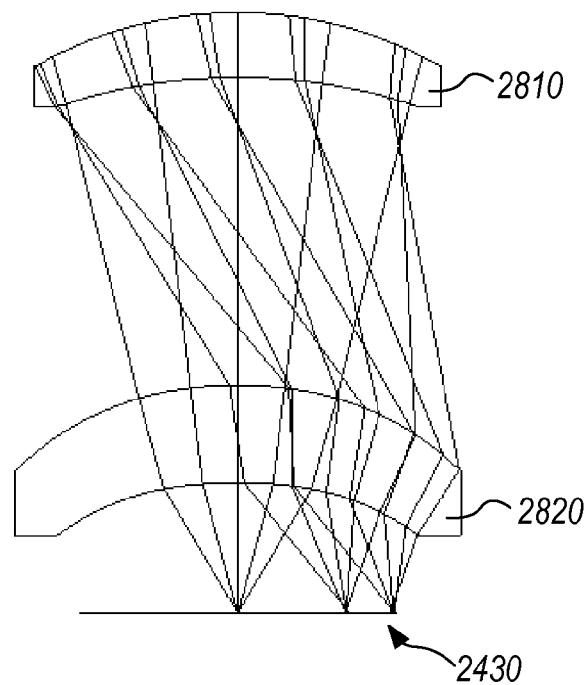
Figure 29A:
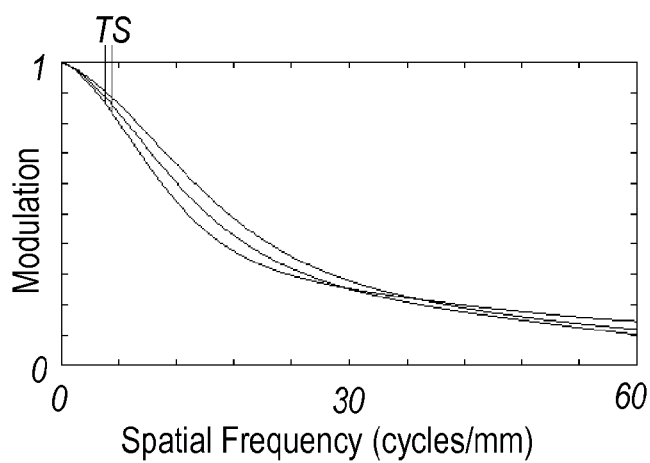
Figure 29B:
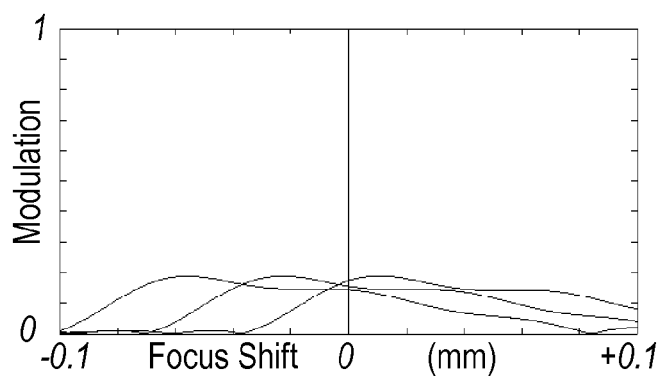

Another example of a system where $T_{g2}$ is at least 1.67 times $T_{g1}$ is shown in FIG. 28. Only the object side meniscus lens 2810, image side meniscus lens 2820, and exemplary rays passing through the lens system to an image plane 2830 are shown in FIG. 28. Performance of the system shown in FIG. 28 is illustrated in FIG. 29A and FIG. 29B; each of the lines of each graph illustrates performance at one of temperatures −40 C, 10 C and 60 C. The performance of the system meets the athermalized lens criterion noted above. Parameters for object side meniscus lens 2810 and image side meniscus lens 2820 are given in Table 5.

TABLE 5

Example 5 lens stack parameters, with object side meniscus lens formed of Zinc Selenide and image side lens formed of Germanium

| Surf | Radius | Thickness | Glass | Diameter |
|---|---|---|---|---|
| 1 | 12.7184 | 2.000568 | ZNSE | 12.48927 |
| 2 | 18.97205 | 1.497532 | | 11.22439 |
| STO | Infinity | 7.944457 | | 9.6 |
| 4 | 12.0265 | 3.000467 | GERMANIUM | 13.70417 |
| 5 | 14.90827 | 4.013358 | | 11.11599 |
| $T_{g2} - T_{g1}$ | 90.5 | | | |

| Surf | Coeff on r4: | Coeff on r6: | Coeff on r8: |
|---|---|---|---|
| 1 | 2.55E−05 | 9.27E−07 | −3.27E−08 |
| 2 | 7.92E−05 | 8.24E−07 | −4.87E−08 |
| STO | | | |
| 4 | 0.000281568 | −2.77E−06 | 3.43E−08 |
| 5 | 0.000810695 | −1.14E−05 | 1.30E−07 |

Figure 30:
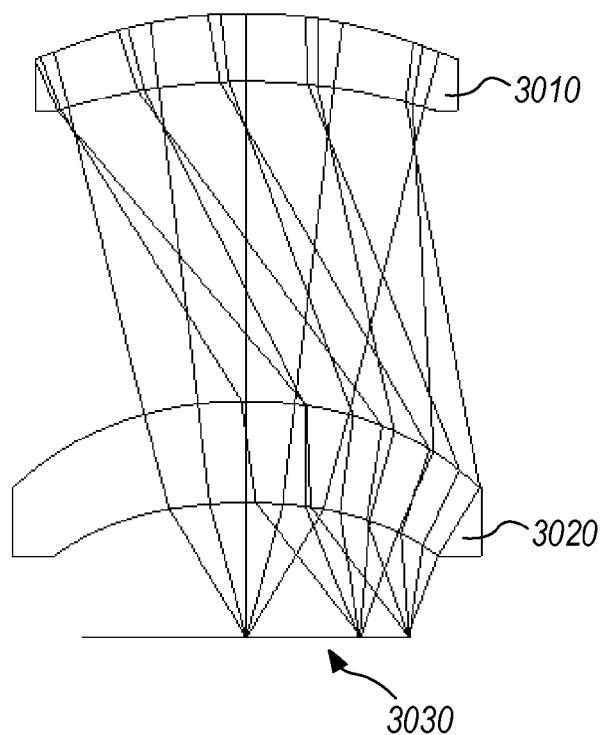
Figure 31A:
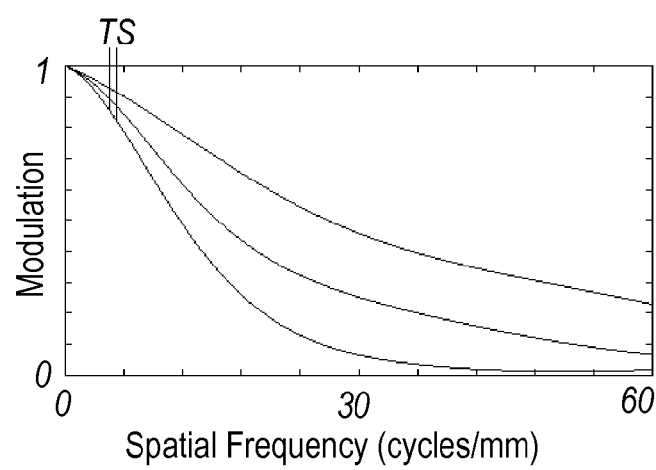
Figure 31B:
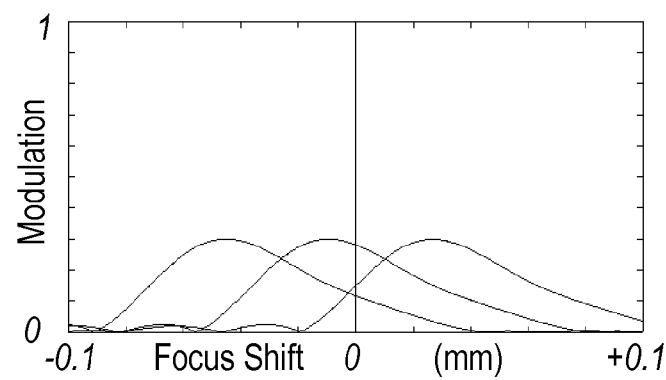

Another example of a system where $T_{g2}$ is at least 1.67 times $T_{g1}$ is shown in FIG. 30. Only the object side meniscus lens 3010, image side meniscus lens 3020, and exemplary rays passing through the lens system to an image plane 3030 are shown in FIG. 30. Performance of the system shown in FIG. 30 is illustrated in FIGS. 31A and 31B; each of the lines of each graph illustrates performance at one of temperatures −30 C, 10 C and 50 C. The performance of the system meets the athermalized lens criterion noted above, although the temperature range of this particular lens system is reduced as compared to other lenses disclosed herein. Parameters for object side meniscus lens 3010 and image side meniscus lens 3020 are given in Table 6.

TABLE 6

Example 6 lens stack parameters, with object side meniscus lens formed of Gallium Arsenide and image side lens formed of Germanium

| Surf | Radius | Thickness | Glass | Diameter |
|---|---|---|---|---|
| 1 | 14.66519 | 2.0004 | GAAS | 12.46912 |
| 2 | 18.43001 | 1.432689 | | 11.16288 |
| STO | Infinity | 8.030219 | | 9.6 |
| 4 | 12.52965 | 2.999147 | GERMANIUM | 13.83558 |
| 5 | 16.19574 | 3.996068 | | 11.34395 |
| $T_{g2} - T_{g1}$ | 67.9 | | | |

| Surf | Coeff on r4: | Coeff on r6: | Coeff on r8: |
|---|---|---|---|
| 1 | 1.07E−05 | −2.05E−07 | −1.41E−08 |
| 2 | 3.41E−05 | −6.22E−07 | −1.84E−08 |
| STO | | | |
| 4 | 0.000273252 | −2.91E−06 | 3.50E−08 |
| 5 | 0.000768881 | −1.27E−05 | 1.54E−07 |

Figure 32:
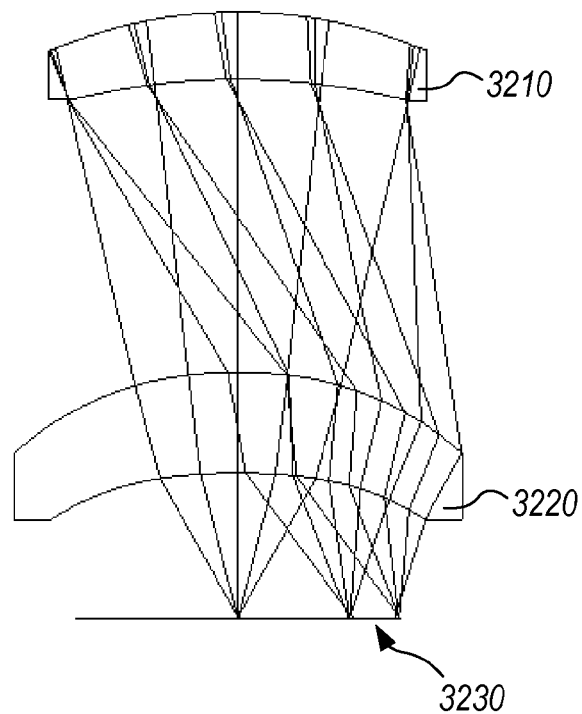
Figure 33A:
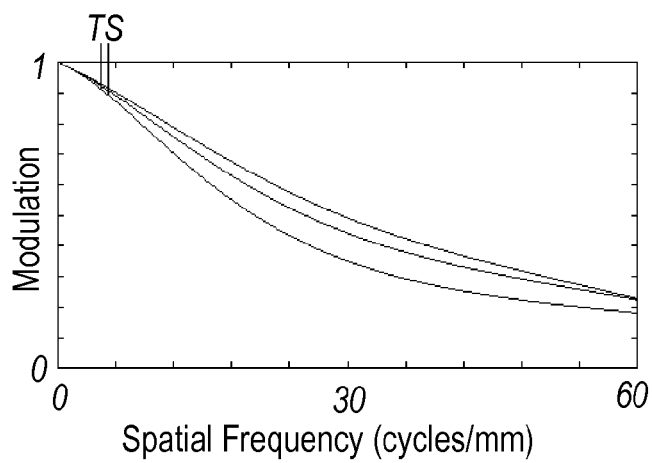
Figure 33B:
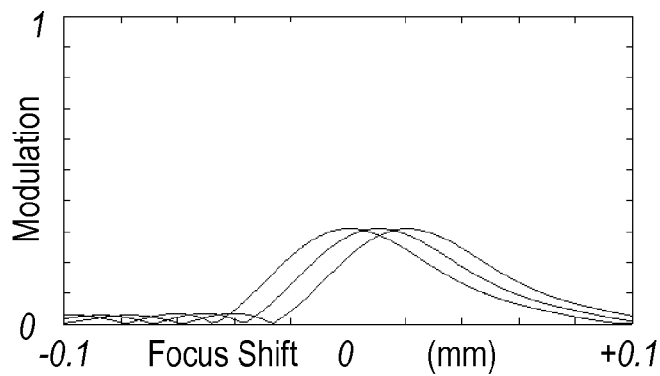

Another example of a system where $T_{g2}$ is at least 1.67 times $T_{g1}$ is shown in FIG. 32. Only the object side meniscus lens 3210, image side meniscus lens 3220, and exemplary rays passing through the lens system to an image plane 3230 are shown in FIG. 32. Performance of the system shown in FIG. 32 is illustrated in FIG. 33A and FIG. 33B; each of the lines of the graph illustrates performance at one of temperatures −40 C, 10 C and 60 C. The performance of the system meets the athermalized lens criterion noted above. Parameters for object side meniscus lens 3210 and image side meniscus lens 3220 are given in Table 7.

TABLE 7

Example 7 lens stack parameters, with object side meniscus lens formed of AMTIR-4 and image side lens formed of Gallium Arsenide

| Surf | Radius | Thickness | Glass | Diameter |
|---|---|---|---|---|
| 1 | 13.7553 | 2.000217 | AMTIR-4 | 11.30208 |
| 2 | 19.48751 | 0.6224783 | | 10.177.08 |
| STO | Infinity | 8.107027 | | 9.6 |
| 4 | 12.1874 | 2.999143 | GAAS | 13.35351 |
| 5 | 18.36456 | 4.334889 | | 11.19408 |
| $T_{g2} - T_{g1}$ | 103.5 | | | |

| Surf | Coeff on r4: | Coeff on r6: | Coeff on r8: |
|---|---|---|---|
| 1 | −3.95E−06 | −8.23E−07 | −3.22E−08 |
| 2 | 1.79E−05 | −1.41E−06 | −4.64E−08 |
| STO | | | |
| 4 | 0.000273914 | −2.88E−06 | 3.39E−08 |
| 5 | 0.000784306 | −1.28E−05 | 1.55E−07 |

Figure 34:
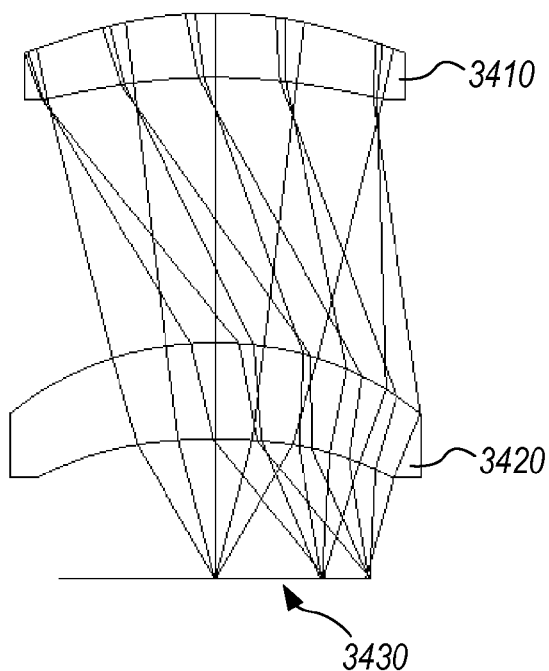
Figure 35A:
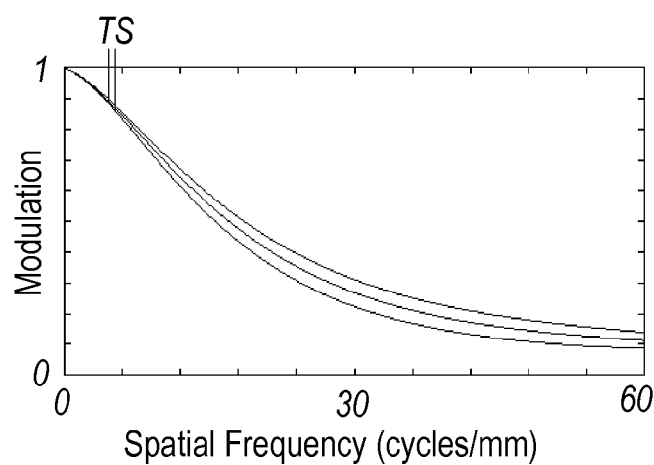
Figure 35B:
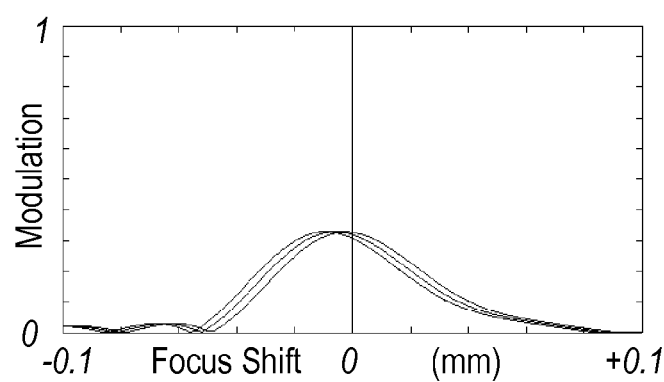

Another example of a system where $T_{g2}$ is at least 1.67 times $T_{g1}$ is shown in FIG. 34. Only the object side meniscus lens 3410, image side meniscus lens 3420, and exemplary rays passing through the lens system to an image plane 3430 are shown in FIG. 34. Performance of the system shown in FIG. 34 is illustrated in FIG. 35A and FIG. 35B; each of the lines of each graph illustrates performance at one of temperatures −40 C, 10 C and 60 C. The performance of the system meets the athermalized lens criterion noted above. Parameters for object side meniscus lens 3410 and image side meniscus lens 3420 are given in Table 8.

TABLE 8

Example 8 lens stack parameters, with object side
meniscus lens formed of AMTIR-4 and image side
lens formed of AMTIR-2

| Surf | Radius | Thickness | Glass | Diameter |
|---|---|---|---|---|
| 1 | 13.41408 | 2.002164 | AMTIR-4 | 11.89383 |
| 2 | 19.0776 | 0.9713252 | | 10.82319 |
| STO | Infinity | 7.267797 | | 9.6 |
| 4 | 11.69409 | 2.99037 | AMTIR-2 | 12.81551 |
| 5 | 21.42909 | 4.344554 | | 11.16564 |
| $T_{g2} - T_{g1}$ | 25.8 | | | |

| Surf | Coeff on r4: | Coeff on r6: | Coeff on r8: |
|---|---|---|---|
| 1 | −3.74E−05 | −1.06E−06 | −4.55E−08 |
| 2 | −1.78E−05 | −2.78E−06 | −3.60E−08 |
| STO | | | |
| 4 | 0.000279049 | −2.82E−06 | −6.75E−11 |
| 5 | 0.000881254 | −1.61E−05 | 9.87E−08 |

Figure 36:
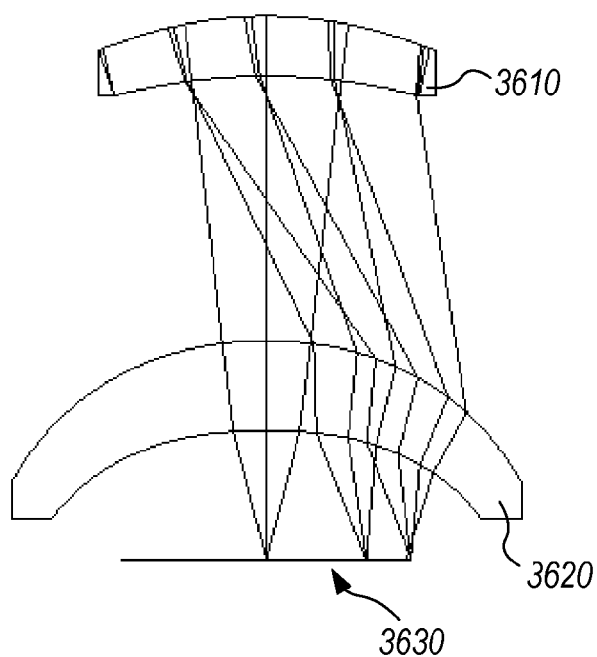
Figure 37A:
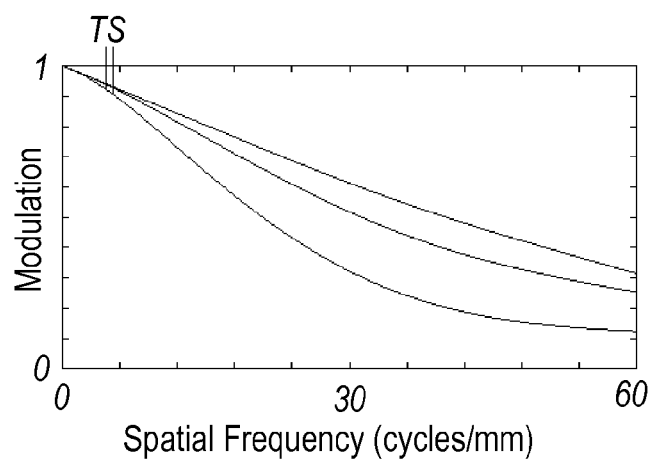
Figure 37B:
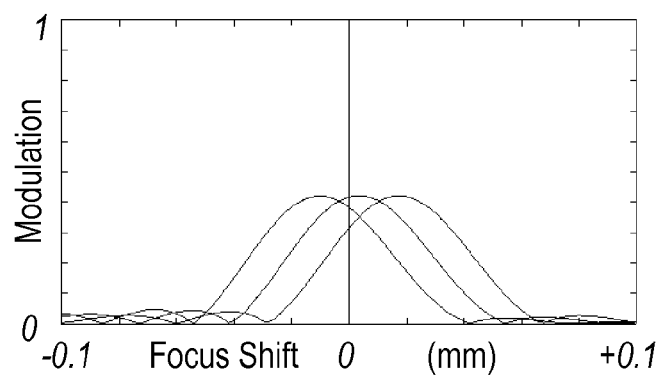

Another example of a system where $T_{g2}$ is at least 1.67 times $T_{g1}$ is shown in FIG. 36. Only the object side meniscus lens 3610, image side meniscus lens 3620, and exemplary rays passing through the lens system to an image plane 3630 are shown in FIG. 36. Performance of the system shown in FIG. 36 is illustrated in FIG. 37A and FIG. 37B; each of the lines of each graph illustrates performance at one of temperatures −40 C, 10 C and 60 C. The performance of the system meets the athermalized lens criterion noted above. Parameters for object side meniscus lens 3610 and image side meniscus lens 3620 are given in Table 9.

TABLE 9

Example 9 lens stack parameters, with object side
meniscus lens formed of AMTIR-4 and image side
lens formed of Silicon

| Surf | Radius | Thickness | Glass | Diameter |
|---|---|---|---|---|
| 1 | 13.79301 | 2.00216 | AMTIR-4 | 11.28861 |
| 2 | 19.53293 | 0.6495318 | | 10.10299 |
| STO | Infinity | 8.186761 | | 9.6 |
| 4 | 12.25933 | 2.999695 | SILICON | 16.99682 |
| 5 | 17.67549 | 4.313474 | | 14.34624 |
| $T_{g2} - T_{g1}$ | 108.1 | | | |

| Surf | Coeff on r4: | Coeff on r6: | Coeff on r8: |
|---|---|---|---|
| 1 | 3.82E−07 | −8.27E−07 | −3.94E−08 |
| 2 | 2.13E−05 | −1.33E−06 | −5.36E−08 |
| STO | | | |
| 4 | 0.00027401 | −2.88E−06 | 3.40E−08 |
| 5 | 0.000779558 | −1.28E−05 | 1.60E−07 |

In another strategy to design an IR imaging system that is passively athermalized, it is advantageous to constrain two aspheric meniscus lenses such that an optical power of the image side meniscus lens is at least 1.6 times an optical power of the object side meniscus lens. This is useful for both aberration correction and for athermalization. Also, when thermal glass constants of the two lenses are not constrained, certain resulting lens stacks may utilize two lenses of the same material, which may help in reducing cost.

Figure 38:
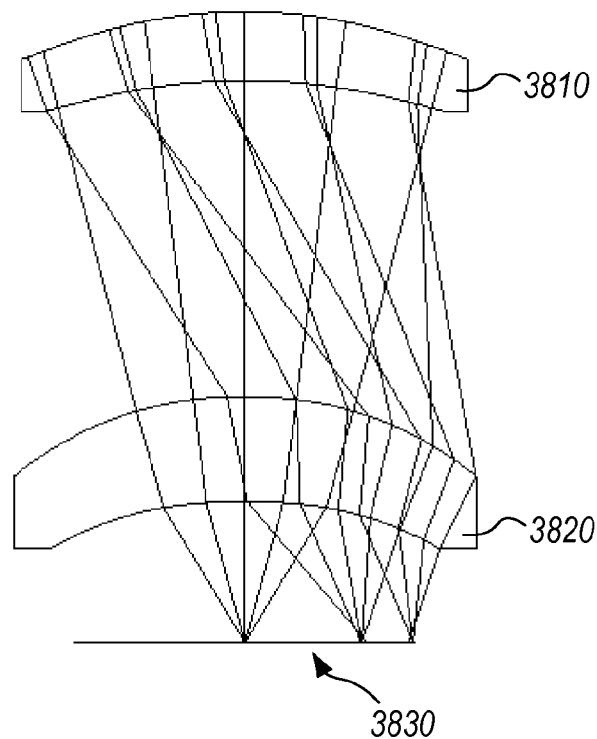
Figure 39A:
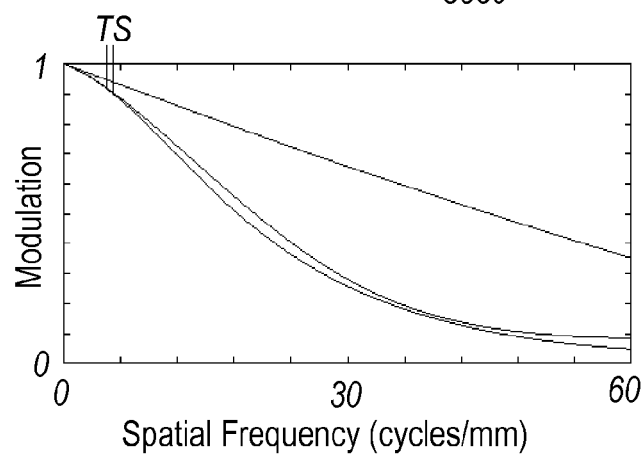
Figure 39B:
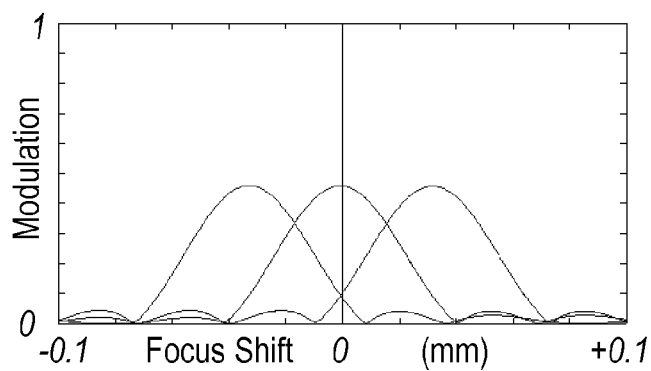

An example of a system where an optical power of the image side meniscus lens is at least 1.6 times an optical power of the object side meniscus lens is shown in FIG. 38. Only the object side meniscus lens 3810, image side meniscus lens 3820, and exemplary rays passing through the lens system to an image plane 3830 are shown in FIG. 38. Performance of the system shown in FIG. 38 is illustrated in FIG. 39A and FIG. 39B; each of the lines of each graph illustrates performance at one of temperatures −40 C, 10 C and 60 C. The performance of the system meets the athermalized lens criterion noted above. Parameters for object side meniscus lens 3810 and image side meniscus lens 3820 are given in Table 10.

TABLE 10

Example 10 lens stack parameters, with object side meniscus
lens and image side lens both formed of Silicon

| Surf | Radius | Thickness | Glass | Diameter |
|---|---|---|---|---|
| 1 | 14.60529 | 1.973347 | SILICON | 12.77556 |
| 2 | 18.07738 | 1.594933 | | 11.59552 |
| STO | Infinity | 7.414748 | | 9.6 |
| 4 | 12.12362 | 3.000314 | SILICON | 13.21068 |
| 5 | 17.39618 | 4.028685 | | 11.17493 |
| $T_{g2} - T_{g1}$ | 0 | | | |

| Surf | Coeff on r4: | Coeff on r6: | Coeff on r8: |
|---|---|---|---|
| 1 | 5.97E−06 | −7.02E−07 | −2.20E−08 |
| 2 | 3.09E−05 | −1.91E−06 | −2.04E−08 |
| STO | | | |
| 4 | 0.00026331 | −2.94E−06 | 1.75E−08 |
| 5 | 0.00079123 | −1.46E−05 | 1.07E−07 |

Figure 40:
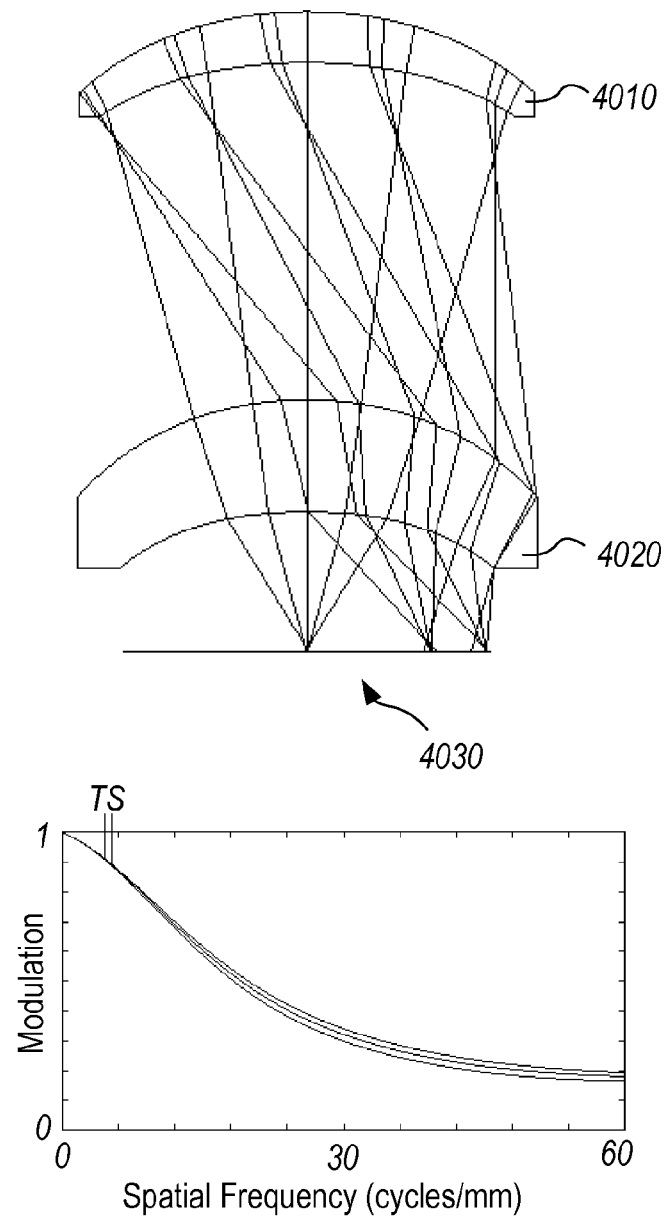
Figure 41A:
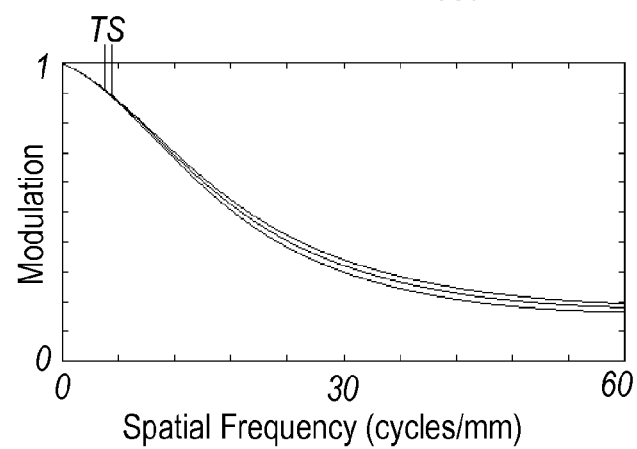
Figure 41B:
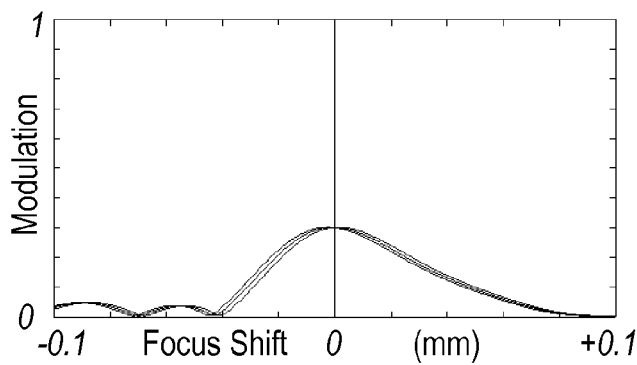

A further example of a system where $T_{g2}$ is at least 1.67 times $T_{g1}$ is shown in FIG. 40. (In this example, both of the lenses are formed of AMTIR-2, which has a negative $T_g$, so $T_{g2}$ is not as negative as 1.67 times $T_{g1}$.) Only the object side meniscus lens 4010, image side meniscus lens 4020, and exemplary rays passing through the lens system to an image plane 4030 are shown in FIG. 40. Performance of the system shown in FIG. 40 is illustrated in FIG. 41A and FIG. 41B; each of the lines of each graph illustrates performance at one of temperatures −40 C, 10 C and 60 C. The performance of the system meets the athermalized lens criterion noted above. Parameters for object side meniscus lens 4010 and image side meniscus lens 4020 are given in Table 11.

TABLE 11

Example 11 lens stack parameters, with object side meniscus
lens and image side lens both formed of AMTIR-2

| Surf | Radius | Thickness | Glass | Diameter |
|---|---|---|---|---|
| 1 | 10.78755 | 1.362582 | AMTIR-2 | 12.18862 |
| 2 | 13.89166 | 1.816183 | | 11.22592 |
| STO | Infinity | 7.200517 | | 9.6 |
| 4 | 9.866962 | 3.00269 | AMTIR-2 | 12.34325 |
| 5 | 14.30628 | 3.749132 | | 10.04798 |
| $T_{g2} - T_{g1}$ | 0 | | | |

| Surf | Coeff on r4: | Coeff on r6: | Coeff on r8: |
|---|---|---|---|
| 1 | 3.99E−05 | 6.17E−06 | −4.67E−08 |
| 2 | 8.95E−05 | 1.03E−05 | −1.29E−07 |
| STO | | | |
| 4 | 0.000362993 | −5.56E−06 | 1.09E−07 |
| 5 | 0.001165077 | −1.73E−05 | 3.17E−07 |

Figure 44:
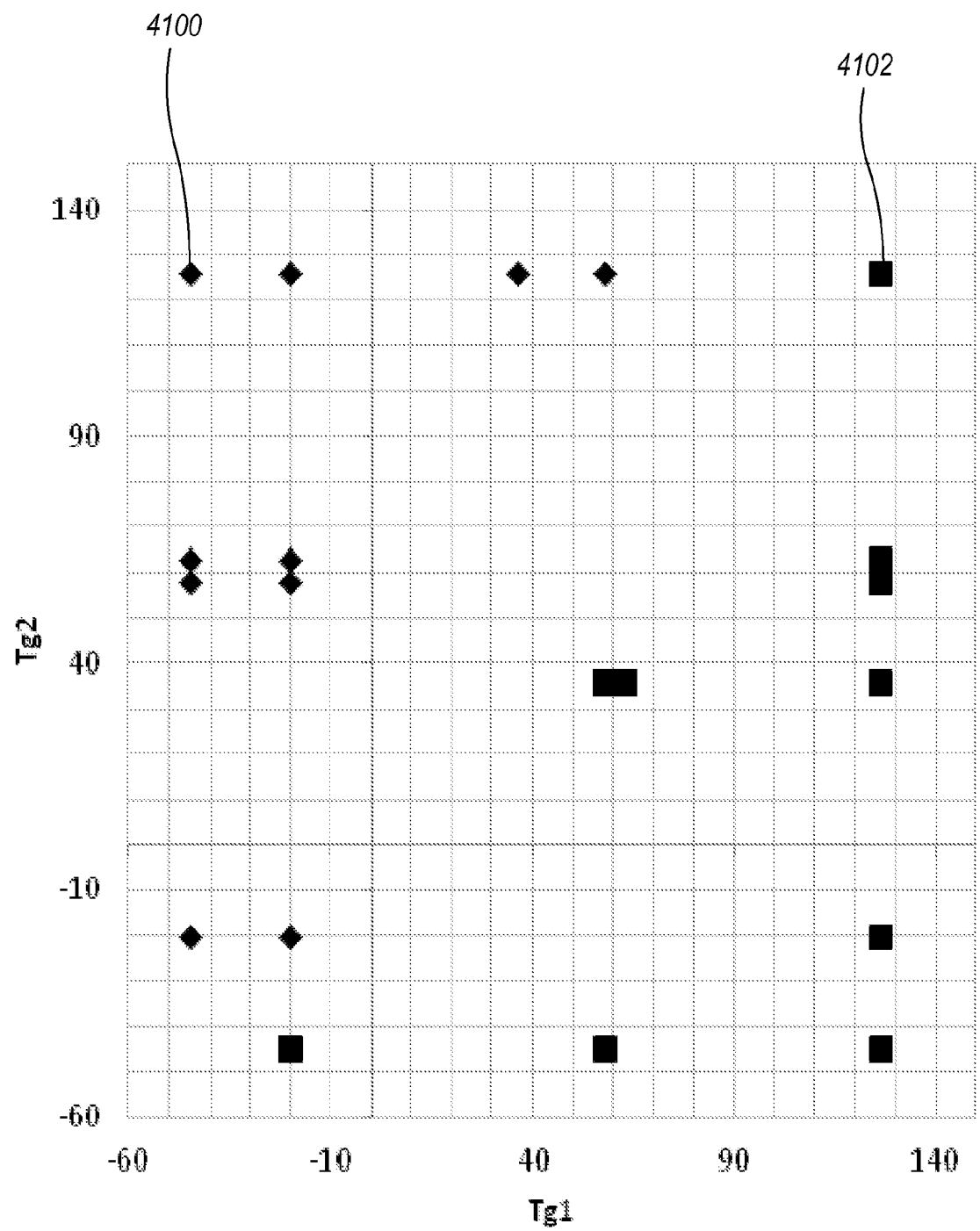
FIG. 44 illustrates performance of lens configurations having various combinations of object side and image side thermal glass constants.

In exemplary embodiments herein, $T_{g2}$ is greater than $(1.67 \cdot T_{g1})$ in the solutions that meet the athermalization criteria noted above. More particularly, $T_{g2}$ may be greater than $(123 \cdot T_{g1} + 50 \times 10^{-6})$, as can be shown in FIG. 44. FIG. 44 has units of $10^{-6}$ and shows the top performing material combinations, indicated by diamonds 4100, and the worst performing material combinations, indicated by squares 4102. For the sake of clarity, not all material combinations are numbered.

Combinations of Features

Features described above as well as those claimed below may be combined in various ways without departing from the scope hereof. The following examples illustrate possible, non-limiting combinations the present invention has been described above, it should be clear that many changes and modifications may be made to the process and product without departing from the spirit and scope of this invention:

(a) A passively athermalized infrared imaging system includes an object side meniscus lens that forms at least one aspheric surface, and an image side meniscus lens that forms two aspheric surfaces. Each of the meniscus lenses is formed of a material selected from the group consisting of a chalcogenide glass, germanium, silicon, gallium arsenide, zinc selenide and glass. An optical power of the image side meniscus lens is at least 1.6 times an optical power of the object side meniscus lens, such that an effective focus position of the imaging system is athermalized over a range of 0 to +40 degrees Celsius.

(b) In system denoted as (a), athermalized may be defined as a polychromatic, through-focus modulation transfer function ("MTF") being at least 0.1 over the range of 0 to +40 degrees Celsius, at ½ of an optical cutoff frequency of the lens $(1/((F/\#)*\lambda))$.

(c) In the system/s denoted as (a) or (b), a thermal glass constant of the object side meniscus lens may be equal to a thermal glass constant of the image side meniscus lens.

(d) In the system denoted as (c), the thermal glass constants may be defined as $$T_{gi} = \frac{\frac{dn_i}{dT}}{(n_i - 1)} - \alpha_i,$$

where
i is 1 or 2 for the object and the image side meniscus lenses respectively,
$n_i$ is a refractive index of lens i,
$\alpha_i$ is a thermal expansion coefficient of lens i, and
T is temperature.

(e) In the system/s denoted as (a)-(d), each of the object side meniscus lens and the image side meniscus lens may include chalcogenide glass.

(f) In the system/s denoted as (a)-(d), each of the object side meniscus lens and the image side meniscus lens may include silicon.

(g) In the system/s denoted as (a)-(f), the system may be free of powered optics except for the object side and image side meniscus lenses.

(h) In the system/s denoted as (a)-(d) and (h), the object side meniscus lens may be molded of a chalcogenide glass.

(i) In the system/s denoted as (a)-(h), a thermal image may be formed at an image plane. A distance between the image side meniscus lens and the image plane is set by a first fixed spacer element therebetween, and a distance between the object side and image side meniscus lenses is set by a second fixed spacer element therebetween.

(j) In the system/s denoted as (a)-(i), the effective focus position of the imaging system may be athermalized over a range of −40 to +60 degrees Celsius.

(k) A passively athermalized infrared imaging system includes an object side meniscus lens, formed of a first material that transmits infrared radiation, that forms at least one aspheric surface; and an image side meniscus lens, formed of a second material that transmits infrared radiation, that forms two aspheric surfaces. The object side and image side meniscus lenses cooperate to form a thermal image and being concave towards the image. The first and second materials have thermal glass constants $T_{g1}$ and $T_{g2}$ respectively, wherein $T_{g2}$ is at least 1.67 times $T_{g1}$, such that an effective focus position of the system is athermalized over a temperature range of 0 to +40 degrees Celsius.

(l) In the system denoted as (k), athermalized may be defined as a polychromatic, through-focus modulation transfer function ("MTF") being at least 0.1 over the range of 0 to +40 degrees Celsius, at ½ of an optical cutoff frequency of the lens $(1/((F/\#)*\lambda))$.

(m) In the system/s denoted as (k) or (l), the system may be free of powered optics except for the first and second lens.

(n) In system/s denoted as (k)-(m), the thermal image forms at an image plane, and a distance between the second lens and the image plane may be set by a first fixed spacer element therebetween. A distance between the first lens and the second lens may be set by a second fixed spacer element therebetween.

(o) In system/s denoted as (k)-(n), the first and second materials may be selected from the group consisting of a chalcogenide glass, germanium, silicon, gallium arsenide, zinc selenide and glass.

(p) In system/s denoted as (k)-(o), each of the first and second materials may be chalcogenide glass.

(q) In system/s denoted as (o), $T_{g2}$ may be at least ($1.25$ times $T_{g1}$ plus $50\times10^{-6}$), and each of the first and second materials may be a different one of said group.

(r) In system/s denoted as (k)-(o) or (q), the first material may be a chalcogenide glass, and the second material may be germanium.

(s) In system/s denoted as (k)-(o) or (q), the first material may be a chalcogenide glass and the second material may be gallium arsenide.

(t) In system/s denoted as (k)-(o) or (q), the first material may be a chalcogenide glass and the second material may be silicon.

(u) In system/s denoted as (k)-(o) or (q), the first material may be zinc selenide and the second material may be germanium.

(v) In system/s denoted as (k)-(o) or (q), the first material may be gallium arsenide and the second material may be germanium.

(w) In system/s denoted as (k)-(v), the effective focus position of the imaging system may be athermalized over a range of −40 to +60 degrees Celsius.

(x) A method of aligning elements in a manufacturing process includes placing a middle element onto a base element, the base element forming first alignment features, the middle element forming apertures therethrough corresponding to the first alignment features. Second alignment features of an upper element are placed onto the first alignment features such that the first and second alignment features cooperate, through the apertures, to align the upper element with the base element.

(y) In the method denoted as (x), the steps of placing the middle element and the second alignment features aligns the middle element to the base element and the upper element with a tolerance corresponding to a clearance of the apertures around the first and second alignment features.

(z) In the method/s denoted as (x) or (y), the base, middle and upper elements may be bonded together while the alignment features cooperate, to form a composite element; and the composite element may be diced to generate a plurality of subunits that do not include any portion of the first or second alignment features, but in which respective portions of the base and upper elements remain in alignment.

(a1) In the method/s denoted as (z) bonding includes utilizing an adhesive.

(b1) A method of aligning elements in a manufacturing process includes placing a middle element onto a base element. The base element forms first alignment features, and the middle element forms apertures therethrough corresponding to the first alignment features. Intermediate alignment elements are placed upon the first alignment features; and second alignment features of an upper element are placed onto the intermediate alignment features such that the first, intermediate, and second alignment features cooperate to align the upper element with the base element.

(c1) In the method denoted as (b1), placing the intermediate alignment elements includes placing substantially spherical elements into recesses in the base element that form the first alignment elements.

(d1) In the method/s denoted as (b1) or (c1), the steps of placing the middle element, the intermediate alignment elements and the second alignment features may align the middle element to the base element and the upper element with a tolerance corresponding to a clearance of the apertures around the intermediate alignment elements.

(e1) A plurality of infrared lens systems includes at least one first lens wafer having a first base material that is opaque to infrared radiation, with infrared transmissive material inset into apertures therein to form first lenses. The first lens wafer is bonded with at least one second lens wafer having a plurality of second lenses, such that pluralities of the first and second lenses align to form the lens systems.

(f1) In the plurality of systems denoted as (e1), the infrared transmissive material may be inset into carriers that are inset into the first base material.

(g1) In the plurality of systems denoted as (e1) or (f1), the first base material may transmit at least one of visible and ultraviolet radiation.

(h1) In the plurality of systems denoted as (e1)-(g1), the second lens wafer may include a second base material that is opaque to infrared radiation, with infrared transmissive material inset into apertures therein to form the second lenses.

(i1) In the plurality of systems denoted as (h1), the first base material may transmit at least one of visible and ultraviolet radiation.

(j1) In the plurality of systems denoted as (e1)-(i1), the first base material may be one of metal, plastic, ceramic and composite.

(k1) In the plurality of systems denoted as (e1)-(j1), the first and second wafers may be joined to one another.

(l1) In the plurality of systems denoted as (e1)-(k1), the first and second lens wafers may be mechanically joined.

(m1) In the plurality of systems denoted as (e1)-(l1), the first and second lens wafers may be joined with an adhesive.

(n1) In the plurality of systems denoted as (e1)-(m), the first and second lens wafers may be diced to separate each of the lens systems from one another.

(o1) In the plurality of systems denoted as (n1), after dicing, the lens systems may not include alignment features utilized to align the first and second lens wafers.

(p1) The plurality of systems denoted as (e1)-(o1) may further include a sensor aligned to at least one of the lens systems.

(q1) In the plurality of systems denoted as (p1), the sensor may be hermetically sealed to the at least one of the lens systems.

(r1) The plurality of systems denoted as (e1)-(o1) may further include a plurality of spacers, each of the spacers being disposed between and bonded with one of the first lenses and one of the second lenses, each of the spacers forming an aperture along an optical axis formed by the ones of the first and second lenses.

(s1) The plurality of systems denoted as (e1)-(q1) may further include a spacer layer forming a plurality of apertures between each of the first and second lenses, the spacer layer being disposed between and bonded with the first and second lens wafers.

(t1) In the plurality of systems denoted as (s1), the spacer layer may be opaque to infrared energy.

(u1) In the plurality of systems denoted as (s1) or (t1), the spacer layer may be one of metal, plastic, ceramic and composite.

(v1) The plurality of systems denoted as (e1)-(u1) may further include a sensor array layer having a plurality of sensors, each sensor aligning to a corresponding one of the lens systems.

(w1) In the plurality of systems denoted as (v1), each of the sensors may be hermetically sealed with the corresponding one of the lens systems.

(x1) In the plurality of systems denoted as (v1) or (w1), each of the sensors is hermetically sealed with the corresponding one of the lens systems without a cover plate over the sensor array.

(y1) A lens wafer for use in optical manufacturing includes a substrate forming apertures therein, the substrate being formed of a base material; and a plurality of lenses, each of the lenses including an optical material and disposed within a respective one of the apertures.

(z1) In the wafer denoted as (y1), the base material may be or include one of metal, plastic, ceramic and composite.

(a2) In the wafer denoted as (y1) or (z1), each of the plurality of lenses may be at least 200 microns from each other of the plurality of lenses such that the substrate can be diced to singulate portions of the substrate having a single lens therein without damaging any of the plurality of lenses.

(b2) In the wafer denoted as (y1)-(a2), the optical material may be transparent to IR radiation.

(c2) In the wafer denoted as (y1)-(b2), the optical material may be or include one or more of a chalcogenide glass, a crystalline material, a salt, plastic or glass.

(d2) The wafer denoted as (y1)-(c2) may further include mechanical alignment features therein for alignment of the lens wafer to a second lens wafer.

(e2) In the wafer denoted as (y1)-(d2), each of the lenses may be disposed within its respective aperture in a nonfinal form, and may be subsequently shaped to a final form while in the aperture.

(f2) In the wafer denoted as (e2), each of the lenses may be shaped to the final form by one of polishing, grinding, diamond turning, magnetorheological finishing, compression molding or injection molding.

(g2) In the wafer denoted as (y1)-(f2), each of the plurality of lenses may form an outwardly facing flange, and the substrate may be or include plastic that is overmolded about each of the flanges.

(h2) In the wafer denoted as (g2), each of the outwardly facing flanges may form an alignment feature that cooperates with a mold, to align each respective lens within the lens wafer as the plastic is overmolded about each of the flanges using the mold.

(i2) In the wafer denoted as (g2), the substrate may include alignment features for subsequent alignment of the substrate, and the alignment features may be formed as the plastic is overmolded about each of the flanges using the mold.

(j2) In the wafer/s denoted as (y1)-(g2), each of the plurality of lenses may be held by a respective lens carrier.

(k2) In the wafer denoted as (j2), the lens carriers may be held within respective apertures of the substrate with an adhesive.

(l2) In the wafer/s denoted as (j2) or (k2), each of the lens carriers may be or include one or more of metal, plastic and ceramic.

(m2) In the wafer/s denoted as (j2)-(l2), each of the lens carriers may include alignment features for alignment of the lens carriers with the lens wafer.

(n2) An infrared lens assembly includes a lens formed of an infrared transmitting material that is disposed within a carrier of a base material, the lens being molded within the carrier with at least one feature that secures the lens to the carrier.

(o2) In the assembly denoted as (n2), the lens may include one or more of a chalcogenide glass, plastic, glass, a crystalline material, and a salt.

(p2) In the assembly/ies denoted as (n2) and (o2), the carrier may form one of a recess and a protrusion that engages the at least one feature of the lens.

(q2) In the assembly/ies denoted as (n2)-(p2), the carrier may form at least one alignment feature for aligning the carrier to another carrier.

(r2) In the assembly/ies denoted as (n2)-(q2), the base material may include plastic.

(s2) In the assembly/ies denoted as (n2)-(q2), the base material may transmit visible radiation and be opaque to infrared radiation.

(t2) A mold set includes an upper mold and a lower mold, at least one of the upper and lower molds having one or more features that are configured to hold an infrared lens in an aligned position, the upper and lower molds configured to provide a cavity for molding a moldable material into one of a lens carrier and a lens wafer about the infrared lens.

(u2) In the mold set denoted as (t2), at least one of the upper and lower molds may include a dam for preventing the moldable material from obscuring an optical surface of the infrared lens.

(v2) An infrared lens assembly includes a lens formed of an infrared transmitting material that is disposed within a carrier of a base material, the carrier being molded around the lens with at least one feature that secures the lens to the carrier.

(w2) An infrared lens stack includes a first lens formed of an infrared transmitting material and disposed within a first carrier, formed of a base material, that forms at least one first alignment feature; and a second lens formed of an infrared transmitting material and disposed within a second carrier, formed of a base material, that forms at least one second alignment feature configured to cooperate with the first alignment feature.

(x2) In the infrared lens stack/s denoted as (v2) or (w2), the carriers may be bonded together.

(y2) In the infrared lens stack/s denoted as (v2)-(x2), any of the base materials may include plastic.

(z2) In the infrared lens stack/s denoted as (v2)-(y2), plastic may transmit at least one of visible and ultraviolet radiation but be opaque to infrared radiation.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A lens wafer for use in a passively aligned optical imaging system, the lens wafer including:
    a plurality of lens elements each including an assembly flange having alignment features such that the lenses are alignable on a mold; and
    a base portion made from base material molded around the plurality of lenses, the base portion having a first surface opposite a second surface, the assembly flange therebetween; and,
    alignment inserts such that the lens wafer is able to passively align with a second lens wafer in at least four degrees of freedom, the four degrees of freedom comprising:
        X and Y-coordinates defining centering of lens elements between the lens wafer and the second lens wafer,
        a Z-coordinate defining spacing between the lens wafer and the second lens wafer, and
        rotation of the lens wafer with respect to the second lens wafer.

2. The lens wafer of claim 1, the base portion having a plurality of tabs located on the periphery thereof, the each of the tabs including at least one of an alignment feature and an alignment insert.

3. The lens wafer of claim 1, wherein the alignment inserts comprise three alignment inserts each substantially oriented at a respective vertex of an equilateral triangle within the lens wafer.

4. The lens wafer of claim 1, wherein the alignment inserts include alignment features that passively align with a complimentary alignment feature of an alignment insert located on a second lens wafer having a plurality of lens elements such that the alignment features and the complimentary alignment features cooperate to passively align the lens wafer and second lens wafer in the at least four degrees of freedom.

5. The lens wafer of claim 1, wherein the alignment inserts include alignment features that interact with an intermediate alignment element to passively align with an additional alignment insert of a second lens wafer having a plurality of lens elements such that the alignment features, the intermediate alignment element, and the additional alignment insert cooperate to passively align the lens wafer and second lens wafer in the at least four degrees of freedom.

6. The lens wafer of claim 1, the base portion including a plurality of first alignment features of the alignment features for passively aligning a second lens wafer having a plurality of second alignment features of the alignment features and a plurality of lens elements.

7. The lens wafer of claim 6, the plurality of first alignment features interacting directly with the plurality of second alignment features to passively align the lens wafer to the second lens wafer in the at least four degrees of freedom.

8. The lens wafer of claim 6, each of the plurality of first and second alignment features interacting with an intermediate alignment element to passively align the lens wafer to the second lens wafer in the at least four degrees of freedom.

9. The lens wafer of claim 6, the plurality of first alignment features comprising protrusions from the surface of the lens wafer; the plurality of second alignment features comprising indentations within the second lens wafer; wherein the protrusions mate with the indentations to passively align the lens wafer to the second lens wafer in the at least four degrees of freedom.

10. The lens wafer of claim 6, each of the first and second alignment features comprising protrusions from the respective surfaces of the lens wafer and second lens wafer that interact, within an alignment aperture of a spacer wafer located between the lens wafer and the second lens wafer, to passively align the lens wafer to the second lens wafer in the at least four degrees of freedom.

11. A passively aligned optical imaging assembly comprising:
- a lower wafer comprising a plurality of lower alignment features;
- a middle wafer comprising a plurality of middle optical elements and a plurality of middle alignment features opposing the lower alignment features; and,
- an upper wafer comprising a plurality of upper optical elements and a plurality of upper alignment features opposing the middle alignment features;
- at least one of (a) the plurality of middle optical elements each having an assembly flange and the middle wafer having a first surface opposite a second surface, the assembly flange therebetween, and (b) the plurality of upper optical elements each having an assembly flange and the upper wafer having a first surface opposite a second surface, the assembly flange therebetween;
- wherein the lower, middle and upper alignment features cooperate to passively align the lower, middle and upper lens wafers.

12. The passively aligned optical imaging assembly of claim 11, wherein the plurality of lower, middle and upper alignment features comprise lower, middle and upper alignment inserts, respectively, substituted for a portion of the plurality of optical elements.

13. The passively aligned optical imaging assembly of claim 12, wherein the lower alignment inserts interact directly with the middle alignment inserts and the middle alignment inserts interact directly with the upper alignment inserts such that the lower, middle and upper wafers are passively aligned.

14. The passively aligned optical imaging assembly of claim 12, wherein each of the lower and middle alignment inserts interact with respective one of a plurality of first intermediate alignment elements, and the middle and upper alignment inserts interact with a respective one of a plurality of second intermediate alignment elements such that the lower, middle and upper wafers are passively aligned.

15. The passively aligned optical imaging assembly of claim 11, wherein the lower wafer includes a plurality of optical sensors such that when the lower, middle and upper wafers are passively aligned and bonded together, the sensors are hermetically sealed within the imaging assembly.

16. The passively aligned optical imaging assembly of claim 15, wherein the bonded lower, middle and upper wafers are diced to form individual optical imaging assemblies.

* * * * *